(12) United States Patent
Sugita et al.

(10) Patent No.: US 9,727,190 B2
(45) Date of Patent: Aug. 8, 2017

(54) ELECTRONIC APPARATUS AND INFORMATION PROCESSING SYSTEM

(71) Applicant: Sharp Kabushiki Kaisha, Osaka-shi, Osaka (JP)

(72) Inventors: Yasuhiro Sugita, Osaka (JP); Tomohiro Kimura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 24 days.

(21) Appl. No.: 14/769,474

(22) PCT Filed: Feb. 13, 2014

(86) PCT No.: PCT/JP2014/053302
§ 371 (c)(1),
(2) Date: Aug. 21, 2015

(87) PCT Pub. No.: WO2014/129375
PCT Pub. Date: Aug. 28, 2014

(65) Prior Publication Data
US 2015/0378478 A1    Dec. 31, 2015

(30) Foreign Application Priority Data

Feb. 25, 2013 (JP) ................................. 2013-034995

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC .............................. G06F 3/0416; G06F 3/044
USPC .................................................. 345/170–177
See application file for complete search history.

(56) References Cited

U.S. PATENT DOCUMENTS

| | | | |
|---|---|---|---|
| 6,452,514 B1 | 9/2002 | Philipp | |
| 2011/0304583 A1* | 12/2011 | Kruglick | G06F 3/044 345/174 |
| 2012/0081303 A1* | 4/2012 | Cassar | G06F 1/1616 345/173 |
| 2013/0007413 A1* | 1/2013 | Thomson | G06F 1/324 712/30 |
| 2013/0147760 A1* | 6/2013 | Lai | H04B 5/0012 345/174 |
| 2013/0211757 A1 | 8/2013 | Miyamoto | |
| 2015/0378501 A1* | 12/2015 | Chen | G06F 3/0416 345/173 |
| 2016/0110012 A1* | 4/2016 | Yim | G06F 1/1626 345/173 |
| 2016/0117141 A1* | 4/2016 | Ro | G06F 3/1454 715/748 |

FOREIGN PATENT DOCUMENTS

| | | |
|---|---|---|
| JP | 2011-221542 A | 11/2011 |
| JP | 4927216 B1 | 5/2012 |

* cited by examiner

*Primary Examiner* — Tony Davis
(74) *Attorney, Agent, or Firm* — Keating & Bennett, LLP

(57) ABSTRACT

A receiving device (1a) includes a position/angle determining section (505) for determining a position of a transmitting device (1b) in relation to the receiving device (1a) by judging which of a plurality of sense lines (SL) provided in a touch panel (14) of the receiving device has received at least one of pulse signals transmitted from a touch panel (14) included in the transmitting device (1b).

15 Claims, 52 Drawing Sheets

|  | Transmitting device ||
|---|---|---|
|  | Drive (transmitting) electrode | Drive (receiving) electrode |
| Case 1 | Normal operation (pulse application) | Normal operation (reading of electric charge) |
| Case 2 | Normal operation (pulse application) | Constant potential or Hi Z |

(b)

|  | Receiving device ||
|---|---|---|
|  | Drive (transmitting) electrode | Drive (receiving) electrode |
| Case 1 | Constant potential or Hi Z | Normal operation (reading of electric charge) |
| Case 2 | Normal operation (pulse application) | Normal operation (reading of electric charge) |

FIG. 32
| Case | Electrode orientation | Conceptual image | Output example | Whether position detection is possible in Y direction |
|---|---|---|---|---|
| 1 | 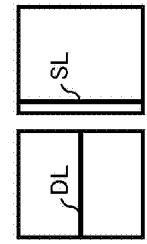 | 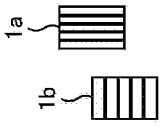 | 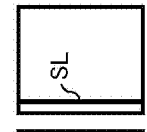 | ○ |
| 2 | 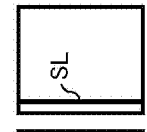 | 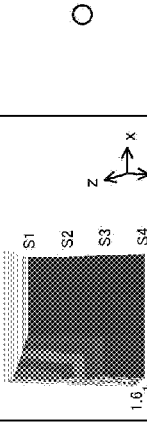 | 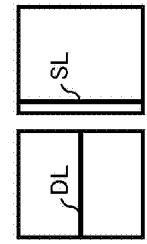 | ○ |
| 3 | 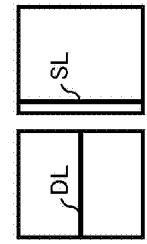 | 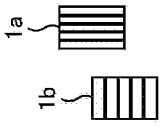 | 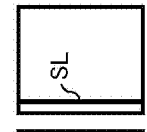 | ○ |
| 4 | 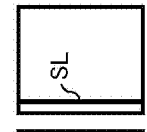 | 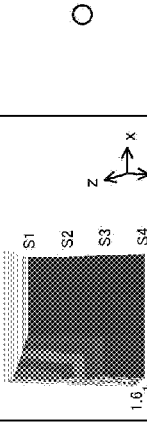 | 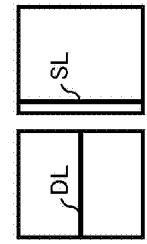 | × |

FIG. 34
| Case | Electrode orientation | Conceptual image | Output example | Whether position detection is possible in Y direction |
|---|---|---|---|---|
| 1 | 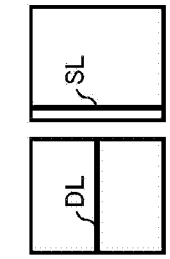 | 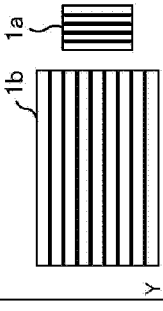 | 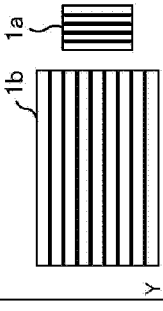 | ○ |
| 2 | 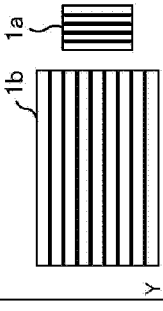 | 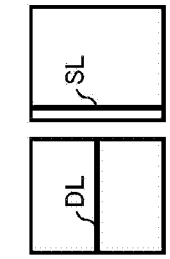 | — | × |
| 3 | 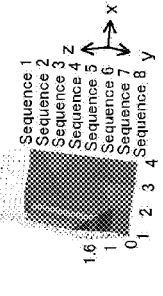 | 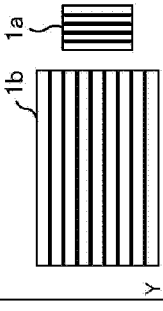 | 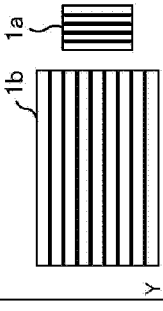 | ○ |
| 4 | 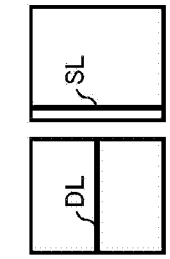 | 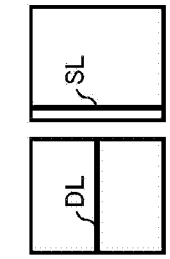 | — | × |

FIG. 36
| Case | Electrode orientation | Conceptual image | Output example | Whether position detection is possible in Y direction |
|---|---|---|---|---|
| 1 | 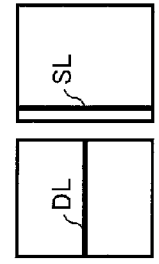 | 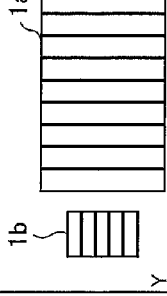 | — | × |
| 2 | 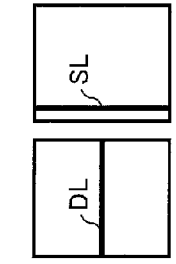 | 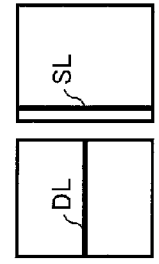 | 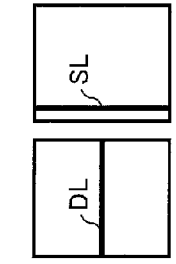 | ○ |
| 3 | 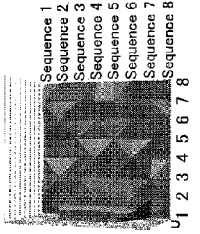 | 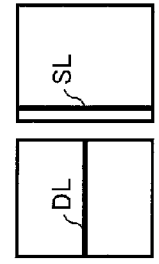 | 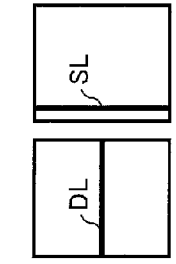 | ○ |
| 4 | 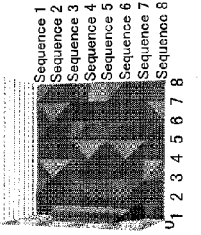 | 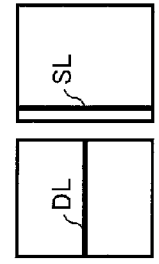 | — | × |

FIG. 40

| Case | Electrode orientation | Conceptual image | Output example | Whether position detection is possible | |
|---|---|---|---|---|---|
| | | | | Y direction | X direction |
| 1 | DL \| SL — | 1a 1b (vertical stripes) | | ○ | × |
| 2 | DL — SL \| | 1a 1b (horizontal stripes) | | × | ○ |
| 3 | DL \| SL \| | 1a 1b | | ○ | × |
| 4 | DL — SL — | 1a 1b | | × | ○ |

FIG. 42

| Case | Electrode orientation | Conceptual image | Output example | Whether position detection is possible | |
|---|---|---|---|---|---|
| | | | | Y direction | X direction |
| 1 | DL / SL | | | × | ○ |
| 2 | DL / SL | | | ○ | × |
| 3 | DL / SL | | | ○ | × |
| 4 | DL / SL | | | × | ○ |

| Case | Electrode orientation | Conceptual image | Output example | Whether position detection is possible | |
|---|---|---|---|---|---|
| | | | | X direction | Y direction |
| 1 | DL / SL | | | ○ | × |
| 2 | DL / SL | | | × | ○ |
| 3 | DL / SL | | | × | ○ |
| 4 | DL / SL | | | ○ | × |

ELECTRONIC APPARATUS AND
INFORMATION PROCESSING SYSTEM

TECHNICAL FIELD

The present invention relates to, for example, an electronic device capable of detecting a target object which contacts or approaches the electronic device.

BACKGROUND ART

Recent years have seen developments of a display device including a touch panel. An example of such a display device is disclosed in Patent Literature 1.

Patent Literature 1 discloses a table-type screen device 200 as illustrated in FIG. 53. This device is such that the positions of a camera 231 and printer 235, both of which are placed on a screen 215, are detected by a position detecting section 223 via a touch panel 216, and that in accordance with a predetermined instruction operation, image data 233 is transferred from the camera 231 to the printer 235 via the communication section 225. On an area between the position of the camera 231 and the position of the printer 235, an image 233a is displayed indicating a progress of transfer of the image data.

CITATION LIST

Patent Literatures

[Patent Literature 1]
Japanese Patent Application Publication, Tokukai No. 2011-221542 (Publication date: Nov. 4, 2011)
[Patent Literature 2]
U.S. Pat. No. 6,452,514 (Registration date: Jul. 17, 2002)
[Patent Literature 3]
Japanese Patent Publication No. 4927216 (Registration date: Feb. 17, 2012)

SUMMARY OF INVENTION

Technical Problem

The positions of the electronic devices, such as the camera 231 and the printer 235, on the screen 215 are detected via the touch panel 216. The degree of accuracy required for the detection is just enough to allow displaying the progress of transfer of the image data between the electronic devices. In other words, the table-type screen device 200 is arranged such that the positions of the electronic devices placed on the screen 215 are detected with accuracy to a degree just enough to allow performing the aforementioned display. The table-type screen device 200 does not require an arrangement in which a positional relation is detected accurately, for example, in units smaller than pitches of lines such as drive lines or sense lines, which are formed by an electrode group provided in the touch panel 216. Further, such an arrangement is not disclosed in Patent Literature 1 at all.

The present invention has been attained to solve the above problem. It is an object of the present invention to provide, for example, an electronic device capable of accurately detecting a relative positional relation of an electronic device including a touch panel.

Solution to Problem

In order to solve the above problem, an electronic device according to an aspect of the present invention is an electronic device serving as a receiving device, including: a receiving-end touch panel being a capacitive touch panel which detects contact of a target object or approach thereof, the receiving-end touch panel including receiving-end sense lines each capable of receiving at least one of pulse signals applied to respective transmitting-end drive lines which are provided in a transmitting-end touch panel, being a capacitive touch panel, of a transmitting device having contacted or approached the electronic device; and a determining section for determining a position of the transmitting device in relation to the electronic device by judging which of the receiving-end sense lines has received the at least one of the pulse signals transmitted from the respective transmitting-end drive lines.

Further, an electronic device according to an aspect of the present invention is an electronic device serving as a transmitting device, including: a transmitting-end touch panel being a capacitive touch panel which detects contact of a target object or approach thereof, the transmitting-end touch panel including transmitting-end drive lines; and a transmitting-end casing into which the transmitting-end touch panel is incorporated, wherein a minimum distance between the transmitting-end touch panel and an outside surface of the transmitting-end casing is not larger than a detectable distance within which the transmitting-end touch panel is capable of detecting the contact of the target object with the outside surface or the approach thereof to the outside surface, wherein at least one of pulse signals for detecting the contact of the target object or the approach thereof, the pulse signals having been applied to the respective transmitting-end drive lines, is received by a receiving-end touch panel, which is a capacitive touch panel provided in a receiving device capable of receiving the at least one of the pulse signals, when the receiving device approaches or contacts the electronic device, in order that the receiving device is allowed to determine a position of the electronic device.

Advantageous Effects of Invention

An electronic device and the like according to an aspect of the present invention yield an effect of accurately detecting the position of a counterpart device in relation to the electronic device.

Figure 15:
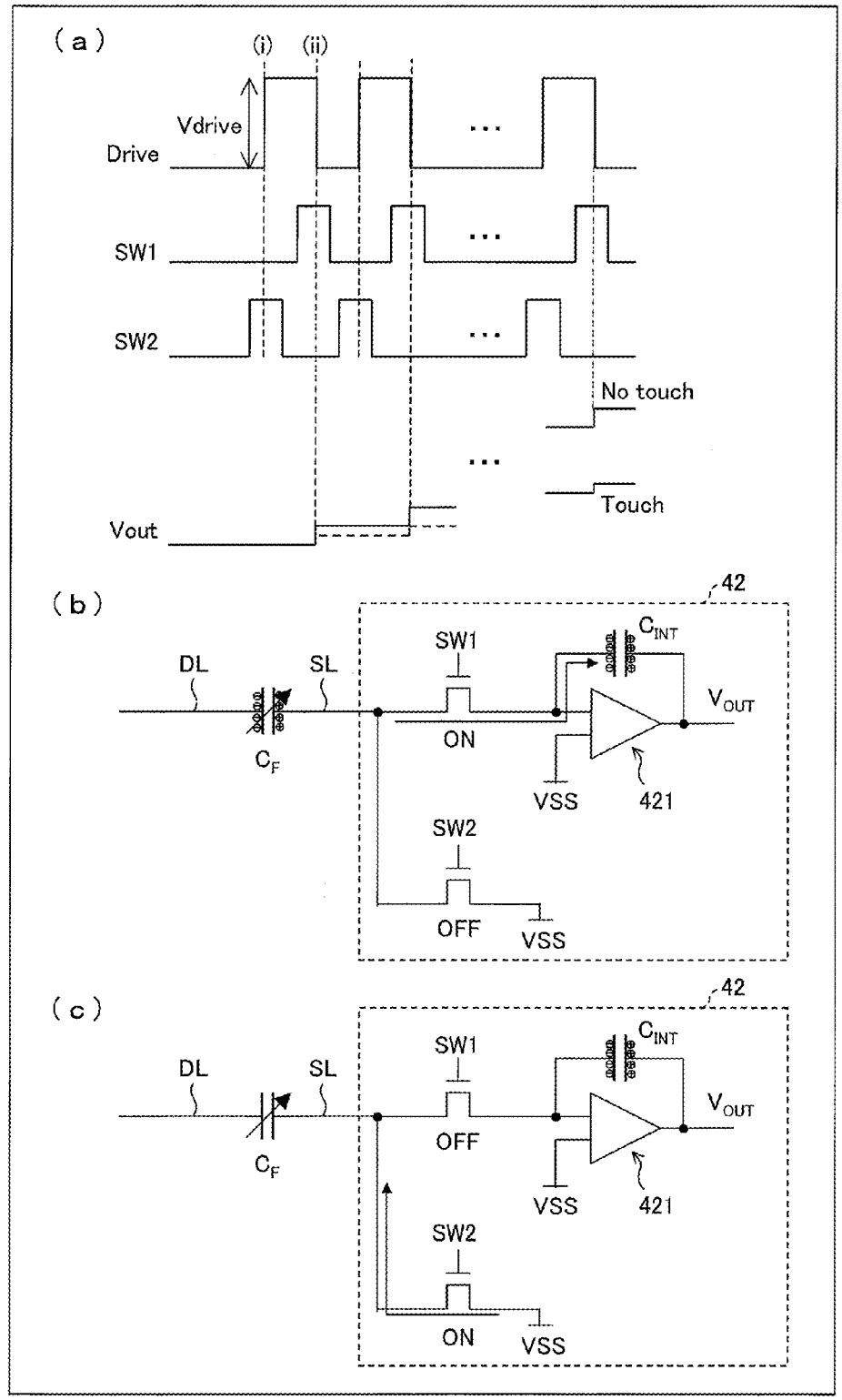

(a) to (c) of FIG. 15 are each a diagram illustrating a driving principle of a mutual capacitive touch panel.

Figure 16:
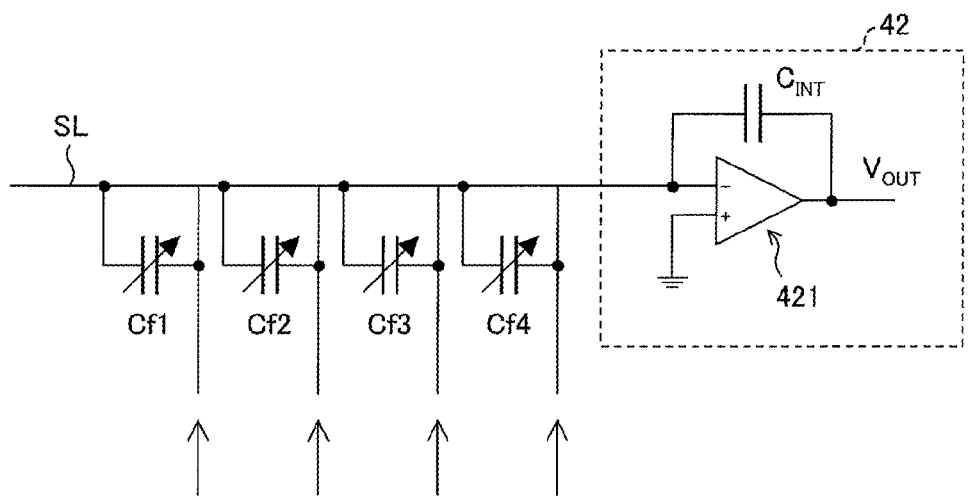

FIG. 16 is a diagram illustrating a driving principle of a sequential driving scheme.

Figure 17:
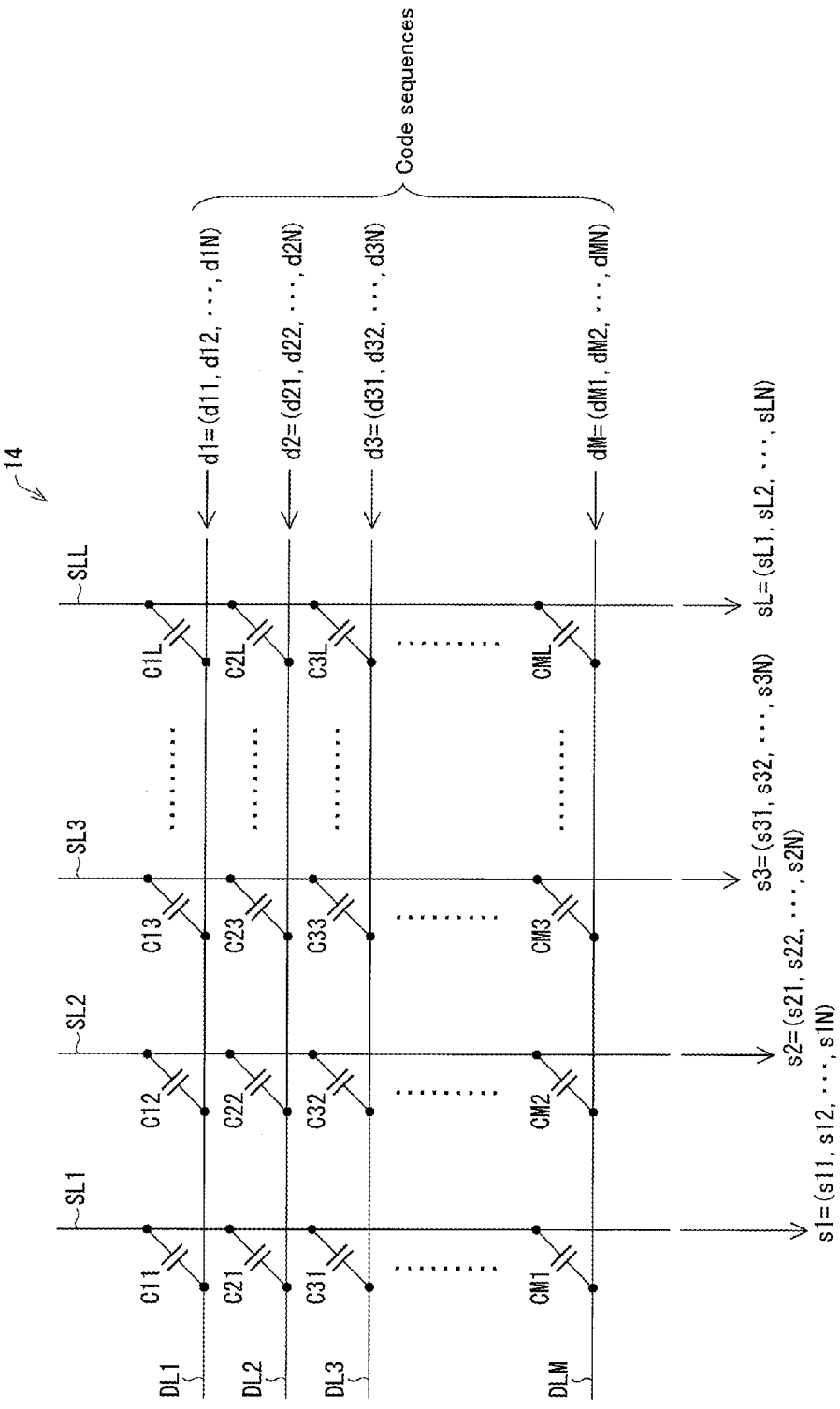

FIG. 17 is a diagram illustrating a driving principle of an orthogonal sequence driving scheme.

Figure 18:
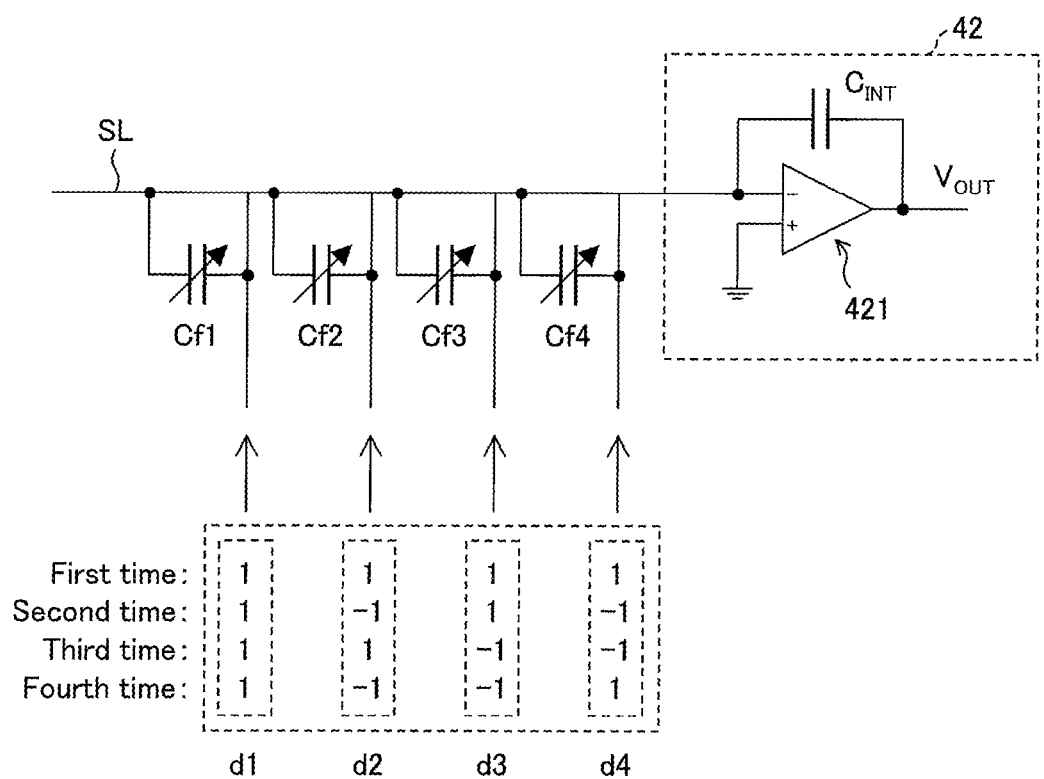

FIG. 18 is a diagram illustrating a driving principle of the orthogonal sequence driving scheme.

Figure 9:
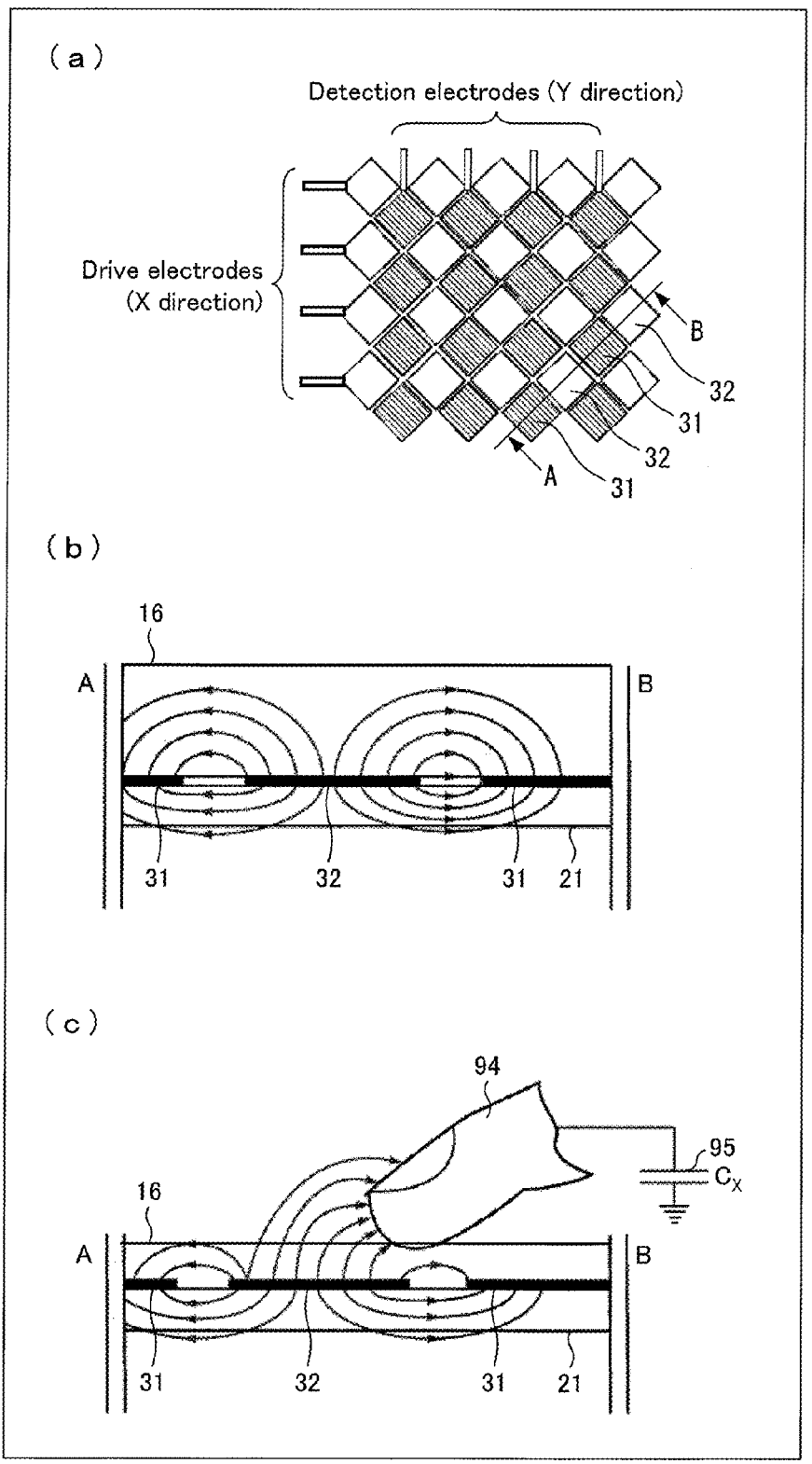
FIG. 9 shows plan views of an example capacitive touch panel, where (a) is a plan view of the touch panel, the plan view illustrating how electrodes of the touch panel are arranged, (b) is a A-B cross-sectional view of the touch panel, the cross-sectional view being taken along line A-B shown in (a), and (c) is a diagram illustrating an operation of the touch panel which operation is performed in the case where a finger (or thumb [the same applies hereinafter]) has touched the touch panel.
Figure 19:
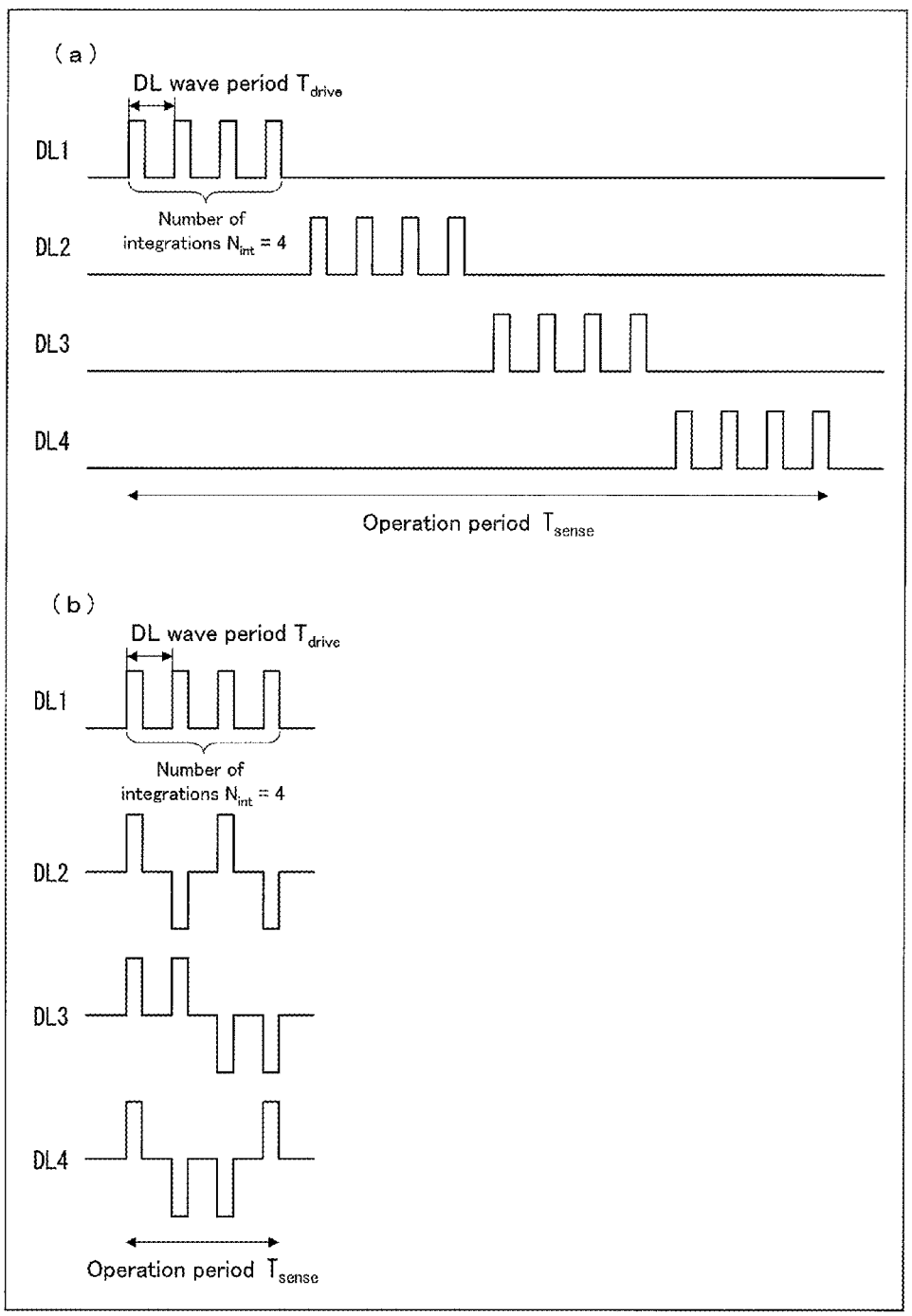

FIG. 19 shows diagrams each illustrating how parallel driving effectively reduces a time taken for a touch panel to carry out sensing, where (a) of FIG. 19 shows a sensing time in the case of sequential driving, and (b) of FIG. 9 shows a sensing time in the case of parallel driving.

Figure 20:
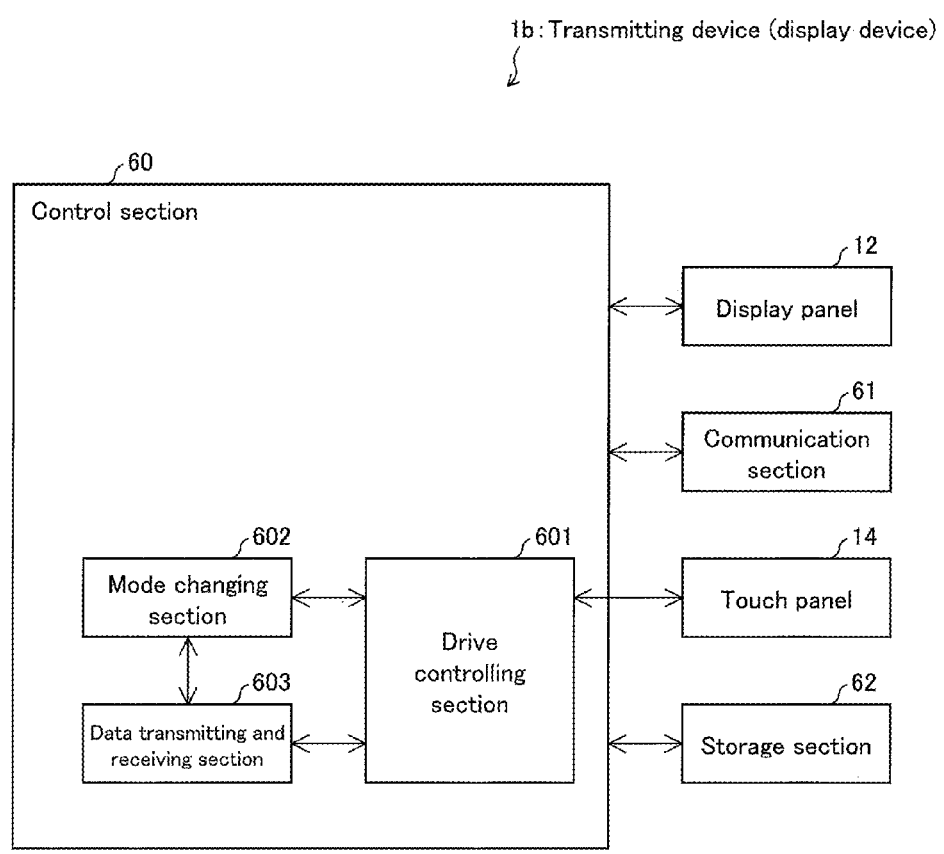

FIG. 20 is a diagram illustrating an example functional block of a control section included in each of the display devices (transmitting devices) of an embodiment of the present invention.

FIG. 21 is a diagram illustrating an example driving scheme employed for position detection, where (a) of FIG. 21 is a diagram illustrating a driving scheme of a transmitting device, and (b) of FIG. 21 is a diagram illustrating a driving scheme of a receiving device.

Figure 22:
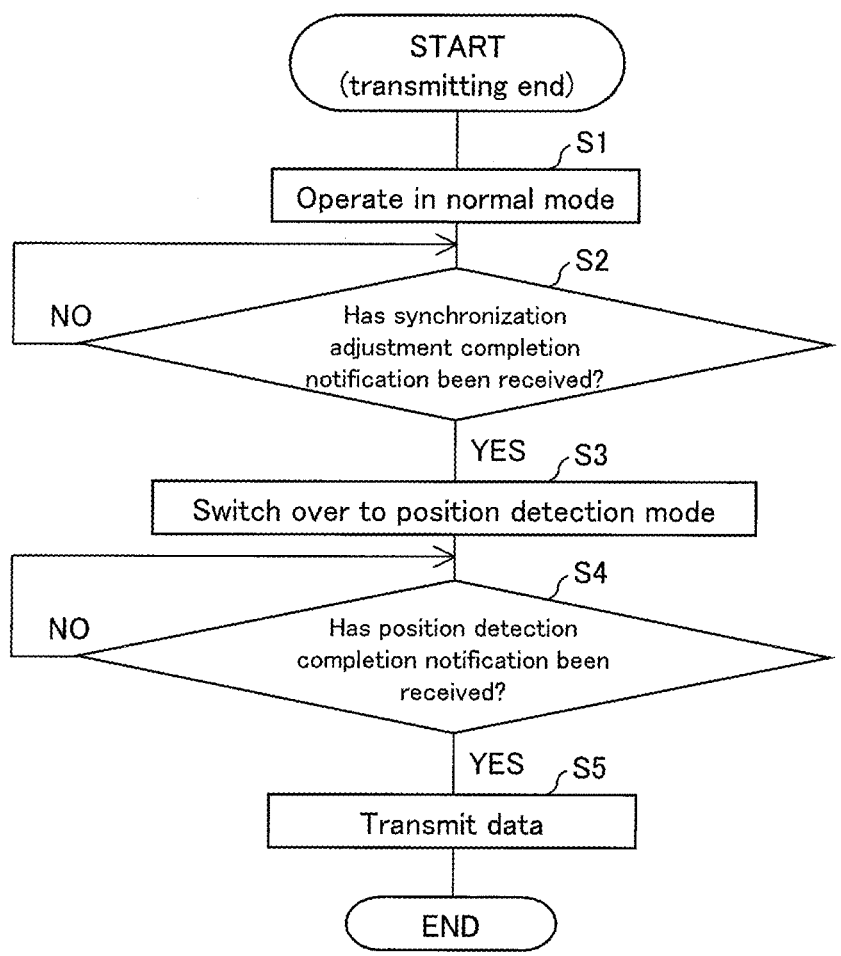

FIG. 22 is a flowchart illustrating the flow of processes performed by the transmitting device.

Figure 23:
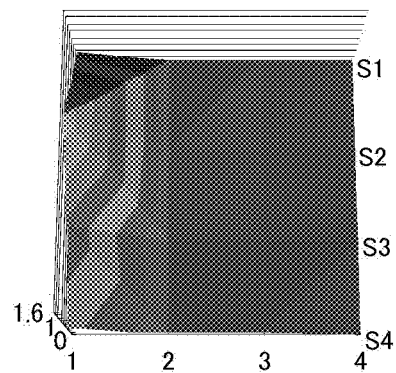

FIG. 23 is a view illustrating an example signal distribution obtained when the receiving device has detected contact of a transmitting device or approach thereof.

Figure 24:
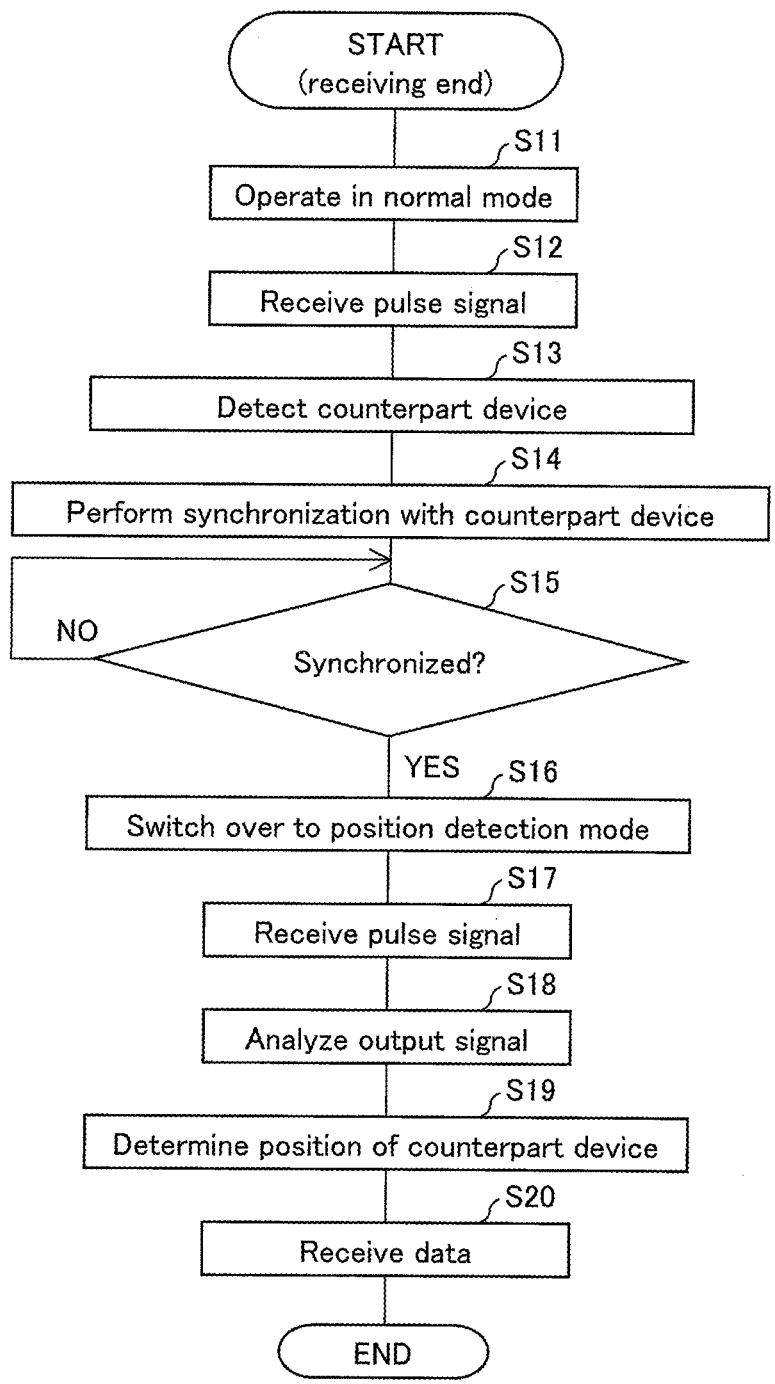

FIG. 24 is a flowchart illustrating the flow of the processes performed by the receiving device.

Figure 25:
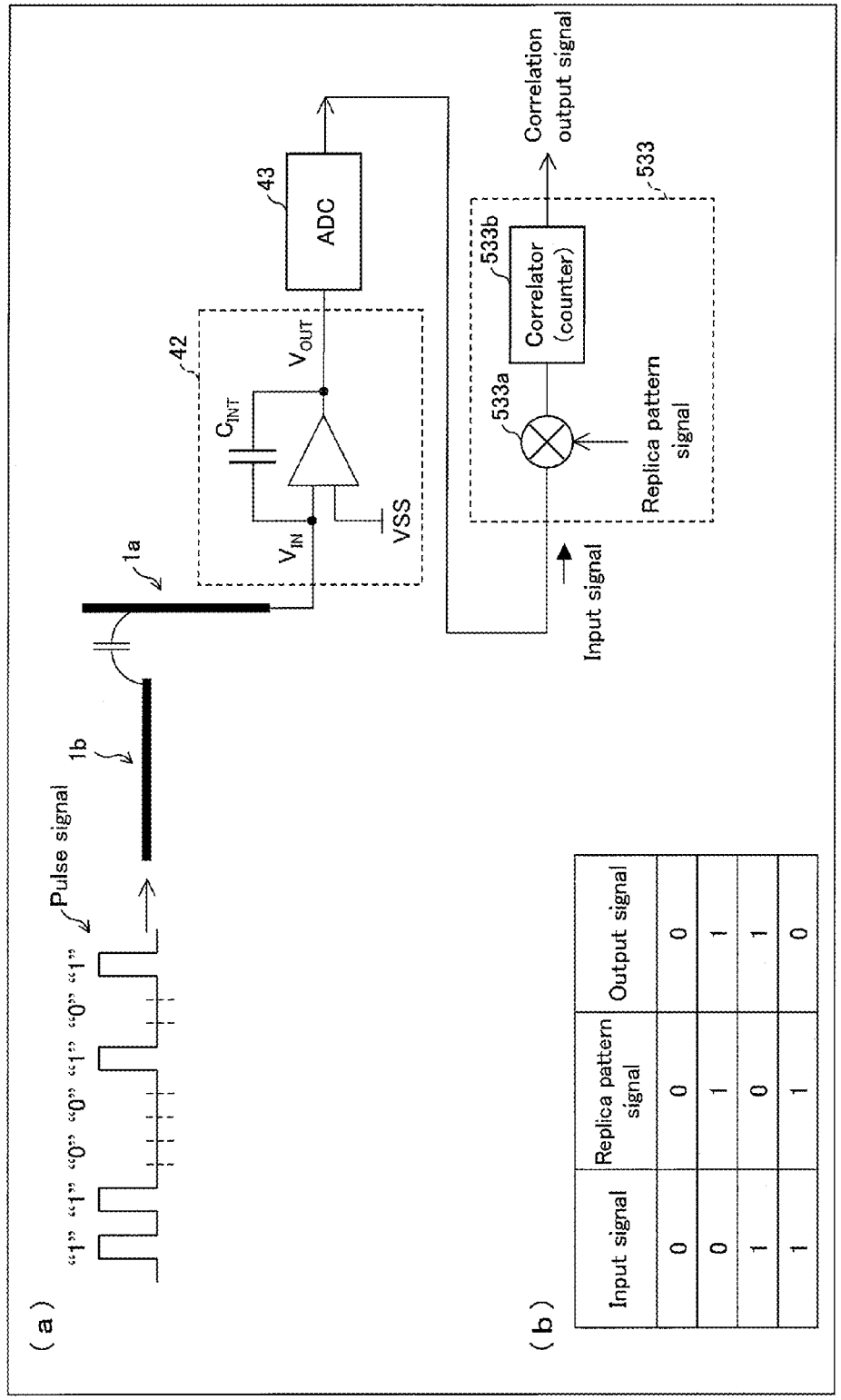

(a) of FIG. 25 is a diagram illustrating an equivalent circuit of a synchronization adjustment circuit, and (b) of FIG. 25 is a view illustrating an example input/output table to which an exclusive OR circuit refers.

Figure 26:
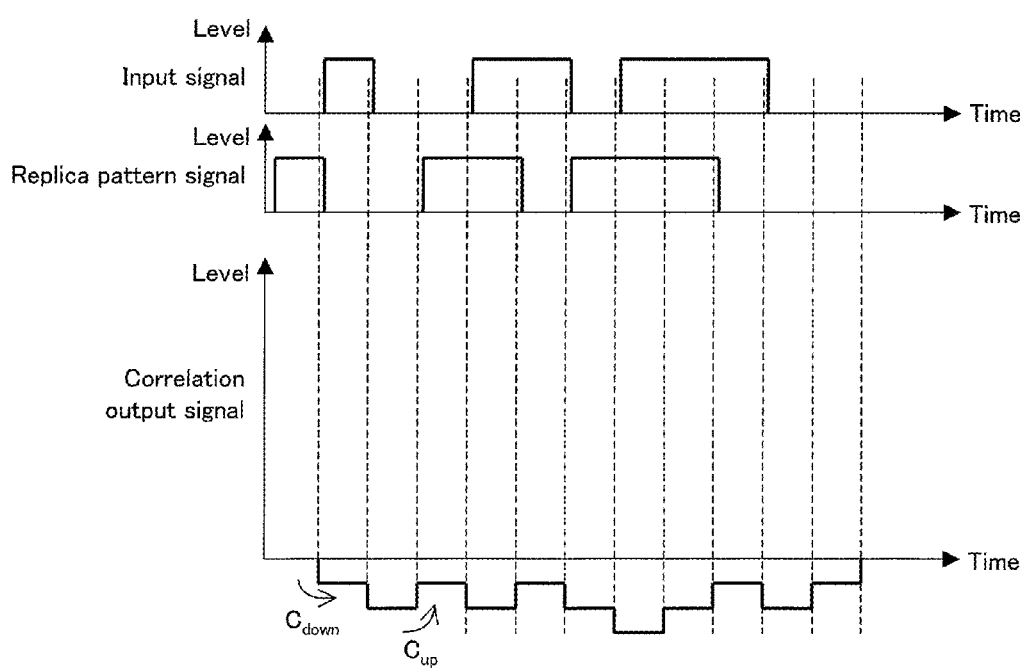

FIG. 26 is a chart illustrating an input signal, a replica pattern signal, and a correlation output signal generated by a correlator.

Figure 27:
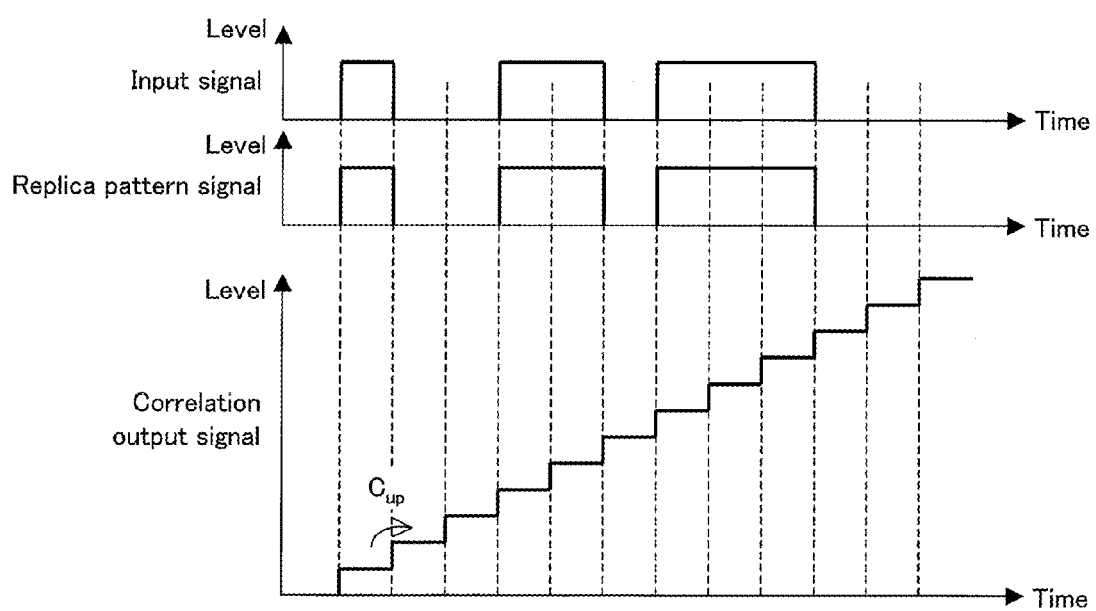

FIG. 27 is a chart illustrating an input signal, a replica pattern signal, and a correlation output signal generated by a correlator.

Figure 28:
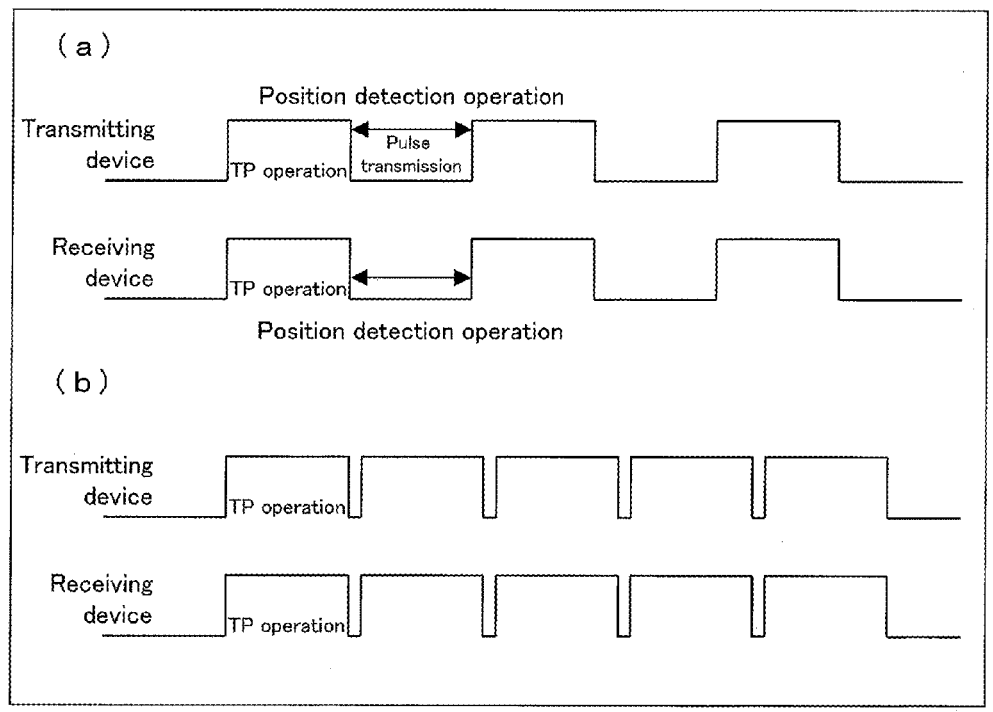

(a) and (b) of FIG. 28 are timing charts illustrating timings of a touch panel operation and a position detection operation.

Figure 29:
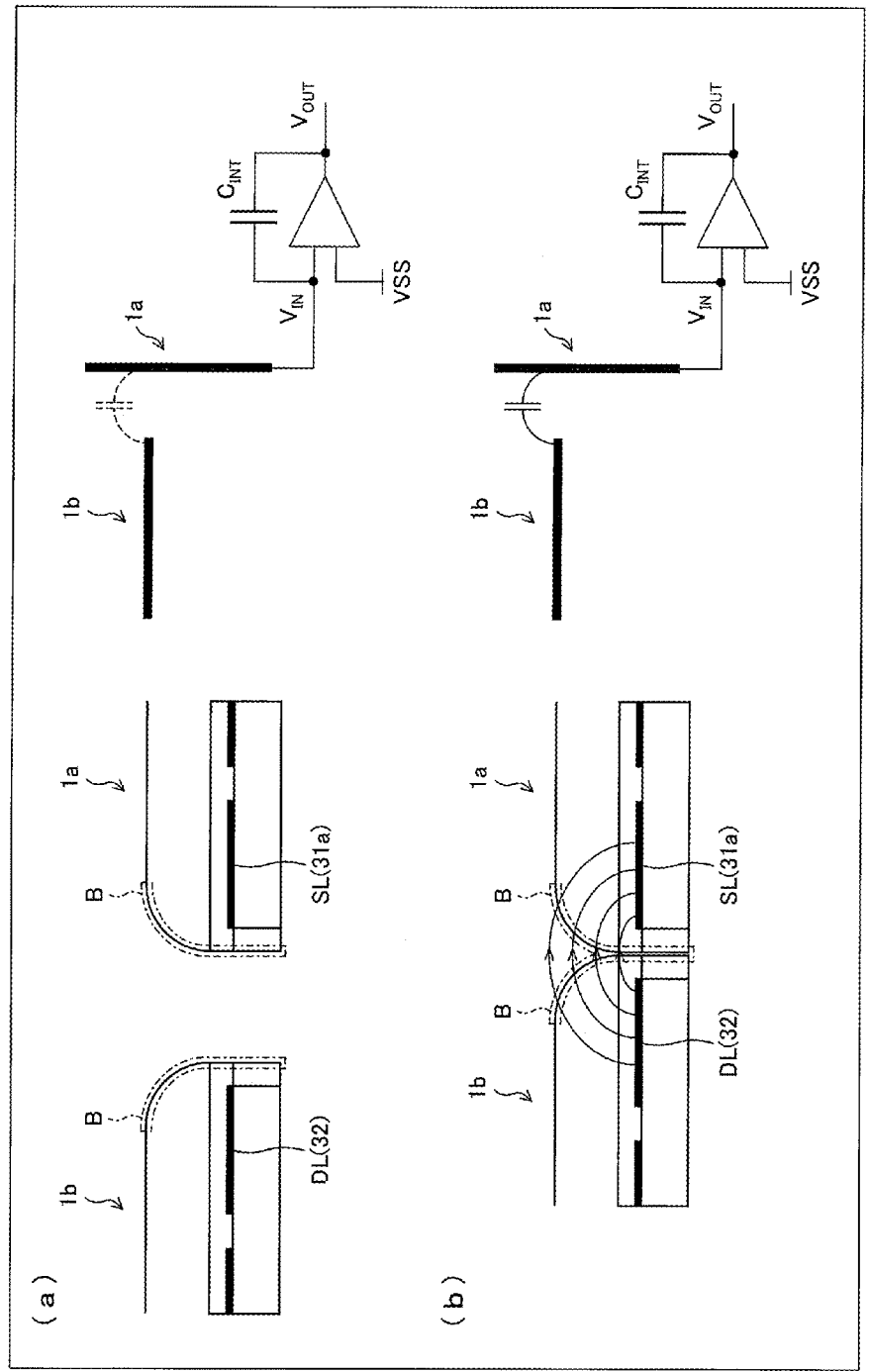

(a) of FIG. 29 is a view (i) schematically illustrating two display devices (transmitting device and receiving device) not being adjacent to each other and (ii) illustrating an equivalent circuit, and (b) of FIG. 29 is a view (i) schematically illustrating the two display devices being adjacent to each other and (ii) illustrating an equivalent circuit.

Figure 30:
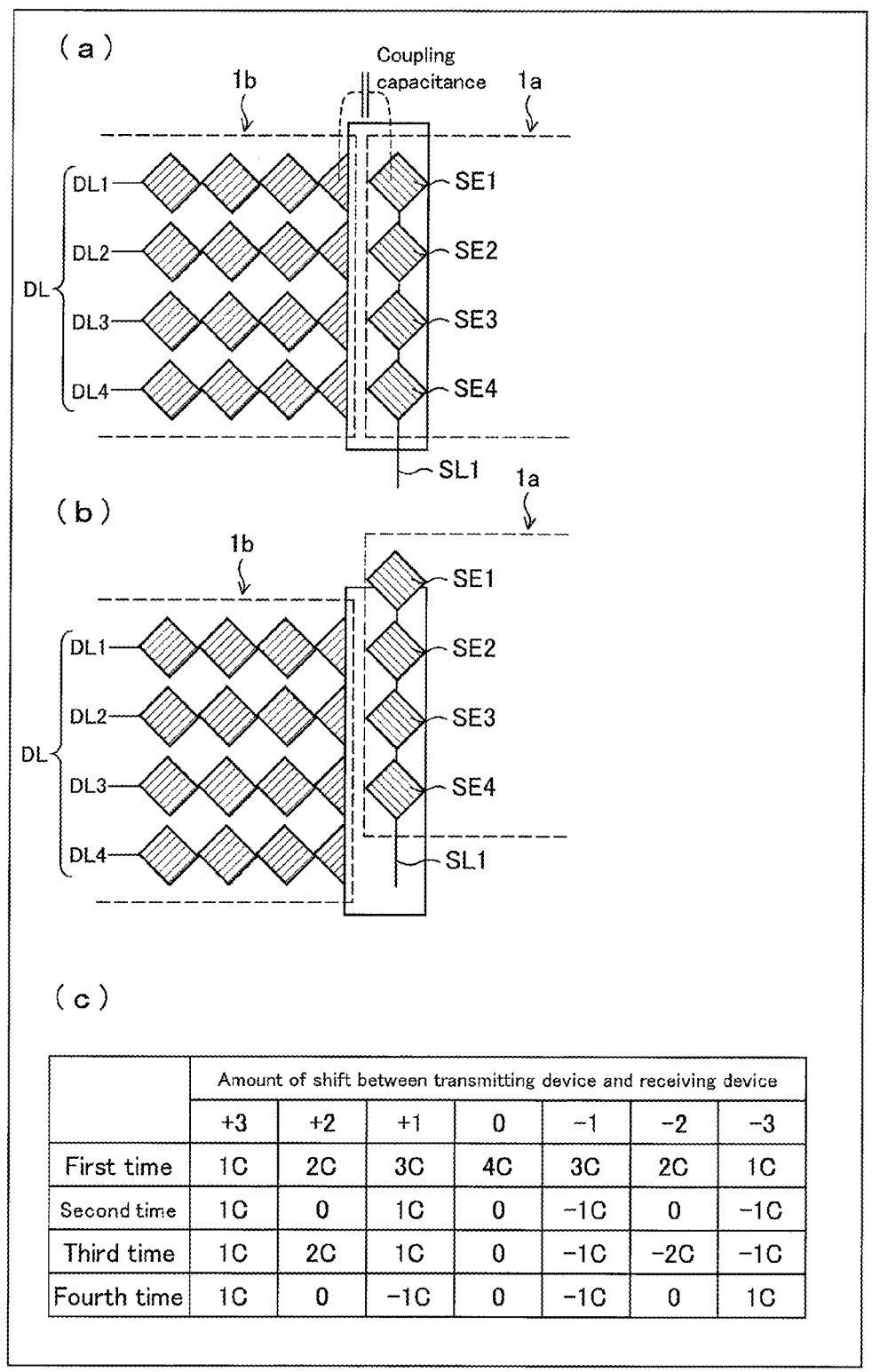

(a) and (b) of FIG. 30 are each a view illustrating a positional relation between the transmitting device and the receiving device. (c) of FIG. 30 is a view illustrating an example position detection table.

Figure 31:
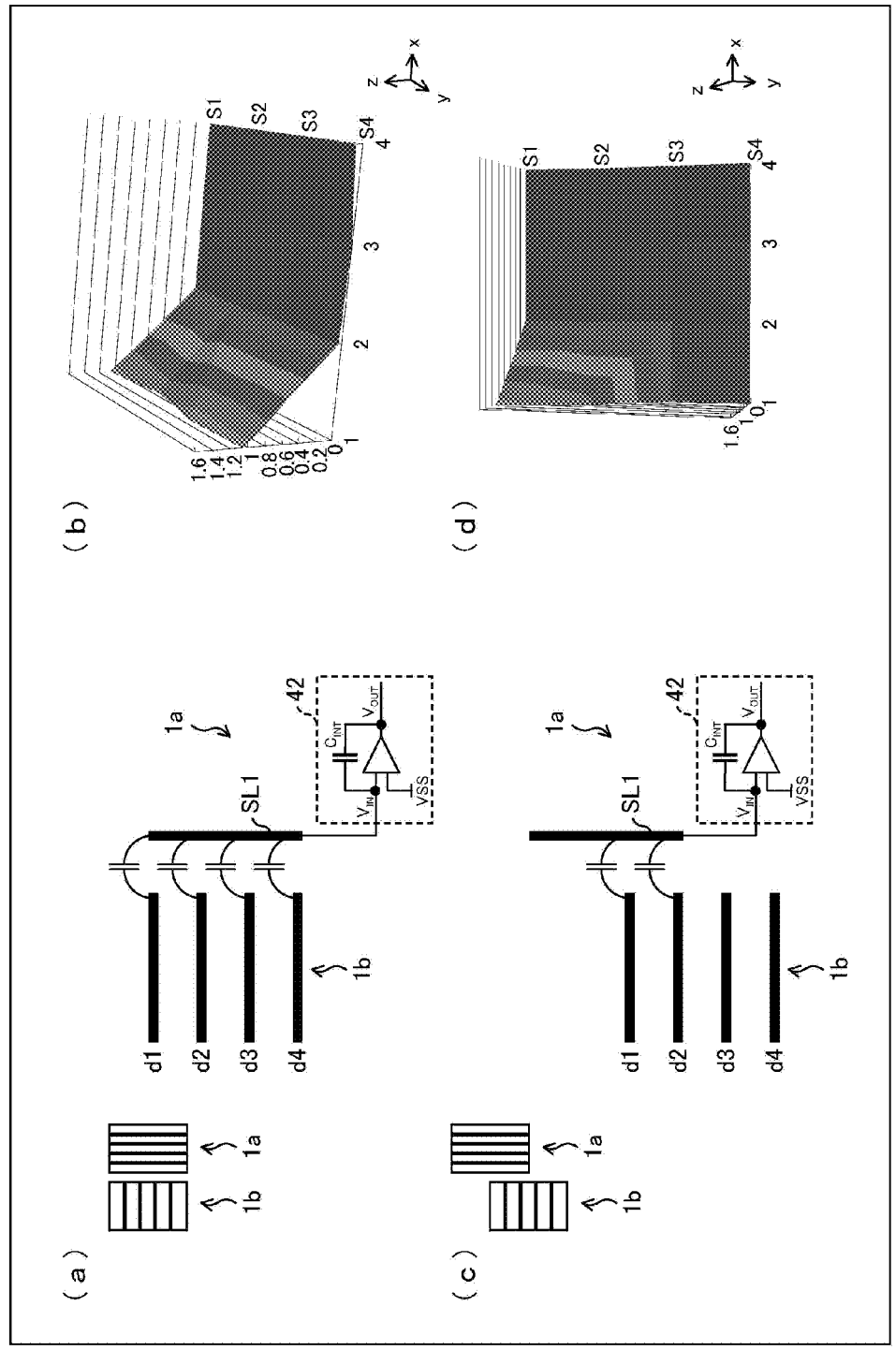

(a) and (c) of FIG. 31 are each a view schematically illustrating an equivalent circuit during the position detection, and (b) and (d) of FIG. 31 are views illustrating signal distributions corresponding to (a) and (c) of FIG. 31, respectively.

FIG. 32 is a view illustrating each of relationships between (i) electrode arrangement of the transmitting device and of the receiving device and (ii) a signal distribution obtained when contact of the transmitting device or approach thereof is detected.

Figure 33:
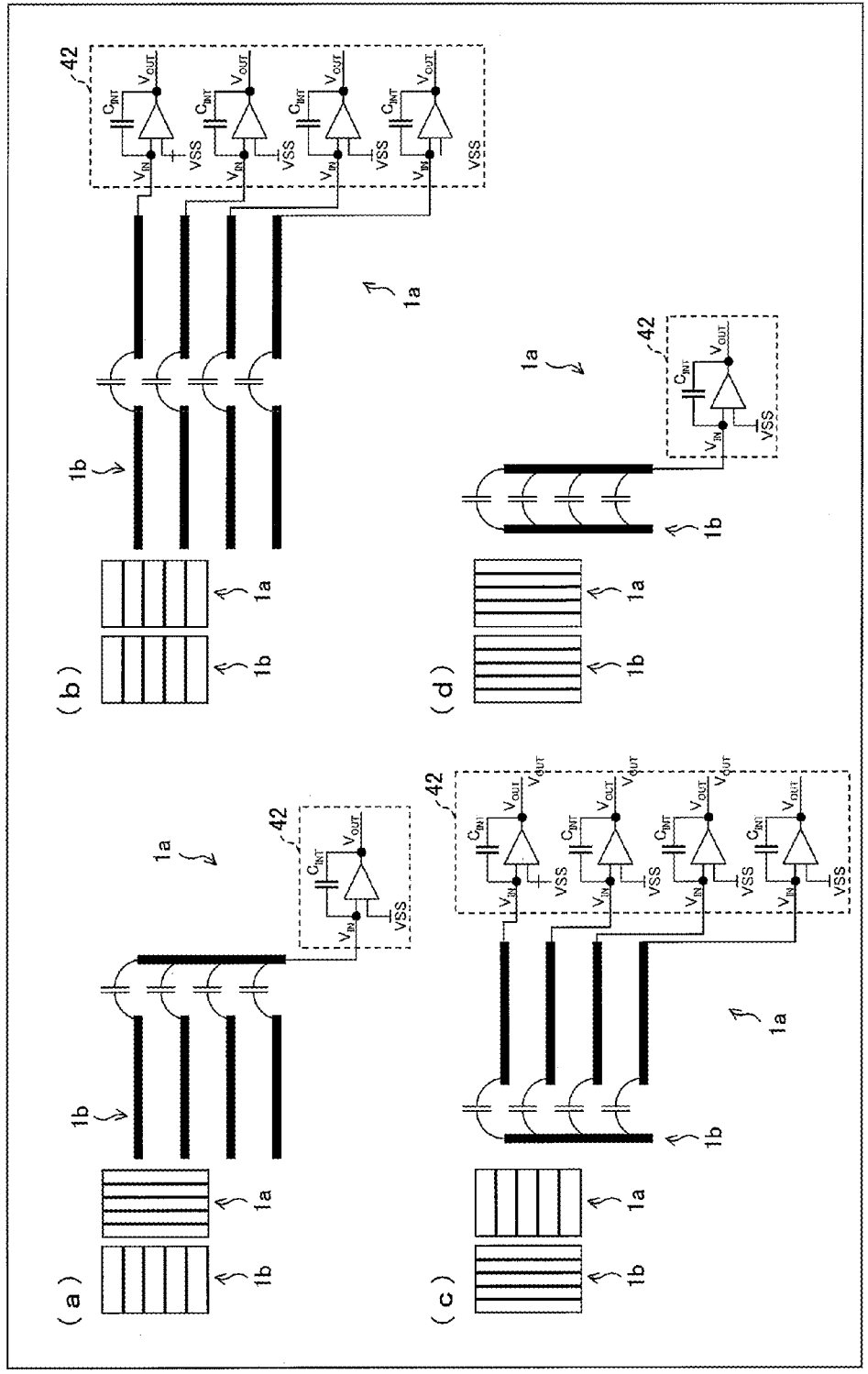

(a) through (d) of FIG. 33 illustrate equivalent circuits corresponding to cases 1 to 4 illustrated in FIG. 32, respectively, when contact of the transmitting device or approach thereof is detected.

FIG. 34 is a view illustrating each of relationships between (i) electrode arrangement of the transmitting device and of the receiving device and (ii) a signal distribution obtained when contact of the transmitting device or approach thereof is detected.

Figure 35:
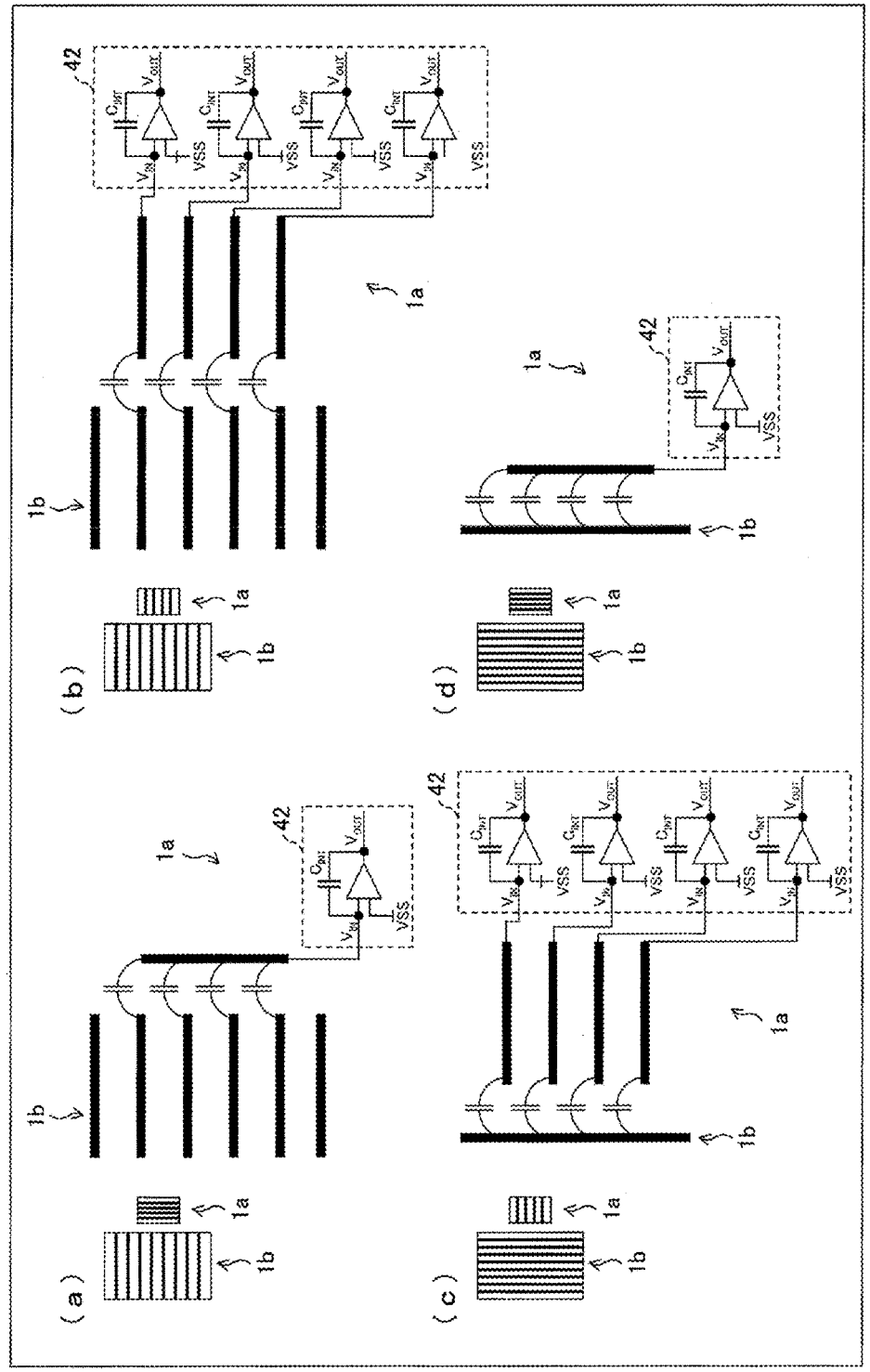

(a) through (d) of FIG. 35 illustrate example equivalent circuits corresponding to cases 1 to 4 illustrated in FIG. 34, respectively, when contact of the transmitting device or approach thereof is detected.

FIG. 36 is a view illustrating each of relationships between (i) electrode arrangement of the transmitting device and of the receiving device and (ii) a signal distribution obtained when contact of the transmitting device or approach thereof is detected.

Figure 37:
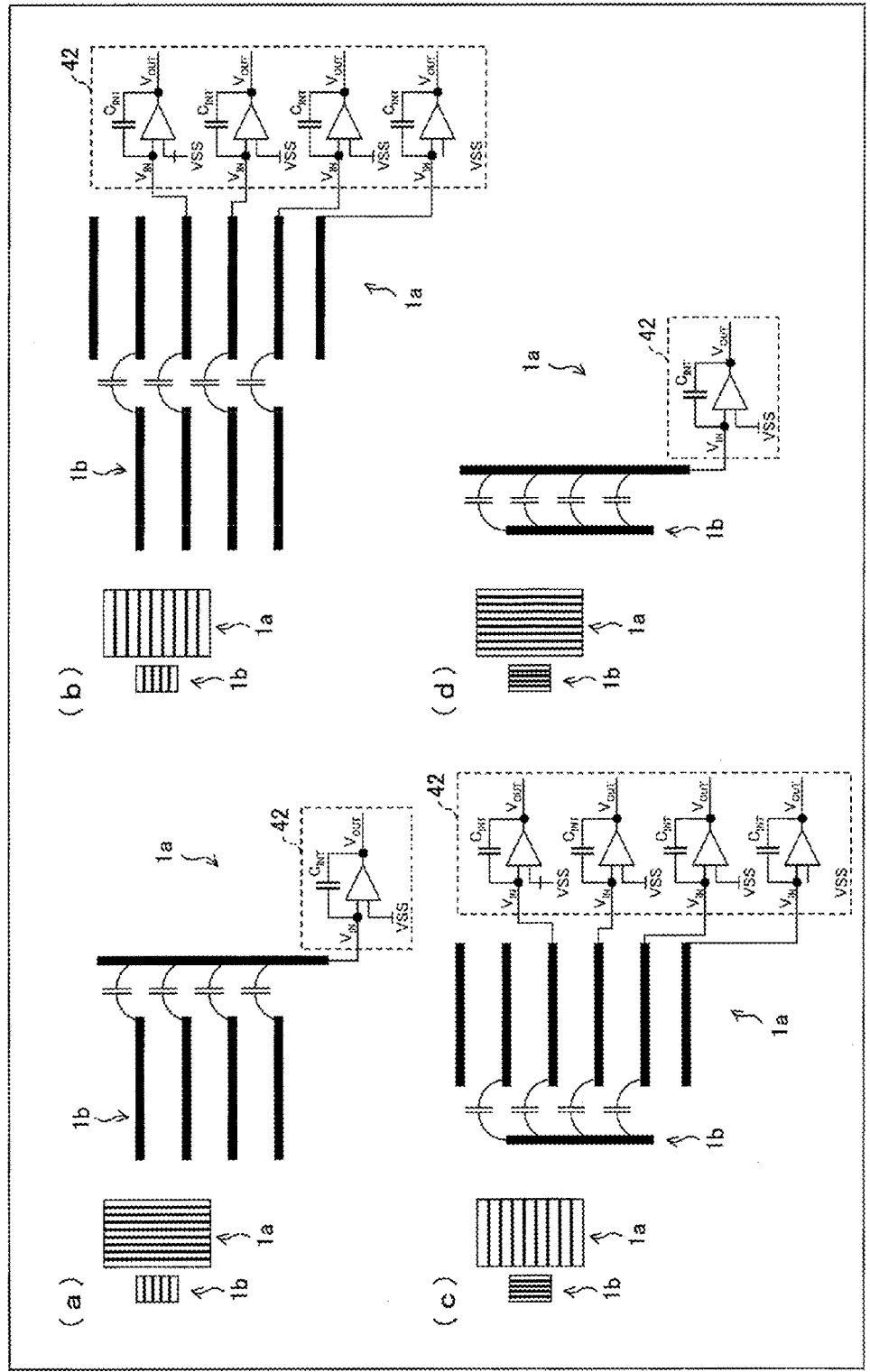

(a) through (d) of FIG. 37 illustrate example equivalent circuits corresponding to the cases 1 to 4 illustrated in FIG. 36, respectively, when contact of the transmitting device or approach thereof is detected.

Figure 13:
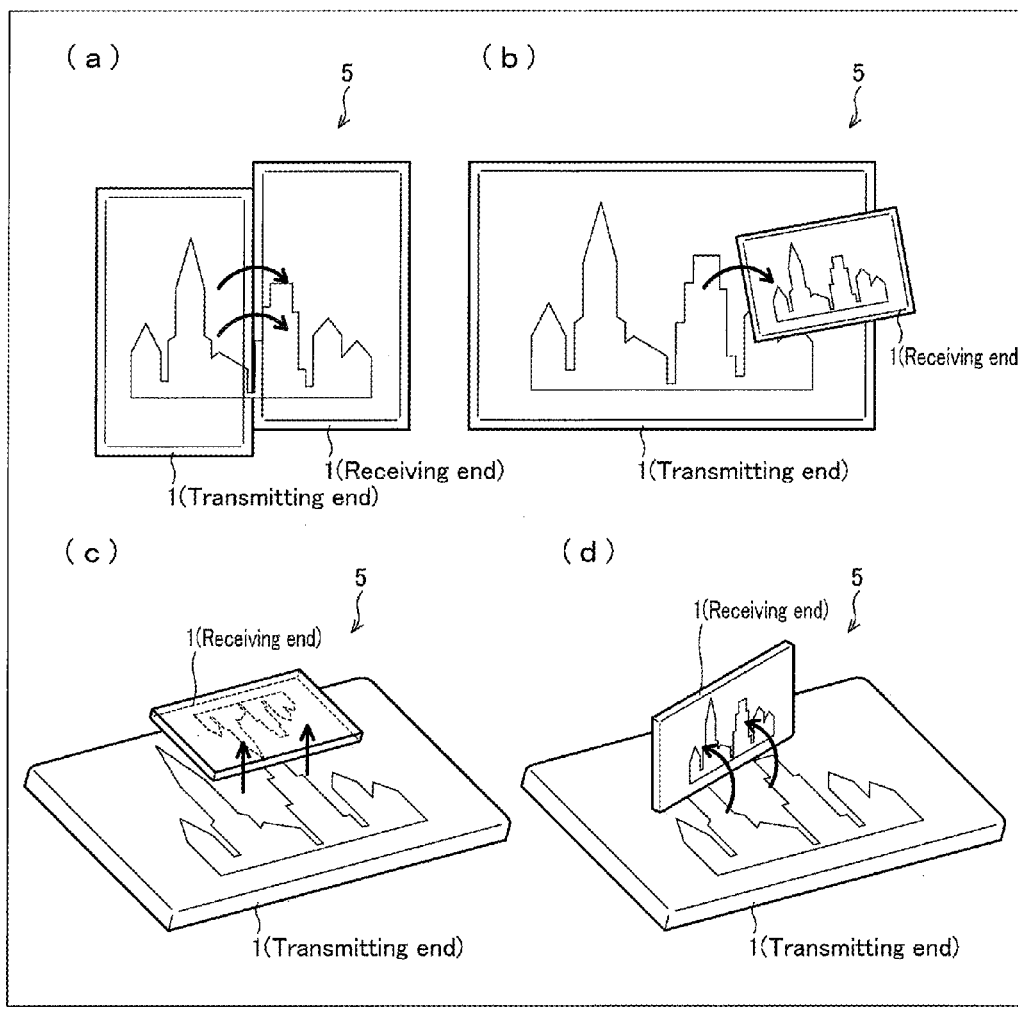
FIG. 13 is a view illustrating an example information processing system including the display devices, where (a) to (d) of FIG. 13 each illustrate an example positional relation between the display devices.
Figure 38:
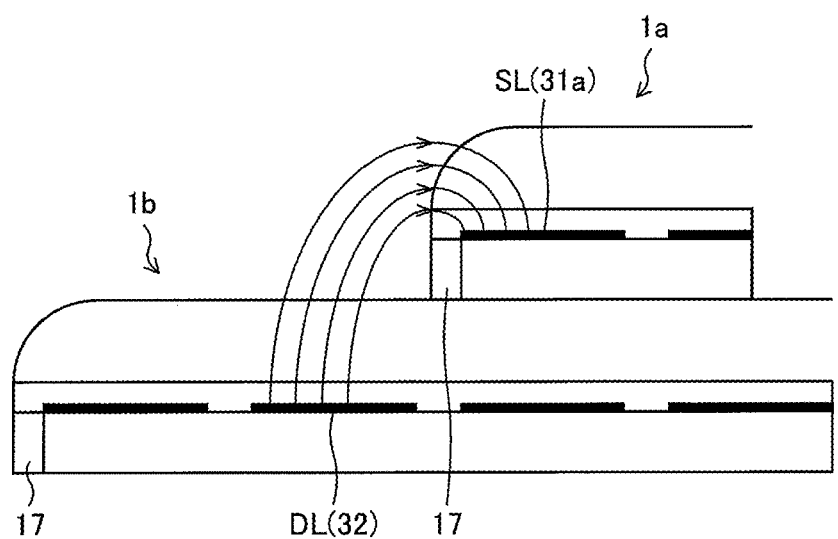

FIG. 38 is a cross-sectional view schematically illustrating the transmitting device and the receiving device in the state illustrated in (b) of FIG. 13.

Figure 39:
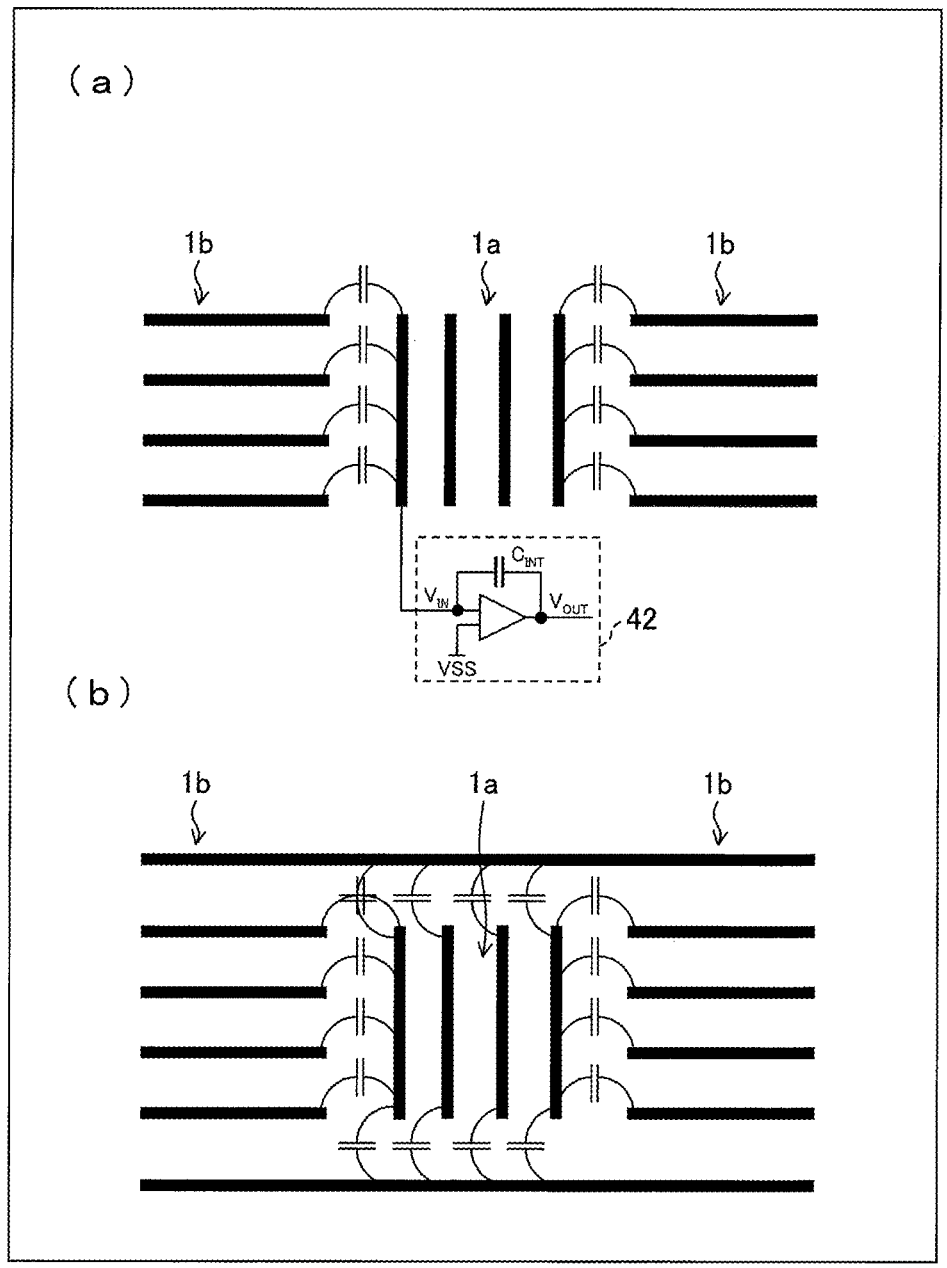

(a) and (b) of FIG. 39 are views illustrating equivalent circuits in cases where the receiving device comes into contact with or approaches the transmitting device so as to be placed on or over the transmitting device.

FIG. 40 is a view illustrating each of relationships between (i) electrode arrangement of the transmitting device and of the receiving device and (ii) a signal distribution obtained when contact of the transmitting device or approach thereof is detected.

Figure 41:
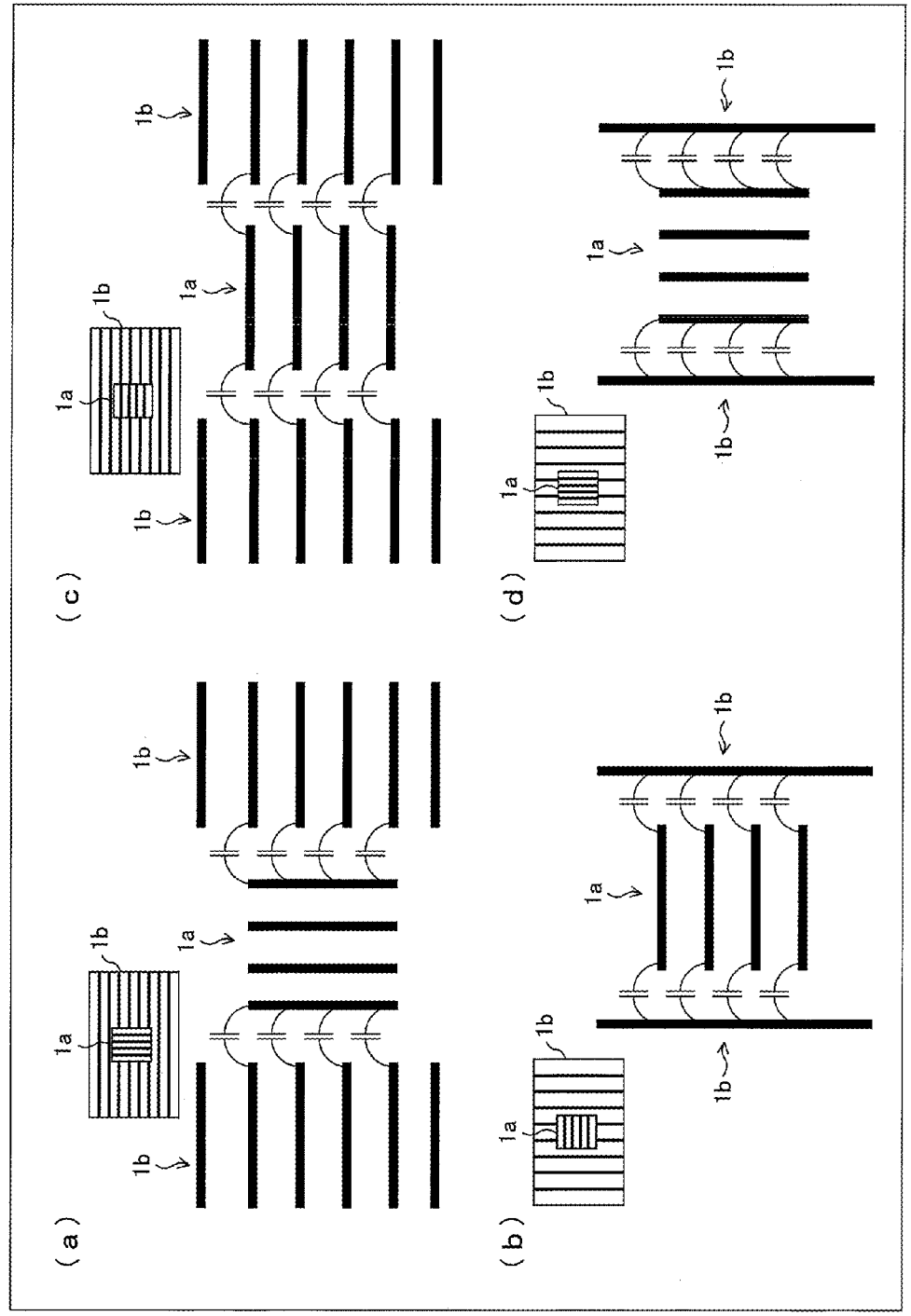

(a) through (d) of FIG. 41 illustrate example equivalent circuits corresponding to the cases 1 to 4 illustrated in FIG. 40, respectively, when the contact of the transmitting device or approach thereof is detected.

FIG. 42 is a view illustrating each of relationships between (i) electrode arrangement of the transmitting device and of the receiving device and (ii) a signal distribution obtained when contact of the transmitting device or approach thereof is detected.

Figure 43:
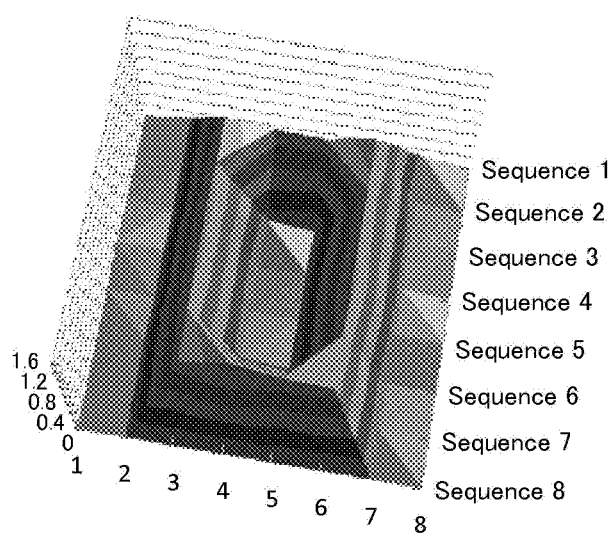

FIG. 43 is a view illustrating an example signal distribution obtained at the position detection.

Figure 44:
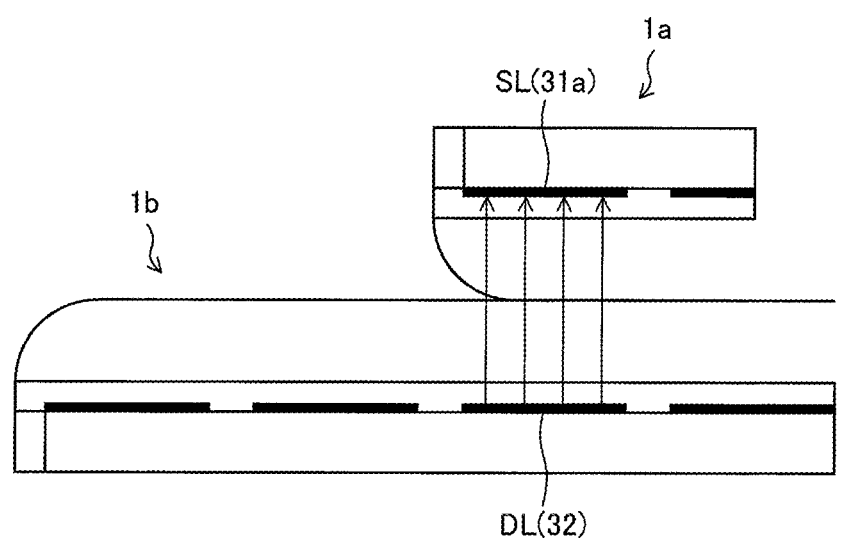

FIG. 44 is a cross-sectional view schematically illustrating the transmitting device and the receiving device in the state illustrated in (c) of FIG. 13.

Figure 45:
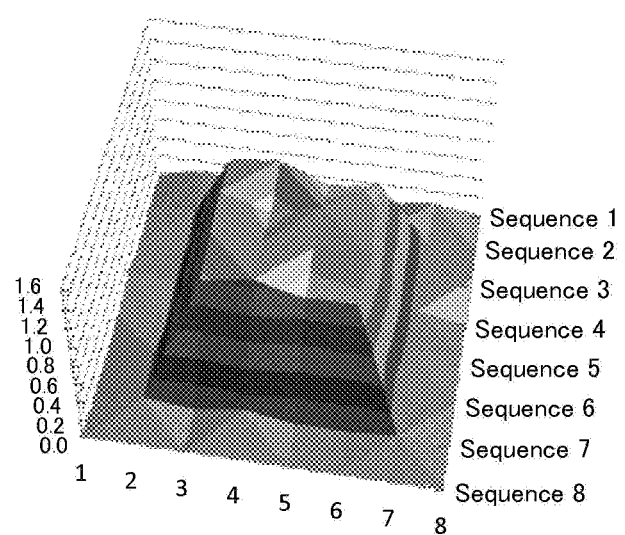

FIG. 45 is a view illustrating an example signal distribution obtained at the position detection.

Figure 46:
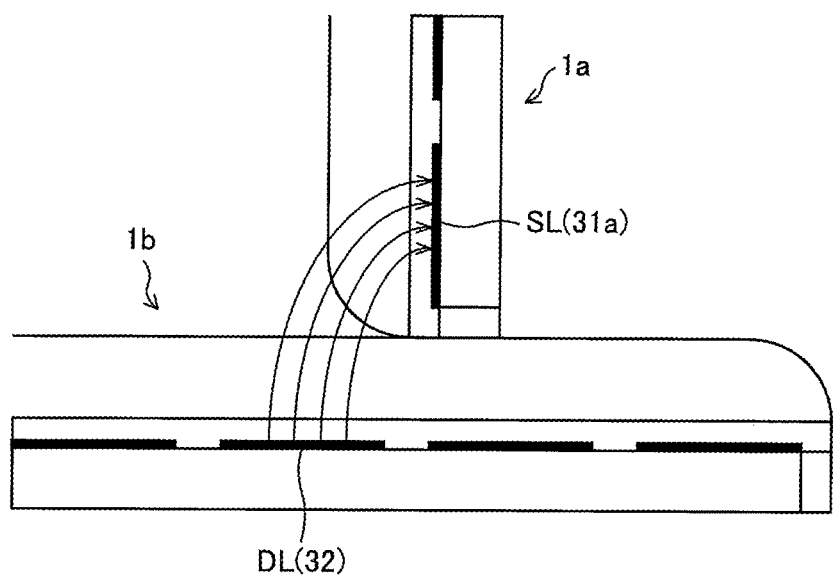

FIG. 46 is a cross-sectional view schematically illustrating the transmitting device and the receiving device in the state illustrated in (d) of FIG. 13.

Figure 47:
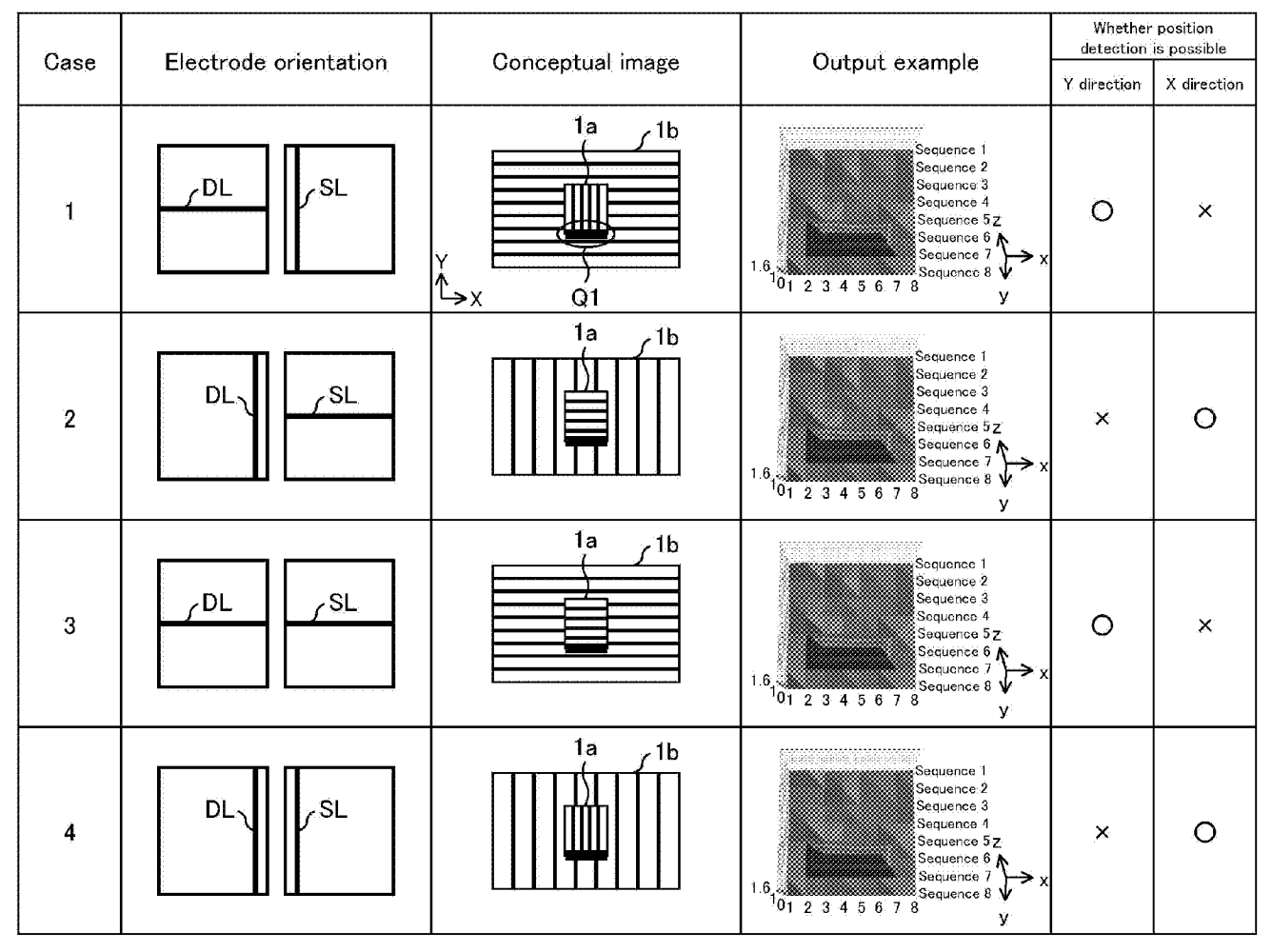

FIG. 47 is a view illustrating each of relationships between (i) electrode arrangement of the transmitting device and of the receiving device and (ii) a signal distribution obtained when contact of the transmitting device or approach thereof is detected.

FIG. 48 is a view illustrating each of relationships between (i) electrode arrangement of the transmitting device and of the receiving device and (ii) a signal distribution obtained when contact of the transmitting device or approach thereof is detected.

Figure 49:
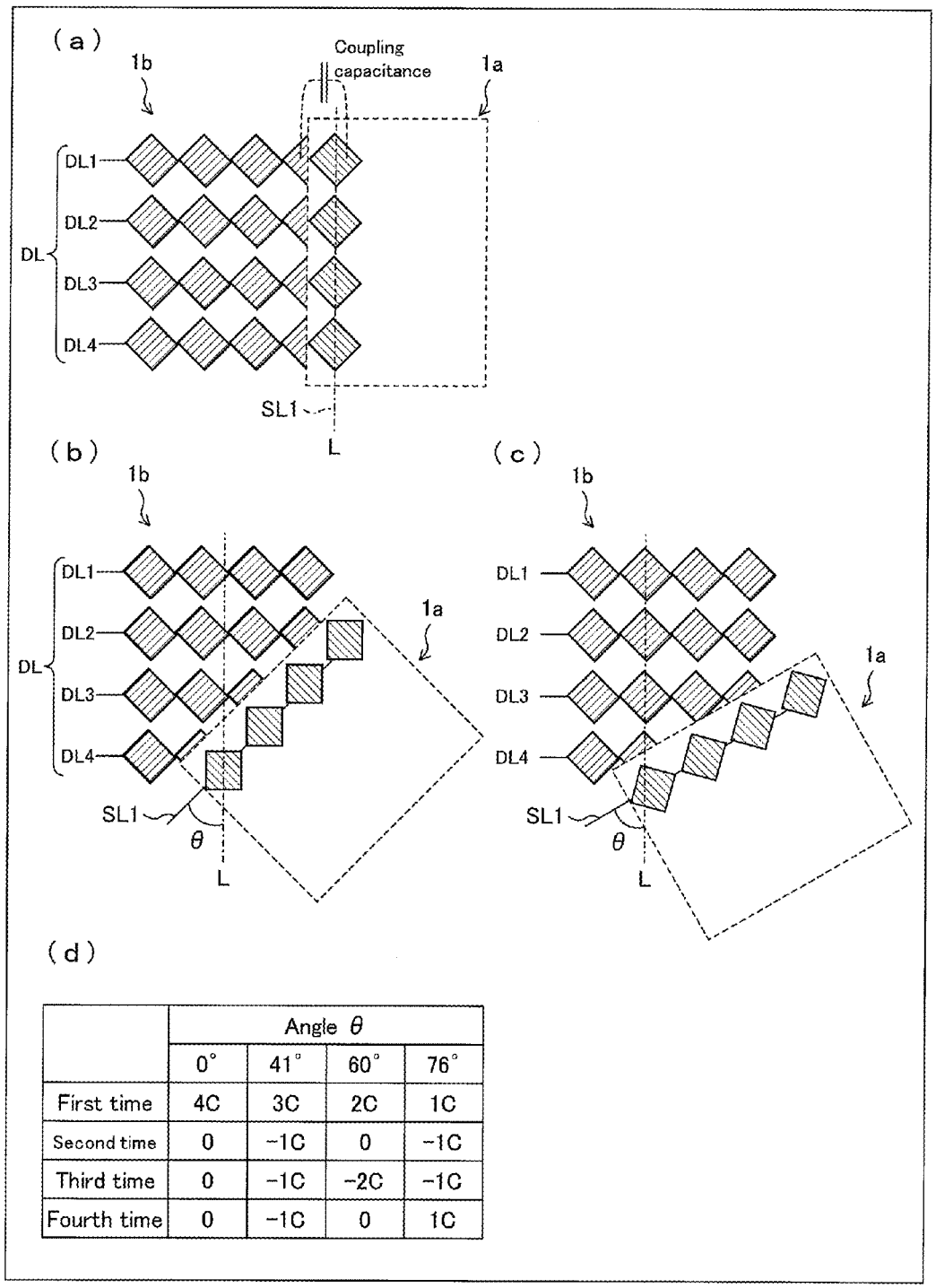

(a) through (c) of FIG. 49 are each a view illustrating a positional relation between the transmitting device and the receiving device, and (d) of FIG. 49 is a view illustrating an example tilt detection table.

Figure 50:
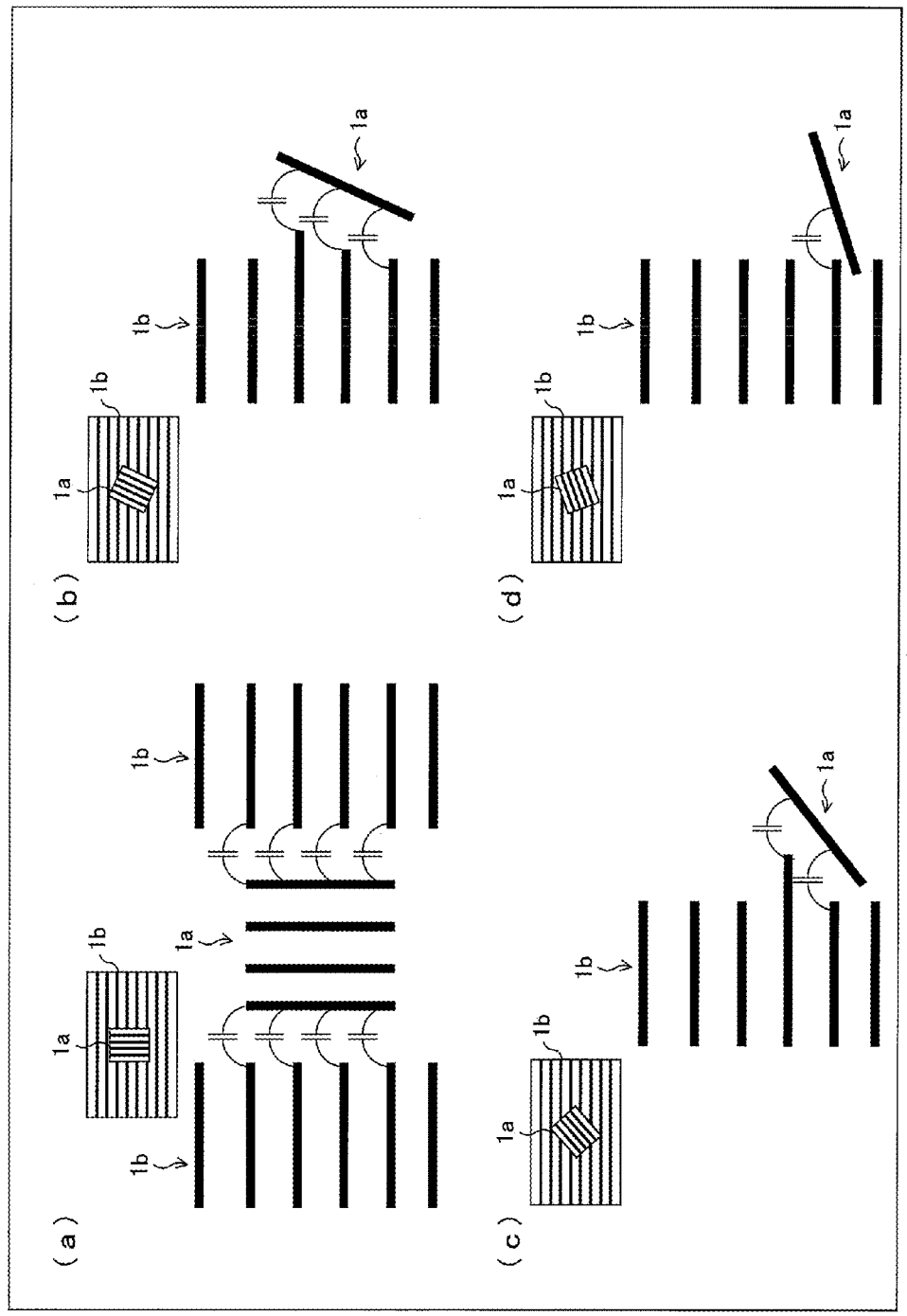

(a) through (d) of FIG. 50 are views illustrating example equivalent circuits that correspond to respective angels shown in (d) of FIG. 49.

Figure 51:
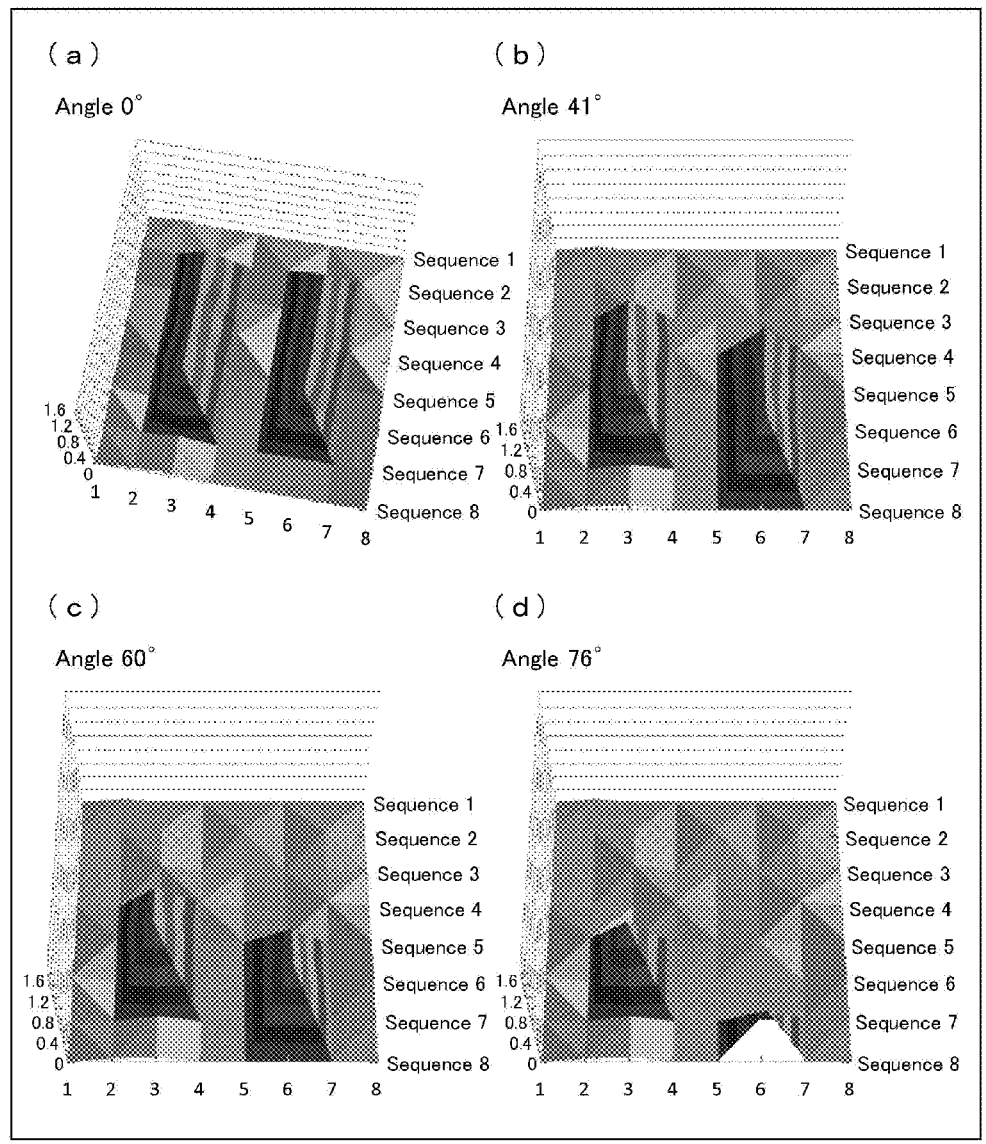

(a) through (d) of FIG. 51 are views illustrating example signal distributions corresponding to the respective angles shown in (d) of FIG. 49.

Figure 52:
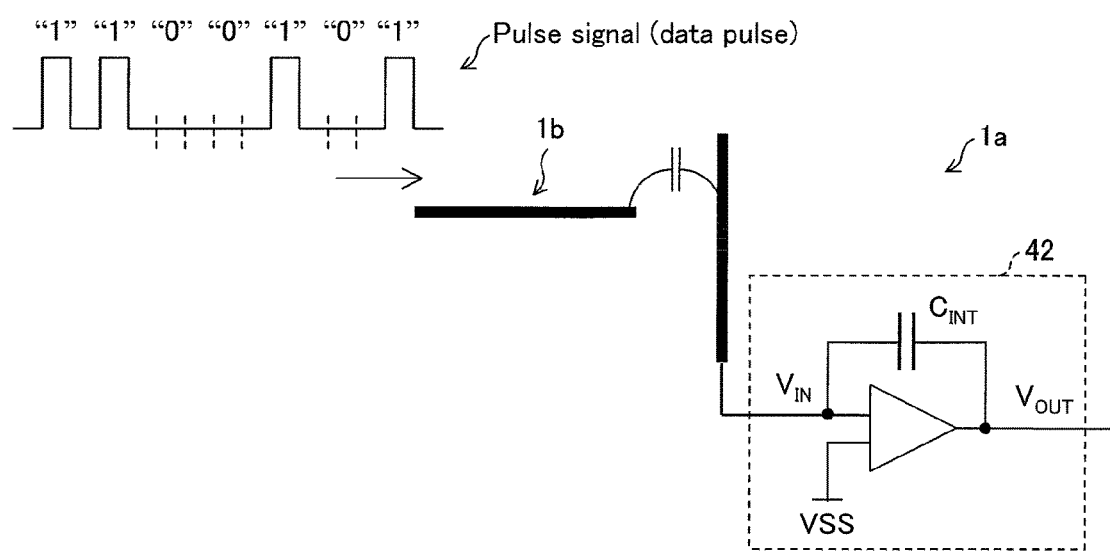

FIG. 52 is a view illustrating an equivalent circuit showing data communications between the touch panels.

Figure 53:
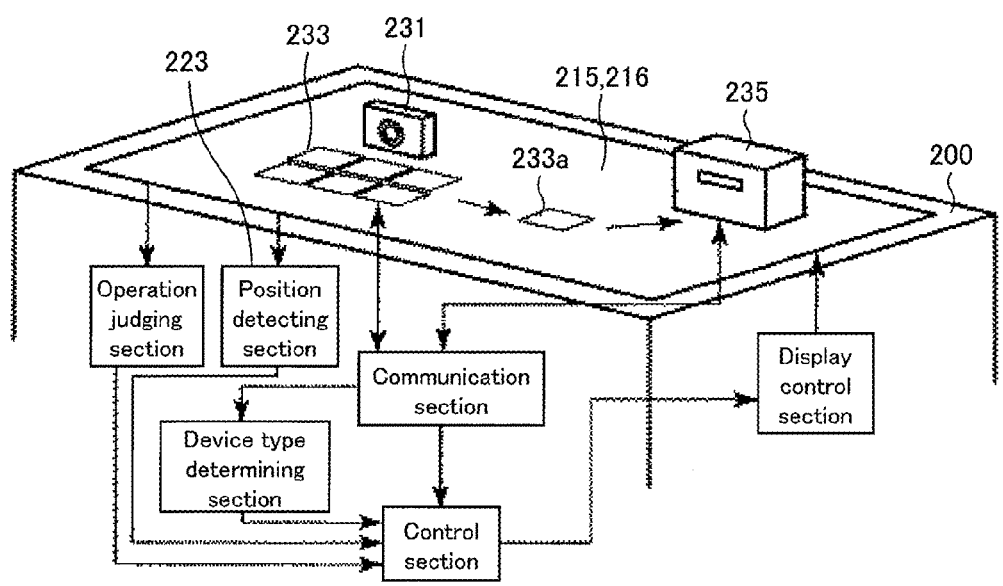

FIG. 53 is a view illustrating an example conventional table-type screen device.

DESCRIPTION OF EMBODIMENTS

An embodiment of the present invention is described below with reference to FIGS. 1 through 52.

[Overview of Embodiment 1]

With reference to FIG. 13, the description below first deals with an information processing system 5 including two display devices 1 (electronic devices) which include their respective touch panels 14 (which will be described later). It should be noted that the display devices 1 can be replaced by display devices 2 or 3 (electronic devices) which will be described later.

Specifically, when one display device 1 (on a receiving end) detects contact of the other display device (on a transmitting end) or approach thereof, a touch panel of the one display device 1 receives (senses) a drive signal having been applied to a touch panel of the other display device 1. Then, the one display device (on the receiving end) determines which of detection electrodes has received the drive signal in order to accurately detect a position of the other display device (on the transmitting end) relative to the one display device (on the receiving end).

In other words, the information processing system 5 constitutes a position detection system including the two display devices.

FIG. 13 is a view schematically illustrating a positional relation between the two display devices 1. As illustrated in FIG. 13, examples of a manner of contact of the two display devices 1 with each other or approach thereof to each other, for example, include the following four patterns:

(i) Side surfaces (end surfaces) of the display devices 1 are adjacent to each other (see (a) of FIG. 13).

(ii) The two display devices 1 overlap each other, while a display region of one of the display devices 1 faces a back surface of the other display device 1 (a surface of a casing which surface is opposite to the display region of the one display device) (see (b) of FIG. 13).

(iii) The two display devices 1 overlap each other, while display regions of the two display devices 1 face each other (see (c) of FIG. 13).

(iv) A side surface of the one display device 1 is adjacent to the other display device 1 (the one display device 1 is placed in an upright position on the other display device 1) (see (d) of FIG. 13).

Although the two display devices 1 shown in (a) of FIG. 13 are identical in shape and size, they may be different in shape and size. Similarly, although the two display devices 1 shown in (b) through (d) of FIG. 13 are different in shape and size, they may be identical in shape and size. The two display devices 1 shown in (a) of FIG. 13 and the smaller display devices 1 in (b) through (d) of FIG. 13 are assumed to be portable terminals or tablet computers, whereas the larger display devices 1 shown in (b) through (d) of FIG. 13 are assumed to be displays or monitors. However, this is not the only possibility.

Further, as to the relation illustrated in FIG. 13, the display devices 1 on the receiving end and the display device 1 on the transmitting end may be reversed.

The description below specifically deals with a configuration of the device which performs the position detection, a method of driving that device, and others in the above four patterns. Firstly, example display devices 1 which can be a transmitting-end device and a receiving-end device will be described below.

[Main Arrangements of Display Device 1 and Others]

The description below first deals with respective main arrangements of display devices 1 to 3 with reference to FIGS. 2 through 7. The description below assumes that the display devices 1 to 3 are each a liquid crystal display. The present invention is, however, not limited to such an arrangement: The display devices 1 to 3 may each be such a display device as a plasma display, an organic EL display, or a field emission display. The description below further assumes, unless otherwise stated, that the display devices 1 to 3 are each a plate-shaped member having a rectangular upper surface. The present invention is, however, not limited to such an arrangement: The display devices 1 to 3 may each have, for example, an elliptic or circular upper surface, or may each be not a plate-shaped member but a member having projections and depressions on a surface thereof. In other words, the display devices 1 to 3 may each have any shape as long as the display devices 1 to 3 are arranged to be capable of performing functions described below.

<Display Device 1 (Portable Terminal)>

Figure 3:
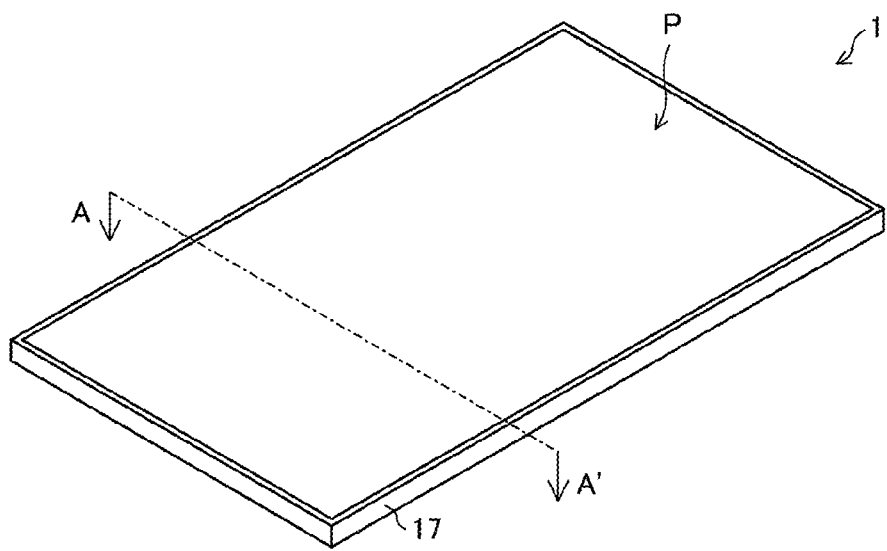
FIG. 3 is a perspective view of a portable terminal including the display device illustrated in (a) of FIG. 2, the perspective view schematically illustrating an example configuration of the portable terminal.
Figure 4:
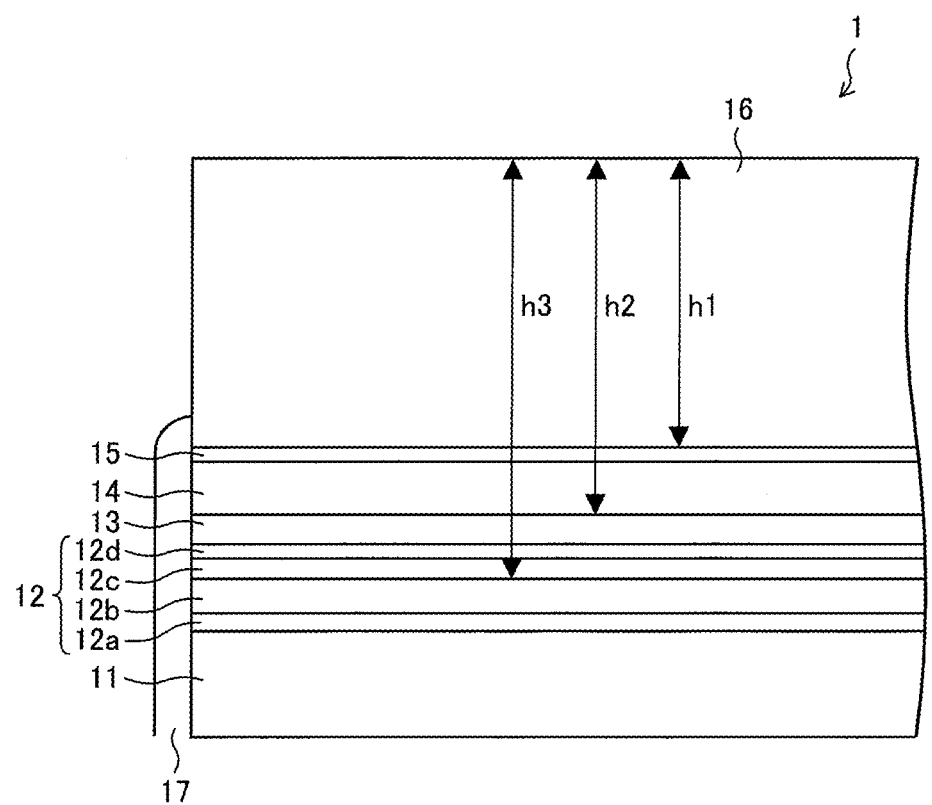
FIG. 4 is a cross-sectional view of the display device illustrated in (a) of FIG. 2, the cross-sectional view schematically illustrating an example configuration of the display device.

With reference to FIGS. 3 and 4, the description below deals with a case in which the display device 1 is included in a portable terminal (or the display device 1 functions as a portable terminal). FIG. 3 is a perspective view of a portable terminal including the display device 1, the perspective view schematically illustrating an example configuration of the portable terminal. FIG. 4 is a cross-sectional view of the display device 1 illustrated in FIG. 3, the cross-sectional view being taken along line A-A' and schematically illustrating an example configuration of the display device 1.

The display device 1 as a portable terminal displays an image, and is capable of accepting an input operation on an image. As illustrated in FIG. 3, the display device 1 has a shape defined by a casing 17 and displays an image in a display region P of a display screen (display panel 12).

More specifically, the display device 1, as illustrated in FIG. 4, includes a backlight 11, and further includes on the backlight 11 a display panel 12, a transparent adhesive layer (optical clear adhesive; OCA) 13, a touch panel 14 (operation detecting member), a transparent adhesive layer 15, and a cover glass 16 stacked on one another in that order. These members are supported by the casing 17 of the display device 1. In other words, the casing 17 contains the display panel 12 and the touch panel 14. Further, the display panel 12 and the touch panel 14 are incorporated into the casing 17.

The display panel 12 can be a known display panel. The display panel 12 includes, for example, (i) an insulating active matrix substrate (not shown) made of a material such as glass, (ii) a light-transmitting counter substrate (not shown) made of a material such as glass and facing the active matrix substrate as separated therefrom by a predetermined distance, and (iii) a liquid crystal layer sandwiched between the active matrix substrate and the counter substrate. The liquid crystal layer can be any of various types of liquid crystal layers. The example of FIG. 4 includes (i) a TFT layer 12*b* having thin film transistors (TFTs) and (ii) two polarizing plates 12*a* and 12*d* sandwiching the TFT layer 12*b*. This allows a tone display of an image. The display panel 12 further includes a color filter 12*c* on the counter substrate side. This allows a color display.

The display panel 12 includes (i) data signal lines extending in a column direction, (ii) scanning signal lines and capacitor lines both extending in a row direction, and (iii) pixels arranged in a matrix on the row and column directions. The data signal lines and scanning signal lines are provided on the active matrix substrate.

The pixels are identical to one another in structure: Each pixel corresponds to at least one pixel electrode, a single data signal line, a single scanning signal line, and a single capacitor line. The pixels are each so configured that on the active matrix substrate, the pixel electrode is connected to the corresponding data signal line via a thin film transistor included in the TFT layer 12*b* and connected to the corresponding scanning signal line. The pixel electrode, together with a counter electrode provided on the counter substrate, forms a liquid crystal capacitor between the counter electrode and itself.

The thin film transistor for each pixel has a source electrode connected to the pixel electrode, a drain electrode connected to the data signal line, and a gate electrode connected to the scanning signal line. This configuration allows (i) the transistor to be controlled to turn on and off in response to a scanning signal (gate signal) supplied from the scanning signal line, (ii) a voltage corresponding to a data signal supplied to the data signal line to be applied to the liquid crystal layer, and (iii) that voltage to be retained while the transistor is off.

The display panel 12 is controlled by various driving circuits and a display control circuit (not shown) included in the display device 1. Such various driving circuits include, for example, a data signal line driving circuit and a scanning signal line driving circuit. Controlling the display panel 12 with use of the above circuits allows an image to be displayed on the display region P.

More specifically, the display control circuit, upon detection of image display timing on the basis of a timing control signal supplied from a timing controller, generates, on the basis of display data and a sync signal both inputted from outside, a display control signal for causing an image (video) to be displayed by the display panel 12. The display control circuit then supplies the display control signal generated to various driving circuits to control their respective operations.

The scanning signal line driving circuit supplies scanning signals (gate signals) sequentially to the scanning signal lines on the basis of the display control signal outputted from the display control circuit. This operation turns on any transistor whose gate electrode corresponds to a portion of a scanning signal line that has been supplied with a scanning signal.

The data signal line driving circuit supplies data signals to the data signal lines on the basis of the display control signal. This operation causes voltages corresponding to the data signals to be applied to the liquid crystal layer via any transistor in the on state, so that image information is written into the liquid crystal layer.

The backlight 11 emits display light into the display panel 12. The backlight 11 may be external to the display device 1.

The touch panel 14 is provided so as to overlap the display panel 12, and is a member for at least detecting (i) contact of a detection target object (target object) such as a finger (or thumb [the same applies hereinafter]) of the user's and a stylus pen with the display region P of the display panel 12 or (ii) approach of the detection target object to the display region P. The touch panel 14 thus accepts an input operation performed by the user on an image displayed in the display region P and makes it possible to control execution of predetermined functions (various applications) on the basis of input operations.

The touch panel 14 of the present embodiment is, for example, a capacitive touch panel.

The display panel 12 and the touch panel 14 are separated from each other by a transparent adhesive layer 13, with which the display panel 12 and the touch panel 14 are fixed. The transparent adhesive layer 13 may be replaced with an air layer (air gap). This arrangement, however, increases reflection at the interface between the transparent adhesive layer 13 and the touch panel 14. Thus, in the case where the display device 1 is used in an environment with external light, the display device 1 may suffer from such disadvantages as a decrease in the contrast of the displayed image. Using a transparent adhesive layer 13 as in the present embodiment can improve the optical properties of the display device 1. Using a transparent adhesive layer 13 can further improve controllability over the respective thicknesses (gaps) of the individual layers. The display device 1 of the present embodiment, therefore, preferably includes a transparent adhesive layer 13.

Later descriptions will deal with how the touch panel 14 is arranged, how the touch panel 14 is driven, and others.

The transparent adhesive layer 15 is provided between the touch panel 14 and the cover glass 16, and fixes the touch panel 14 and the cover glass 16.

The cover glass 16 is a transparent plate-shaped member so provided as to cover the touch panel 14 to protect the touch panel 14 from the outside. The cover glass 16 of the present embodiment is rectangular in shape. The present invention is, however, not limited to such an arrangement:

The cover glass 16 may have a cutout shape at an end (outer edge). This arrangement can reduce the distance from the outer edge of the cover glass 16 to an outer edge electrode group of the touch panel 14, that is, an electrode group of detection electrodes 31a and drive electrodes 32a (see FIG. 2). The above arrangement can thus increase the detection accuracy at an outer edge of the display device 1, that is, an outside surface A of the display device 1 which outside surface A is separate from the display region P (see FIG. 2).

The casing 17, as mentioned above, contains the display panel 12 and the touch panel 14. The casing 17 includes a material having a large dielectric constant. This "material having a large dielectric constant" refers to a material having a dielectric constant that allows the touch panel 14 to easily detect contact of a finger or the like with the outer edge of the display device 1 or approach thereof to the outer edge.

Specifically, the casing 17 is made of the same glass as the cover glass 16 with a relative permittivity of approximately 6. (The touch panel 14 is also made of the same glass. In the case of a display device 2 described below, the casing 17 is made of the glass of which a lens 18 is made.) The material of the casing 17 is, however, not limited to that, and may be another resin having a relative permittivity of approximately 3. The casing 17 is, in other words, preferably made of a material having a relative permittivity that facilitates the above detection, that is, a relative permittivity of 3 or more (preferably 6 or more).

Using such a material having a large dielectric constant for the casing 17 can increase the detection accuracy at the outer edge of the display device 1.

In the case where the display device 1 is used as a portable terminal, the individual members included in the display device 1 have, as examples, respective thicknesses specified below.

The backlight 11 has a thickness of 0.74 mm. The polarizing plate 12a has a thickness of 0.15 mm. The TFT layer 12b has a thickness of 0.25 mm. The color filter 12c has a thickness of 0.15 mm. The polarizing plate 12d has a thickness of 0.11 mm. The transparent adhesive layer 13 has a thickness of 0.2 mm. The touch panel 14 has a thickness of 0.4 mm. The transparent adhesive layer 15 has a thickness of 0.1 mm. The cover glass 16 has a thickness h1 of 2 mm. Further, the cover glass 16 has a front surface separated from the interface between the touch panel 14 and the transparent adhesive layer 13 by a distance (thickness) h2 of 2.5 mm. The front surface of the cover glass 16 is separated from the interface between the color filter 12c and the TFT layer 12b by a distance (thickness) h3 of 2.96 mm.

The above thicknesses are, of course, mere examples, and vary as appropriate according to, for example, the size of a portable terminal to include the display device 1: For example, the display panel 12 has a thickness of 0.86 mm, which may alternatively be approximately 0.7 mm. The touch panel 14 may also have a thickness of approximately 0.7 mm. The casing 17 has a length (width) along a horizontal direction which length is, as described below, not larger than a length that allows the touch panel 14 to detect (i) contact of a finger or the like with an outside surface (end surface) of the casing 17 or (ii) approach thereof to the outside surface.

<Display Device 2 (Portable Terminal)>

Figure 5:
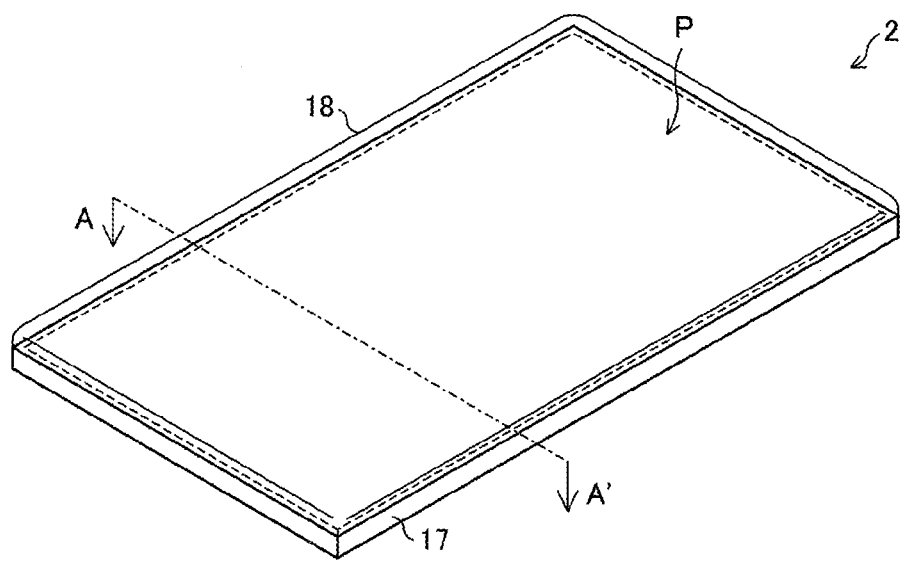
FIG. 5 is a perspective view of a portable terminal including the display device illustrated in (b) of FIG. 2, the perspective view schematically illustrating an example configuration of the portable terminal.
Figure 6:
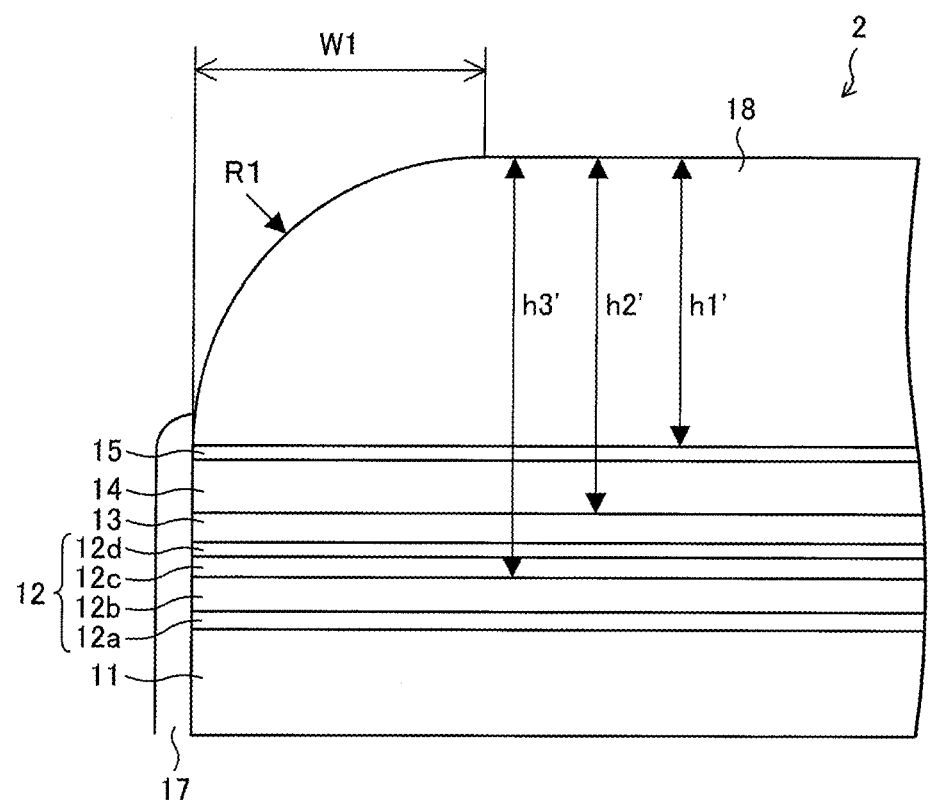
FIG. 6 is a cross-sectional view of the display device illustrated in (b) of FIG. 2, the cross-sectional view schematically illustrating an example configuration of the display device.

With reference to FIGS. 5 and 6, the description below deals with a variation of the portable terminal which variation includes a display device 2. FIG. 5 is a perspective view of a portable terminal including a display device 2 which portable terminal is a variation of the portable terminal illustrated in FIG. 3, the perspective view schematically illustrating an example configuration of the portable terminal including the display device 2. FIG. 6 is a cross-sectional view of the display device 2 illustrated in FIG. 5, the cross-sectional view being taken along line A-A' and schematically illustrating an example configuration of the display device 2.

As illustrated in FIGS. 5 and 6, the display device 2 is different from the display device 1 in that it includes a lens 18 instead of a cover glass 16, but is identical to the display device 1 in terms of the functions of the other members such as the display panel 12 and the touch panel 14. The description below thus mainly deals with how the display device 2 differs from the display device 1, and omits other points.

The display device 2, as illustrated in FIG. 6, includes a lens 18 above the touch panel 14. The lens 18 is a transparent plate-shaped member so provided as to cover the touch panel 14 to protect the touch panel 14 from the outside. The lens 18 has a cutout portion R1 (cutout shape) at an end (outer edge) to change the direction of travel of light emitted from the display panel 12.

Using a lens 18 having a cutout portion R1 can increase the detection accuracy of the touch panel 14 at the outer edge of the display device 2 as with the cover glass 16. Further, the cutout portion R1 changes the direction of travel of light emitted from pixels on an outer edge of the display panel 12 to allow such light to be emitted from a region (non-display region) located outside of the above pixels. The cutout portion R1 can thus increase the viewing angle of a display image (that is, a display region as viewed by the user). The lens 18 does not necessarily have a cutout portion R1 in the case where the function of increasing the viewing angle is unnecessary.

In the case where the display device 2 is used as a portable terminal, the individual members included in the display device 2 (other than the lens 18, which corresponds to the cover glass 16) have, as examples, respective thicknesses equal to those of the respective corresponding members of the display device 1. The lens 18 has a thickness h1' of 2.13 mm. The lens 18 has a front surface separated from the interface between the touch panel 14 and the transparent adhesive layer 13 by a distance (thickness) h2' of 2.63 mm. The front surface of the lens 18 is separated from the interface between the color filter 12c and the TFT layer 12b by a distance (thickness) h3' of 3.09 mm. Further, the cutout portion R1 has a width w1 of 2.1 mm. As with the display device 1, the above thicknesses are, of course, mere examples, and vary as appropriate according to, for example, the size of a portable terminal to include the display device 2.

The display device 1 or 2 is used for such portable terminals as multifunction mobile telephones (smart phones) and tablet computers. Additionally, the display device 1 or 2 is widely used for any device capable of displaying an image and accepting an input operation on the image, such as a television and a monitor.

[Detailed Configurations of Display Device 1 and Others]

Figure 2:
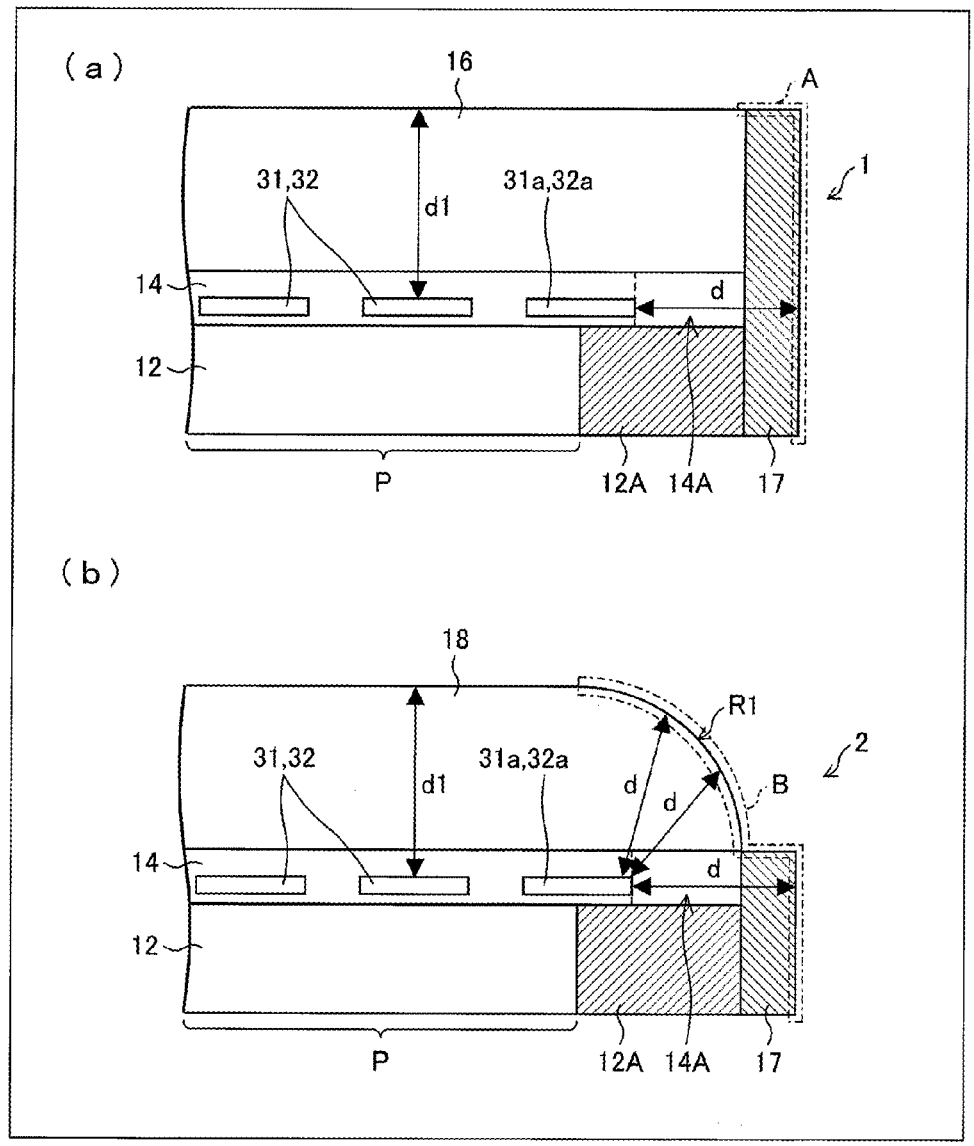
FIG. 2 shows cross-sectional views of a display device of an embodiment of the present invention, the cross-sectional views each schematically illustrating an example configuration of the display device, where (a) schematically illustrates a configuration with a cover glass, and (b) schematically illustrating a configuration with a lens.

The description below deals with detailed configurations of the display device 1 and others with reference to FIG. 2. FIG. 2 shows cross-sectional views of, for example, a display device 1 of an embodiment of the present invention, the cross-sectional views schematically illustrating example configurations of, for example, the display device 1, where (a) schematically illustrates a configuration of a display device 1 including a cover glass 16, and (b) schematically illustrates a configuration of a display device 2 including a lens 18.

<Display Device 1 (Portable Terminal)>

The description below first deals with a main configuration of the display device 1 with reference to (a) of FIG. 2. For simple descriptions, (a) of FIG. 2 omits illustrations of members such as the transparent adhesive layer 15 illustrated in FIG. 4.

The touch panel 14 includes, on a substrate, a detection electrode(s) 31 and a drive electrode(s) 32 as an electrode group for detecting contact or approach of a finger or the like. The electrode group includes a detection electrode(s) 31a and a drive electrode(s) 32a as an outer edge electrode group which are provided along an outer edge of the touch panel 14 (that is, the above substrate). In other words, out of the detection electrodes 31, which form a plurality of sense lines (SL) (see FIG. 14) of the touch panel 14, respectively, the detection electrode(s) 31a is the one provided along the outer edge of the touch panel 14.

As illustrated in (a) of FIG. 2, the display device 1 includes, (i) between the display panel 12 and the inside surface of the casing 17, a first wire containing section 12A capable of containing various wires of the display panel 12 and (ii) between the touch panel 14 and the casing 17, a second wire containing section 14A for containing various wires of the touch panel 14.

The display device 1 of the present embodiment is arranged such that the minimum distance d between the touch panel 14 and an outside surface A of the casing 17 (that is, an end surface of the casing 17) which outside surface A is separate from the display region P is not larger than a detectable distance, within which the touch panel 14 is capable of detecting (i) contact of a finger or the like with the outside surface A or (ii) approach thereof to the outside surface A. This configuration allows the touch panel 14 to detect (i) contact of a finger or the like with the outside surface A of the casing 17, the outside surface A being separate from the display region P, or (ii) approach thereof to the outside surface A. With the above configuration, the display device 1 does not necessarily detect contact of a finger or the like or approach thereof over an image displayed by the display panel 12. The display device 1 can therefore, without decreasing the viewability or operability of the image, accept an operation performed with a finger or the like.

The above arrangement allows the touch panel 14, which detects contact of a finger or the like with the display region P or approach thereof to the display region P, to detect (i) contact of a finger or the like with the outside surface A or (ii) approach thereof to the outside surface A. The above arrangement thus eliminates the need to additionally include a member (that is, a dedicated sensor) for detecting contact of a finger or the like with the outside surface A or approach thereof to the outside surface A. The above arrangement consequently makes it possible to detect (i) contact of a finger or the like with the outside surface A or (ii) approach thereof to the outside surface A without increasing the number of components of the display device 1 (that is, without complicating the detecting mechanism).

The minimum distance d corresponds, as illustrated in (a) of FIG. 2, to a first distance, which is specifically a distance between (i) the detection electrodes 31a and drive electrodes 32a as an outer edge electrode group provided on the touch panel 14 and (ii) the outside surface A. The first distance (minimum distance d) is preferably not larger than a second distance d1, which is a distance in a direction perpendicular to the display panel 12 between (i) the touch panel 14 (specifically, the detection electrodes 31 and drive electrodes 32) and (ii) an outside surface of the cover glass 16 (that is, an upper surface of the display device 1 with which surface a finger [or thumb] or the like comes into contact). This arrangement allows the touch panel 14 to reliably detect (i) contact of a finger or the like with the outside surface A of the casing 17 or (ii) approach thereof to the outside surface A.

The display device 1 is, in other words, designed so that the minimum distance d is defined to allow the touch panel 14 to detect (i) contact of a finger or the like with the outside surface A of the casing 17 or (ii) approach thereof to the outside surface A, and is thus designed to have a narrow frame (or to be frameless). This allows the touch panel 14 to sense (i) contact of a finger or the like with the outside surface A (that is, the outer edge [terminal edge] of the display device 1) or (ii) approach thereof to the outside surface A. Further, narrowing the frame can also improve the design of the display device 1.

The minimum distance d simply needs to be not larger than the detectable distance at least at an end surface of the casing 17, which end surface is a portion of the outside surface A of the casing 17. This arrangement allows the touch panel 14 to detect (i) contact of a finger or the like with at least such an end surface or (ii) approach thereof to at least such an end surface.

<Display Device 2 (Portable Terminal)>

The description below now deals with a main configuration of the display device 2 with reference to (b) of FIG. 2. For simple descriptions, (b) of FIG. 2 omits illustrations of members such as the transparent adhesive layer 15 illustrated in FIG. 6. The display device 2, as described above, differs from the display device 1 in that it includes a lens 18 instead of a cover glass 16.

The display device 2 is so designed that the minimum distance d between the touch panel 14 and an outside surface B of the casing 17 (that is, an end surface of the casing 17) which outside surface B is separate from the display region P is not larger than a detectable distance, within which the touch panel 14 is capable of detecting (i) contact of a finger or the like with the outside surface B or (ii) approach thereof to the outside surface B. This configuration, as with the configuration of the display device 1, allows the touch panel 14 to detect (i) contact of a finger or the like with the outside surface B of the casing 17, the outside surface B being separate from the display region P, or (ii) approach thereof to the outside surface B.

The outside surface B covers not only an outside surface of the casing 17 which outside surface corresponds to the outside surface A illustrated in (a) of FIG. 2, but also an outside surface of the cutout portion R1 of the lens 18. The present embodiment, in other words, defines the outside surface B of the casing 17 as covering the above two outside surfaces.

The minimum distance d (first distance) for the display device 2 is, as illustrated in (b) of FIG. 2, a distance between (i) the detection electrodes 31a and drive electrodes 32a as an outer edge electrode group provided on the touch panel 14 and (ii) the outside surface B. As with the display device 1, the minimum distance d is preferably not larger than the second distance d1, and simply needs to be not larger than the detectable distance at least at an end surface of the casing 17, which end surface is a portion of the outside surface B of the casing 17.

<Variation>

Figure 7:
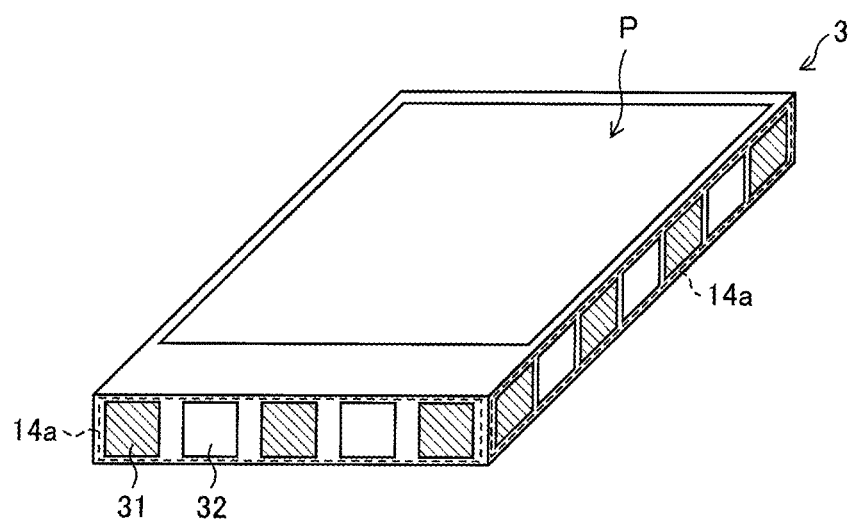
FIG. 7 is a perspective view of a display device according to a variation of an embodiment of the present invention, the perspective view schematically illustrating an example configuration of the display device.

With reference to FIG. 7, the description below deals with a main arrangement of the display device 3 according to a variation of the display devices 1 and 2.

As with the display devices 1 and 2, the display device 3 includes (although not shown in FIG. 7) (i) a display panel 12, (ii) a touch panel 14 (first operation detecting member) provided so as to overlap with the display panel 12 and configured to detect contact of a finger or the like with a display region P of the display panel 12 or approach thereof to the display region P, and (iii) a casing 17 containing the display panel 12 and the touch panel 14.

The display devices 1 and 2 are arranged such that the minimum distance d (see FIG. 2) is not larger than the detectable distance, within which the touch panel 14 is capable of detecting contact of a finger or the like with the outside surface A or B or approach thereof to the outside surface A or B, and eliminate the need to additionally include a member for detecting, for example, the contact with the outside surface A or B. The present invention is, however, not limited to such an arrangement. As with the display device 3 illustrated in (a) of FIG. 7, the touch panel 14 may be replaced with another member, that is, a touch panel 14a (second operation detecting member), to detect contact of a finger or the like with the outside surface A or B of the casing 17 or approach thereof to the outside surface A or B.

The display device 3 is, as described above, also arranged to detect (i) contact of a finger or the like with the outside surface A or B of the casing 17, the outside surface A or B being separate from the display region P, or (ii) approach thereof to the outside surface A or B. With the above configuration, the display device 3 does not necessarily detect contact of a finger or the like or approach thereof over an image displayed by the display panel 12. The display device 3 can therefore, without decreasing the viewability or operability of the image, accept an operation performed with use of a finger or the like.

The touch panel 14a illustrated in FIG. 7 includes detection electrodes 31 and drive electrodes 32 arranged alternately on a single line. The present invention is, however, not limited to such an arrangement. A touch panel alternative to the touch panel 14a may include electrodes on a plurality of lines, depending on the height of the end surface (side surface) of the casing 17, that is, the length of the casing 17 which length is in a direction perpendicular to the front surface of the cover glass 16 or lens 18 (that is, the upper surface of the display device 3). With this arrangement, intervals of the detection electrodes 31 and intervals of the drive electrodes 32 are smaller than those in the touch panel 14a illustrated in FIG. 7. This allows one device to detect the position of the counterpart device relative to the one device with a higher degree of accuracy.

Configurations of the touch panels 14 and 14a are similar to each other except for that arrangement. The description below takes the touch panel 14 as an example.

[Capacitive Touch Panel]

<Overview of Structure and Driving of Touch Panel>

Figure 8:
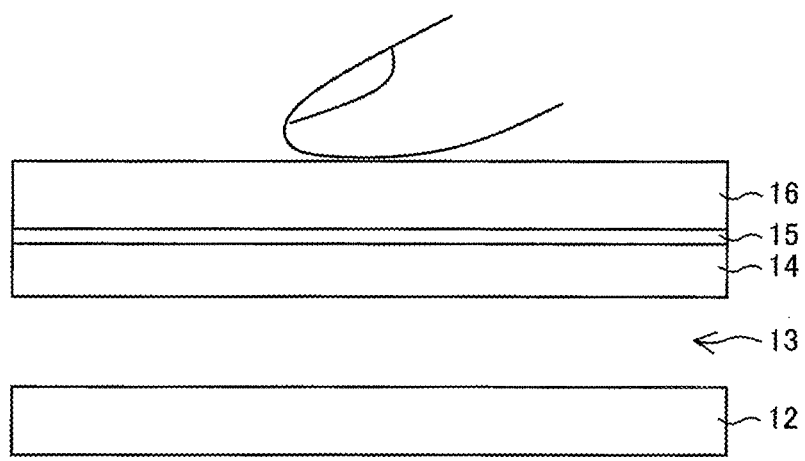
FIG. 8 is a cross-sectional view of a touch panel included in the display device, the cross-sectional view schematically illustrating a configuration of the touch panel.

The description below deals with a detailed arrangement of the touch panel 14 with reference to FIGS. 8 through 12. FIG. 8 is a cross-sectional view of the touch panel 14 included in the display device 1 and the like, the cross-sectional view schematically illustrating a configuration of the touch panel 14.

The display device 1 and the like each include a display panel 12, a transparent adhesive layer 13, a touch panel 14, a transparent adhesive layer 15, and a cover glass 16 (or lens 18) as described above. Stated differently, these components achieve a touch panel function.

The touch panel 14 of the present embodiment is preferably a capacitive touch panel. With the capacitive touch panel as employed, it is possible to perform, for example, (i) processing to detect the location of a counterpart device coming into contact or approaching the display device 1 or the like and (ii) processing to perform data communications with the counterpart device via the touch panel 14, as will be described later.

The touch panel 14 is not limited to the capacitive touch panel and can be any of various types of touch panels that can perform the aforementioned processing. The description below deals with a configuration in which a capacitive touch panel is included, in particular, a configuration in which an out-cell or on-cell touch panel is mounted on the outer side of the display panel 12. The out-cell or on-cell touch panel may be replaced by an in-cell touch panel. A capacitive touch panel detects a change in capacitance which change occurs in the case where a user has brought a finger, a stylus or the like into contact with a front surface of, for example, the display device 1 (specifically, a front surface of the cover glass 16 or lens 18, or the outside surface A or B), and thus detects the position of the contact. This arrangement makes it possible to detect the position of contact through a simple operation.

FIG. 9 shows diagrams each illustrating an example capacitive touch panel. (a) of FIG. 9 is a plan view of a touch panel, the plan view illustrating how electrodes of the touch panel are arranged. (b) of FIG. 9 is a cross-sectional view of the touch panel, the cross-sectional view being taken along line A-B shown in (a) of FIG. 9. (c) of FIG. 9 is a diagram illustrating an operation of the touch panel which operation is performed in the case where a finger (that is, a detection target object) has touched the touch panel.

FIG. 9 shows the reference numeral 21 to indicate a substrate made of a transparent insulator (dielectric), the substrate having a surface on which a plurality of detection electrodes 31 and a plurality of drive electrodes are provided. The surface on which the detection electrodes 31 and drive electrodes 32 are provided is covered by a cover glass 16. The cover glass 16 is made of an insulator (for example, a transparent glass) having a predetermined dielectric constant.

Although (a) of FIG. 9 does not illustrate details of the connection, the drive electrodes 32 are connected to one another for each row in the X-axis direction, whereas the detection electrodes 31 are connected to one another for each column in the Y-axis direction. Applying a driving voltage to the drive electrodes 32 and detection electrodes forms capacitances, as illustrated in (b) of FIG. 9, between the drive electrodes 32 and detection electrodes 31 through the substrate 21 and cover glass 16 to form lines of electric force as illustrated.

A fingertip 94 touching the front surface of the cover glass 16 with a driving voltage applied as above forms a capacitance 95 between (i) ground and (ii) the drive electrodes 32 and detection electrodes 31 through the human body as illustrated in (c) of FIG. 9, thereby causing part of the lines of electric force to be grounded through the fingertip 94. This indicates a large change in capacitance between the drive electrodes 32 and detection electrodes 31 at a portion at which the fingertip 94 has touched the front surface. The touch panel 14 can detect such a change to detect the position at which the fingertip 94 has touched the front surface.

The present embodiment can use a known circuit (see, for example, Patent Literature 2) as a position detecting circuit for detecting the coordinate position of a detection target object. The position detecting circuit is not limited to any particular circuit.

Figure 10:
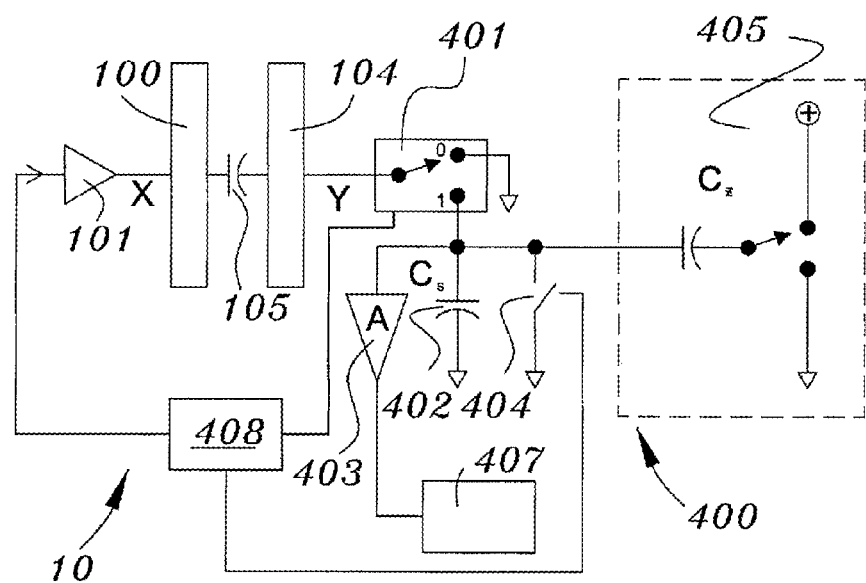
FIG. 10 is a circuit diagram illustrating a position detecting circuit for a mutual capacitive touch panel.
Figure 11:
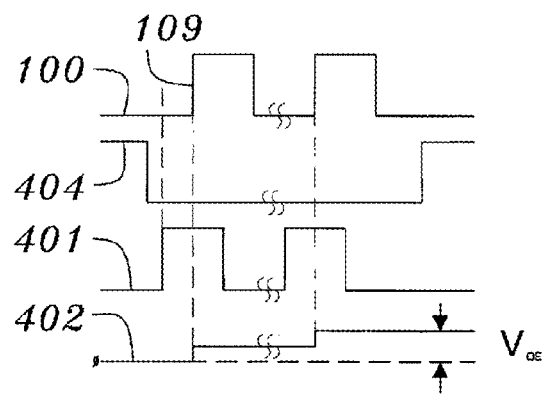
FIG. 11 is a timing chart illustrating an operation of the circuit illustrated in FIG. 9.

FIG. 10 is a circuit diagram illustrating a position detecting circuit for a mutual capacitive touch panel (which is a mainstream capacitive touch panel) disclosed in Patent Literature 2. FIG. 11 is a timing chart illustrating an operation of the circuit.

The circuit includes a transmitting electrode (drive electrode) 100 and a receiving electrode (detection electrode) 104 connected to each other through a cross capacitor 105. The circuit further includes on the receiving electrode side a switch 401, a storage capacitor 402 (corresponding to capacitance Cf), a reset switch 404, and an output amplifier 403. The transmitting electrode 100 generates a rectangular waveform 109 with the aid of an amplifier 101. The circuit is first reset, allows electric charge to be transferred and held repeatedly, and then measures a voltage difference. Specifically, since the cross capacitor 105 changes depending on whether a finger is in contact with the touch panel (for example, placing a finger on the touch panel reduces the cross capacitor), measuring a difference in an output voltage allows detection of a position at which a fingertip has touched the touch panel.

Other examples of an equivalent circuit of a mutual capacitive touch panel and a driving method of driving the mutual capacitive touch panel will be further described in detail with reference to FIGS. 14 through 19.

Figure 12:
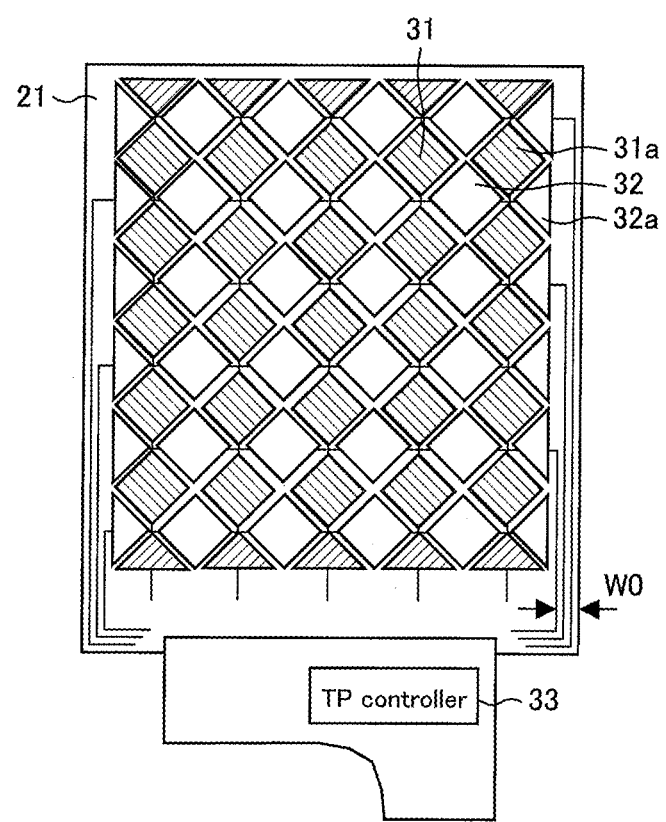
FIG. 12 is a top view of an example of the touch panel, the top view schematically illustrating the touch panel.

FIG. 12 is a top view of the touch panel 14 of the present embodiment, the top view schematically illustrating a configuration of the touch panel 14. The touch panel 14, as illustrated in FIG. 12, includes on the substrate 21 detection electrodes 31 and drive electrodes 32 arranged in a matrix as an electrode group for detecting contact of a finger or the like or approach thereof. The electrode group includes detection electrodes 31a and drive electrodes 32a as an outer edge electrode group which are provided along an outer edge of the touch panel 14 (that is, the substrate 21). The detection electrodes 31 and drive electrodes 32 (that is, the circuit illustrated in FIGS. 10 and 11) are controlled by a TP controller (touch panel controller) 33.

The display device 1 and others of the present embodiment are arranged to detect contact of a finger or the like with the outside surface A or B of the casing 17 or approach thereof to the outside surface A or B. The second wire containing section 14A of the touch panel 14 (that is, the frame wiring width w0 of the touch panel 14) is thus preferably not larger than 1 mm for the display devices 1 and 2 each used as a portable terminal.

The display device 2, which includes the lens 18, is preferably arranged such that the electrodes and second wire containing section 14A are so positioned as not to block the path of light emitted from the display panel 12.

As the touch panel 14 of the present embodiment, not only the aforementioned mutual capacitive touch panel but also a self-capacitance touch panel can be adopted. The self-capacitance touch panel is such that the TP controller 33 causes pulse signals to be applied to a plurality of first electrode lines and a plurality of second electrode lines which cross each other at a right angle. Then, (i) capacitance (self-capacitance) provided between the first electrode line and a detection target object and (ii) capacitance (self-capacitance) provided between the second electrode line and the detection target object are detected, in order to determine the position of contact of the detection target object or approach thereof.

Unfortunately, the self-capacitance touch panel detects a single touch (input at a single point at a time) only and decreases an S/N ratio due to parasitic capacitance. In contrast, the mutual capacitive touch panel is capable of detecting a multi-touch (simultaneous inputs at a plurality of points at a time) and is also capable of canceling parasitic capacitance, thanks to its electric charge transfer technique, thus increasing an S/N ratio.

<Mutual Capacitive Scheme>

Figure 14:
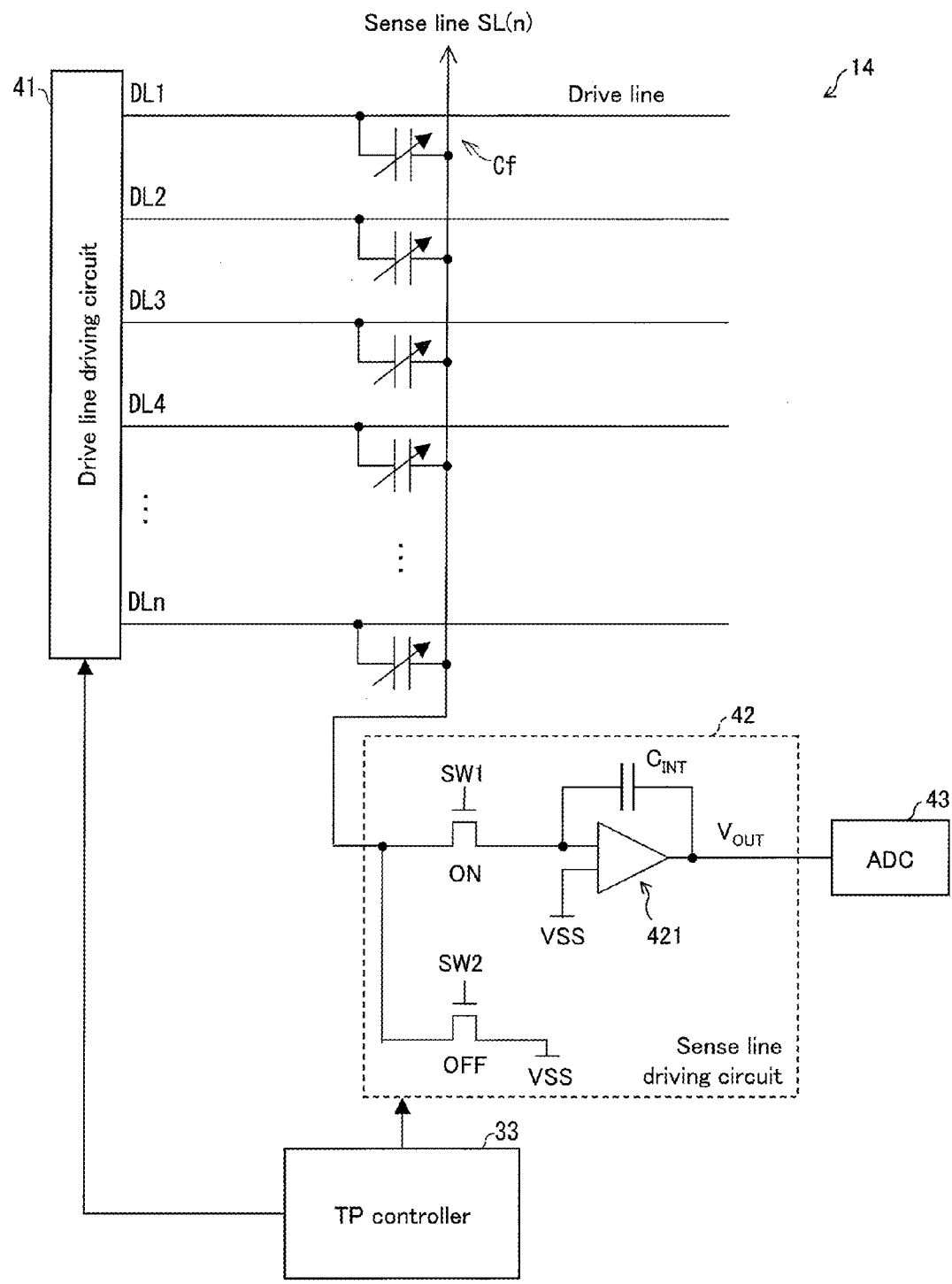
FIG. 14 is a diagram illustrating an equivalent circuit of a mutual capacitive touch panel.

The description below specifically deals with the mutual capacitive scheme (mutual capacitive detection scheme) with reference to FIG. 14 through FIG. 19. FIG. 14 is a view illustrating a configuration of an equivalent circuit of a touch panel 14 of the mutual capacitive scheme.

In the mutual capacitive scheme, the touch panel 14 includes, as described earlier, a plurality of detection electrodes 31 and a plurality of drive electrodes 32 in a matrix manner. The detection electrodes 31 are arranged so as to form a plurality of sense lines SL(n), and the drive electrodes 32 are arranged so as to form a plurality of drive lines DL1 through DLn.

The drive lines DL1 through DLn of the touch panel 14 are connected to a drive line driving circuit 41, and the sense lines SL(n) are connected to their respective sense line driving circuits 42 (see FIG. 14). Under control of the TP controller 33, the drive line driving circuit 41 and the sense line driving circuit 42 drive the drive lines DL1 through DLn and the sense lines SL(n), respectively. Further, variable capacitance (capacitance) Cf whose capacitance value varies in response to contact of a detection target object such as a finger or the like, is formed at each point of intersection between a corresponding one of the drive lines DL1 through DLn and a corresponding one of the sense lines SL(n).

The sense line driving circuit 42 includes: an operational amplifier 421 with first input grounded; an integral capacitance Cint provided between an output of the operational amplifier 421 and a second input of the operational amplifier 421; a transistor SW1 connected to the second input of the operational amplifier 421; and a transistor SW2 connected to the transistor SW1 in parallel. A configuration of the sense line driving circuit 42 is described later with reference to FIG. 15.

The sense line driving circuits 42 are connected to an ADC 43. Outputs from each capacitance Cf (capacitance Cf for each sense line SL) which has been integrated by a corresponding one of the sense line driving circuits 42 is supplied to the ADC 43.

The ADC 43 carries out an AD conversion with respect to the outputs from each capacitance Cf, the outputs each having been integrated by a corresponding one of the sense line driving circuits 42, and supplies the resulting outputs to a control 50 or a control 60 (described later). This allows the control section 50 to detect a position of contact of a finger or a counterpart device or approach thereof or allows the control section 60 to detect a position of contact of a finger or a counterpart device or approach thereof.

The description below deals with a driving principle of the mutual capacitive touch panel with reference to FIG. 15. FIG. 15 is a diagram illustrating the driving principle of the mutual capacitive touch panel, wherein (a) of FIG. 15 is a timing chart of the touch panel 14 being driven, and (b) and (c) of FIG. 15 are diagrams illustrating equivalent circuits of the touch panel 14 being driven.

The drive line driving circuit 41 sequentially applies pulses (High) each having a voltage value Vdrive to the respective drive lines DL1 through DLn (corresponding to "DL" in FIG. 15) at a predetermined interval (see (a) of FIG. 15). In other words, the drive line driving circuit 41 applies pulse signals to the respective drive lines DL1 through DLn.

Meanwhile, the sense line driving circuit 42 causes a signal to be applied to the transistor SW2 to be High at a timing when the pulse signals having been applied to the respective drive lines DL1 through DLn go High (at a pulse rise; at a timing indicated by (i) in (a) of FIG. 15), so that the transistor SW2 is turned on. Accordingly, the capacitance Cf is grounded as illustrated in (b) of FIG. 15. At that time, the pulses are being applied to the drive lines DL1 through DLn, and the capacitance Cf thus stores the electric charge as illustrated in (c) of FIG. 15. Then, during a time when the pulse signals applied to the drive lines DL1 through DLn are High, and before the transistor SW1 is turned on, the signal to be applied to the transistor SW2 goes Low so that the transistor SW2 is turned off.

Subsequently, the sense line driving circuit 42 causes a signal to be applied to the transistor SW1 to be High at a timing when the pulse signals having been applied to the respective drive lines DL1 through DLn go Low (at a pulse fall; at a timing indicated by (ii) in (a) of FIG. 15), so that the transistor SW1 is turned on. Accordingly, electric charge stored in the capacitance Cf transfers to the integral capacitance Cint (see (c) of FIG. 15). Then, during a time when the pulse signals applied to the drive lines DL1 through DLn are Low, and before the transistor SW2 is turned on, the signal to be applied to the transistor SW1 goes Low so that the transistor SW1 is turned off.

Repeating the above operation causes the integral capacitance Cint to store electric charge, thus enabling maintaining (holding) the electric charge. For example, in a case where the number of times the storage is carried out (the number of times integral calculation is performed) Nint is four times, transferring the electric charge from the capacitance Cf to the integral capacitance Cint and maintaining (holding) the electric charge in the integral capacitance Cint are repeated four times. Thereafter, the output signal Vout is outputted to the ADC 43 (i.e. the control section 50 or the control section 60) from the operational amplifier 421 (see FIG. 19).

In a case where no contact of the detection target object with the touch panel 14 or no approach thereof to the touch panel 14 is made (no touch is made), each transfer of electric charge allows a predetermined amount of electric charge to be stored. On the other hand, in a case where contact of the detection target object with the touch panel 14 or approach thereof to the touch panel 14 is made (a touch is made), a portion of electric charge stored in the capacitance Cf is released via the detection target object. Accordingly, an amount of electric charge stored is smaller than the predetermined amount.

Thus, a voltage value applied when a touch is made is lower than a voltage value applied when no touch is made, as indicated by the output signal Vout in (a) of FIG. 15. This allows the control section 50 or the control section 60 to analyze the output signal Vout from the operational amplifier 421 (i.e. the sense line driving circuit 42), thereby performing detection as to whether the touch panel is touched or not.

(Sequential Driving Scheme)

The description below deals with a sequential driving scheme, which is one kind of mutual capacitive scheme, with reference to FIG. 16. FIG. 16 is a diagram illustrating a driving principle of the sequential driving scheme.

For simple description, an example case where four drive lines (DL1 through DL4) are provided with respect to any one of sense lines SL is taken in FIG. 16. The drive line driving circuit 41 applies pulses each having a voltage value V to the respective drive lines DL1 through DL4. "1" indicates a state in which a pulse is applied, and "0" indicates a state in which no pulse is applied (a state in which capacitances Cf1 through Cf4 are grounded). Further, the capacitances Cf formed by the drive lines DL1 through DL4 and the sense line SL are capacitances Cf1 through Cf4 (capacitance values are respectively C1 through C4).

The drive line driving circuit 41 sequentially applies pulse "1" to the drive lines DL1 through DL4 (see FIG. 16). In other words, the drive line driving circuit 41 sequentially applies, by sequential driving, the pulse to the drive line DL1 through the drive line DL4. As a result, as the outputs from the sense line driving circuit 42, output signals are obtained as follows:

an output signal Vout(X1) obtained upon application to the drive line DL1 is expressed by Vout(X1)=C1·V/Cint;

an output signal Vout(X2) obtained upon application to the drive line DL2 is expressed by Vout(X2)=C2·V/Cint;

an output signal Vout(X3) obtained upon application to the drive line DL3 is expressed by Vout(X3)=C3·V/Cint; and an output signal obtained upon application to the drive line DL4 is expressed by Vout(X4)=C4·V/Cint.

(Parallel Driving Scheme)

The description below deals with a parallel driving scheme, which is another kind of mutual capacitive scheme, and particularly an orthogonal sequence driving scheme, with reference to FIG. 17. FIG. 17 is a diagram illustrating a driving principle of the orthogonal sequence driving scheme. A driving technique according to the orthogonal sequence driving scheme as used herein is, for example, the technique disclosed in Patent Literature 3. The description below deals with an overview of the orthogonal sequence driving scheme.

First, the orthogonal sequence driving scheme prepares code sequences di (=di1, di2, . . . , diN, where i=1, . . . , M). The code sequences di are orthogonal to one another and include +1 and −1. Further, the code sequences di each have a code length N. The orthogonality of the code sequences di (=di1, di2, . . . , diN, where i=1, . . . , M) each with a code length N means that the code sequences di satisfy the following condition:

$$di \cdot dk = \sum_{j=1}^{N} dij \times dkj \qquad \text{[Math. 1]}$$
$$= N \times \delta ik$$

where $\delta ik = 1$ if $i = k$ $\delta ik = 0$ if $i \neq k$

The drive line driving circuit 41 drives the M drive lines DL1 through DLM (n=M in the drive lines DLn) in parallel on the basis of the code sequences di so that a voltage +V is applied to each capacitance corresponding to +1 and a voltage −V is applied to each capacitance corresponding to −1. The capacitances Cij (where i=1 to M, and j=1 to L) (corresponding to capacitance Cf) consequently each store an electric charge (signal) ±Cij·V in accordance with a corresponding element (+1 or −1) in the code sequences.

The sense line driving circuits 42 then each (i) add, via its connection to a corresponding sense line, electric charges stored in capacitances connected to the sense line and thus (ii) read out a signal for its corresponding sense line. The sense line driving circuits 42 consequently obtain output sequence vectors sj (=sj1, sj2, . . . , sjN, where j=1, . . . , L) as output signals Vout.

More specifically, the drive lines DL1 through DLM are driven in parallel each at +V or −V in accordance with each value (+1 or −1) of d11, d21, d31, . . . , dM1 in a code sequence. This causes each corresponding capacitance to store an electric charge ±CV in accordance with a corresponding element ±1 of the code sequence. Then, a corresponding one of the sense line driving circuits 42 (i) adds, via its connection to a corresponding sense line, electric charges stored in the capacitances connected to the sense line and thus (ii) reads out a signal for its corresponding sense line. As the output signal Vout outputted from the sense line driving circuit 42, an output sequence vector sji is expressed as $$sji = G \times \sum_{k=1}^{M} (Ckj \times V \times dki) \quad \text{[Math. 2]}$$

In the circuit illustrated in FIG. 17, G=−1/Cint where G is a gain when the signal represented by the above electric charge is read out via the sense line.

Further, the output sequence vector sji is expressed as $$sj = \sum_{k=1}^{M} (Ckj \times V \times dk) \quad \text{[Math. 3]}$$

Calculation to find an inner product di·sj of a code sequence di and an output sequence vector sj is expressed as $$\begin{aligned} di \cdot sj &= di \cdot G \times \sum_{k=1}^{M} (Ckj \times V \times dk) \quad \text{[Math. 4]} \\ &= G \times \sum_{k=1}^{M} (Ckj \times V \times di \cdot dk) \\ &= G \times \sum_{k=1}^{M} (Ckj \times V \times N \times \delta ik) \\ &= G \times Cik \times V \times N \end{aligned}$$

where
$\delta ik = 1$ if $i = k$
$\delta ik = 0$ if $i \neq k$

The drive line driving circuit 41 thus drives the M drive lines in parallel so that for each of a first capacitance column Cip (where p is not smaller than 1 and not larger than (L−1), and i=1, . . . , M) and a second capacitance column Ciq (where p<q, q is not smaller than 2 and not greater than L, and i=1, . . . , M), a voltage value +V corresponding to "+1" of the code sequence di or a voltage value −V corresponding to "−1" of the code sequence di, is applied to each of the M drive lines in accordance with the code sequences di (=di1, di2, . . . , diN, where i=1, . . . , M) which are orthogonal to one another and include elements of +1 and −1 and each of which has a length N. The drive section 4 then causes (i) the first capacitance column to output sFirst (=sp1, sp2, . . . , spN) and (ii) the second capacitance column to outputs sSecond (=sq1, sq2, . . . , sqN).

The outputs sFirst (=sp1, sp2, . . . , spN) from the first capacitance column are each integrated by a corresponding sense line driving circuit 42, whereas the outputs sSecond (=sq1, sq2, . . . , sqN) from the second capacitance column are also each integrated by a corresponding sense line driving circuit 42. The sense line driving circuits 42 respectively corresponding to the sense lines SL1 through SLL are sequentially switched, so that outputs from each capacitance column which have each been integrated by a corresponding sense line driving circuit 42 are supplied to the ADC 43.

A drive controlling section 501 (described later) in the control section 50 or a drive controlling section 601 (described later) in the control section 60 estimates, with reference to data stored in a storage section 52 or a storage section 62 (described later), (i) a capacitance value in the first capacitance column, the capacitance value corresponding to a k1-th drive line (where 1≤k1<M), by computing an inner product of a corresponding output sFirst and a corresponding code sequence di and (ii) a capacitance value in the second capacitance column, the capacitance value corresponding to a k2-th drive line (where k1<k2, and 1<k1≤M), by computing an inner product of a corresponding output sSecond and a corresponding code sequence di. Accordingly, a processing time to obtain these capacitance values becomes long. This achieves accurately detecting the position of the detection target object.

With reference to FIG. 18, the description below deals with example outputs from the sense line driving circuit 42 via any one of the sense lines SL with use of four drive lines DL1 through DL4.

Note that the description below assumes that code sequences di=(di1, di2, di3, di4) is set as illustrated in FIG. 18. A voltage value +V corresponding to "1" of the code sequence di or a voltage value −V corresponding to "−1" of the code sequence di, is applied to each of the drive lines DL1 through DL4. Further, the capacitances Cf formed by the drive lines DL1 through DL4 and the sense line SL are assumed to be capacitances Cf1 through Cf4 (capacitance values are C1 through C4).

The drive line driving circuit 41 applies, by parallel driving, the voltage value +V or −V corresponding to each of the code sequences di1 through di4 to each of the drive lines DL1 through DL4 (see FIG. 18). In FIG. 18, the four drive lines are provided. Accordingly, the voltage value +V or −V is applied to each of the drive lines DL1 through DL4 four times on the basis of the code sequences di1 through di4. As a result, as the outputs from the sense line driving circuit 42, output signals are obtained as follows:

an output signal Vout (Y1) obtained upon application to the drive line DL1 is expressed by Vout(Y1)=(C1+C2+C3+C4)·V/Cint;

an output signal Vout(Y2) obtained upon application to the drive line DL2 is expressed by Vout(Y2)=(C1−C2+C3−C4)·V/Cint;

an output signal Vout(Y3) obtained upon application to the drive line DL3 is expressed by Vout(Y3)=(C1+C2−C3−C4)·V/Cint; and an output signal Vout(Y4) obtained upon application to the drive line DL4 is expressed by Vout(Y4)=(C1−C2−C3+C4)·V/Cint.

In other words, the outputs are obtained as output sequence vectors s4=(s41, s42, s43, s44)=(Vout(Y1), Vout(Y2), Vout(Y3), Vout(Y4)).

Then, the control section 50 or the control section 60 performs inner product operation di·s4 of the code sequence di and the output sequence vector s4. Resultant values are as follows:

(i) 1·Y1+1·Y2+1·Y3+1·Y4=4C1·V/Cint;
(ii) 1·Y1+(−1)·Y2+1·Y3+(−1)·Y4=4C2·V/Cint;
(iii) 1·Y1+1·Y2+(−1)·Y3+(−1)·Y4=4C3·V/Cint; and
(iv) 1·Y1+(−1)·Y2+(−1)·Y3+1·Y4=4C4·V/Cint.

On the basis of these values, the control section 50 or the control section 60 determines the detection of the position of the detection target object.

(Difference in Sensing Time)

FIG. 19 shows diagrams each illustrating how parallel driving effectively reduces the time taken for a touch panel to carry out sensing.

(a) of FIG. 19 shows sensing time $T_{sense}$ in the case of sequential driving, and (b) of FIG. 19 shows sensing time $T_{sense}$ in the case of parallel driving.

In a case where a DL wave period $T_{drive}$ is the same between (a) and (b) of FIG. 19 and the number of times $N_{int}$ an integral is calculated is the same between (a) and (b) of FIG. 19, the sensing time $T_{sense}$ in the case of parallel driving becomes shorter than the sensing time $T_{sense}$ in the case of sequential driving, because the parallel driving allows for driving of a plurality of drive lines at the same time.

Accordingly, it is possible to increase the number of times the sensing is carried out (the number of times an integral is calculated) within a limited length of an idle period. This makes it possible to realize a display device 1 and the like including a touch panel which has an improved SN ratio and is capable of carrying out position detection with a high degree of accuracy.

It should be noted that, although the code sequences in the present embodiment are M-sequence signals, the code sequences are not limited to the M-sequence signals. For example, the code sequences may be Hadamard code sequences or the like.

[Details of (Transmitting-end and Receiving-end) Display Devices]

The description below specifically deals with a position detection method in which a position of a counterpart device, which is one of two display devices 1 or the like included in the information processing system 5 illustrated in FIG. 13, i.e. a position of a counterpart device as the detection target object, is detected.

For simple description, the description below specifically deals with the display devices 2. Unless otherwise noted, the description below assumes that the orthogonal sequence driving scheme is adopted as each driving scheme used for the touch panels 14 included in the respective two display devices 2. This, however, is not the only possibility. Alternatively, the aforementioned sequential driving scheme may be adopted.

Further, the description below deals with a main configuration of the transmitting device 1b (electronic device) and a main configuration of the receiving device 1a (electronic device). However, the transmitting device 1b may be arranged to have a receiving function, while the receiving device 1a may be arranged to have a transmitting function. That is, the transmitting device 1b and the receiving device 1a may each serve as transmitting and receiving devices.

[Details of (Transmitting-end) Display Device]

The description below first deals with a case where the display device 2 is a transmitting end that transmits a pulse signal, i.e. a case where the display device 2 is the transmitting device 1b. The description below particularly deals with processing carried out in a case the transmitting device 1b contacts or approaches the display device 2 (receiving device 1a) which is the counterpart device.

<Configuration of Control Section>

The description below deals with a configuration of the control section 60 of the transmitting device 1b with reference to FIG. 20. FIG. 20 is a functional block diagram schematically illustrating an example configuration of the control section 60.

The transmitting device 1b mainly includes the display panel 12 (transmitting-end display screen), the touch panel 14 (transmitting-end touch panel), the control section 60, a communication section 61, and the storage section 62. The display panel 12 and the touch panel 14 have been described earlier, and descriptions thereof are therefore omitted.

Further, the transmitting device 1b is arranged such that a minimum distance between the touch panel 14 and an outside surface B of the casing 17 (transmitting-end casing) is not larger than a detectable distance, within which the touch panel 14 is capable of detecting (i) contact of the detection target object with the outside surface B or (ii) approach thereof to the outside surface B (In other words, the transmitting device 1b has a narrow frame).

The control section 60 mainly includes the drive controlling section 601 (transmitting-end drive controlling section), the mode changing section 602, and the data transmitting and receiving section 603. The control section 60 (i) reads a program from the storage section 62 into a temporary memory section (not shown) including, for example, a random access memory (RAM) and (ii) executes that program to cause various processes to be performed, for example, to cause any of the members to perform a process.

The drive controlling section 601, by controlling the TP controller 33, controls driving of the drive line driving circuit 41 and the sense line driving circuit 42 in the touch panel 14 according to a mode determined by the mode changing section 602, i.e. according to either a "normal mode" or a "position detection mode". In other words, the drive controlling section 601 controls (i) application of a pulse signal for detecting contact of the detection target object with at least one of the drive lines DL1 through DLn (transmitting-end drive lines) or approach thereof to the drive lines DL1 through DLn and (ii) driving of the sense lines SL for detecting a change in capacitance value of the capacitance Cf formed between at least one of the drive lines DL1 through DLn and at least one of the sense lines SL (transmitting-end sense lines).

In the "normal mode", the drive controlling section 601 performs drive control in accordance with the aforementioned orthogonal sequence driving scheme (or the sequential driving scheme) (CASE 1 in (a) of FIG. 21).

In the "position detection mode", the drive controlling section 601 controls the drive line driving circuit 41 to perform drive control (control of application of pulse signals to the drive lines DL1 through DLn) in accordance with the orthogonal sequence driving scheme (or the sequential driving scheme), whereas the drive controlling section 601 controls the sense line driving circuit 42 so that the sense line driving circuit 42 stops driving of the sense line SL by setting the sense line SL to have a constant potential or a high impedance (Hi Z) (CASE 2 in (a) of FIG. 21). For example, setting the sense line SL to have a constant potential is achieved by turning on the transistor SW2, whereas setting the sense line SL to have high impedance is achieved by turning off the transistors SW1 and SW2.

Even in the "position detection mode", the drive controlling section 601 may perform drive control in accordance with the aforementioned orthogonal sequence driving scheme (or the sequential driving scheme) in the same manner as in the "normal mode". This allows the receiving device 1a to detect the position of the transmitting device 1b while maintaining a normal operation of the touch panel 14 (operation to detect approach of the detection target object or contact thereof).

That is, the drive controlling section 601 controls, in either of these operation modes, so that pulse signals (coded pulse signals) are fed to the drive lines DL1 through DLn. This allows the touch panel 14 included in the receiving device 1a to receive at least one of the pulse signals when the receiving device 1a as the counterpart device contacts or approaches. This, in turn, allows the receiving device 1a to determine the position of the transmitting device 1b.

The mode changing section 602 selects the operation mode of the touch panel 14 between the "normal mode" and the "position detection mode". The "normal mode" is a mode in which the touch panel 14 performs a normal operation to detect approach of the detection target object or contact thereof. The "position detection mode" is a mode in which, while the touch panel 14 does not detect the position of the detection target object, the counterpart device detects the position of the detection target object.

The data transmitting and receiving section 603 transmits predetermined data stored in the storage section 62 via the touch panel 14. Data transmission and reception between the touch panels 14 is described later. Alternatively, the data transmitting and receiving section 603 may transmit the predetermined data via the communication section 61.

The data transmitting and receiving section 603 receives a synchronization adjustment completion notification or a position detection completion notification, via the communication section 61 from the receiving device 1a which is the counterpart device. The synchronization adjustment completion notification indicates the completion of synchronization adjustment between the touch panels 14. The position detection completion notification indicates the completion of detection of the position of the transmitting device 1b.

The communication section 61 performs data transmission and reception. Wireless communications used by the communication section 61 are short-range wireless communications including, for example, WiFi, NFC, and Blutooth (registered trademark).

The storage section 62 stores, for example, the control programs to control the members and application programs, wherein the control programs and the application programs are executed by the control section 60. The storage section 62 is constituted by a non-volatile storage device including, for example, Read Only Memory (RAM) and a flash memory. As described earlier, the temporary memory section is constituted by a volatile storage device such as RAM. Alternatively, the storage section 62 may further serve as the temporary memory section.

<Flowchart>

With reference to FIG. 22, the description below deals with a flow of processes performed by the transmitting device 1b. FIG. 22 is a flowchart illustrating the flow of the processes performed by the transmitting device 1b.

First, the touch panel 14 included in the transmitting device 1b is assumed to be operating in the "normal mode" (S1). The data transmitting and receiving section 603 determines whether it has received a synchronization adjustment completion signal indicating that, after the receiving device 1a which is the counterpart device detected contact of the transmitting device 1b or approach thereof, the receiving device 1a has performed adjustment for synchronization and then completed that adjustment (S2). In a case where the data transmitting and receiving section 603 has received the synchronization adjustment completion signal (YES in S2), the data transmitting and receiving section 603 notifies the mode changing section 602 of the reception of the synchronization adjustment completion signal.

The mode changing section 602, upon receipt of the notification, switches the mode to the "position detection mode" (S3). The drive controlling section 601 controls driving of the touch panel 14 according to the "position detection mode". Then, the data transmitting and receiving section 603 determines whether the position detection completion notification has been received (S4). In a case where the data transmitting and receiving section 603 has received the position detection completion notification (YES in S4), the data transmitting and receiving section 603 transmits the predetermined data via the communication section 61 or the touch panel 14 (S5).

[Details of (Receiving-end) Display Device]

The description below deals with a case where the display device 2 is a receiving end that receives a pulse signal, i.e. a case where the display device 2 is the receiving device 1a.

Note that in a case where the transmitting device 1b, which is the counterpart device, contacts or approaches the display region P of the receiving device 1a, the touch panel 14 included in the receiving device 1a simply needs to detect that contact or that approach within the display region P (see (b) through (d) of FIG. 13).

Thus, in this arrangement, the receiving device 1a does not necessarily require to be such that a minimum distance between the touch panel 14 and the outside surface B of the casing 17 (receiving-end casing) is not larger than a detectable distance, within which the touch panel 14 is capable of detecting (i) the contact of the detection target object with the outside surface B or (ii) the approach of the detection target object to the outside surface B (i.e. the receiving device 1a does not necessarily require to have a narrow frame).

<Configuration of Control Section>

Figure 1:
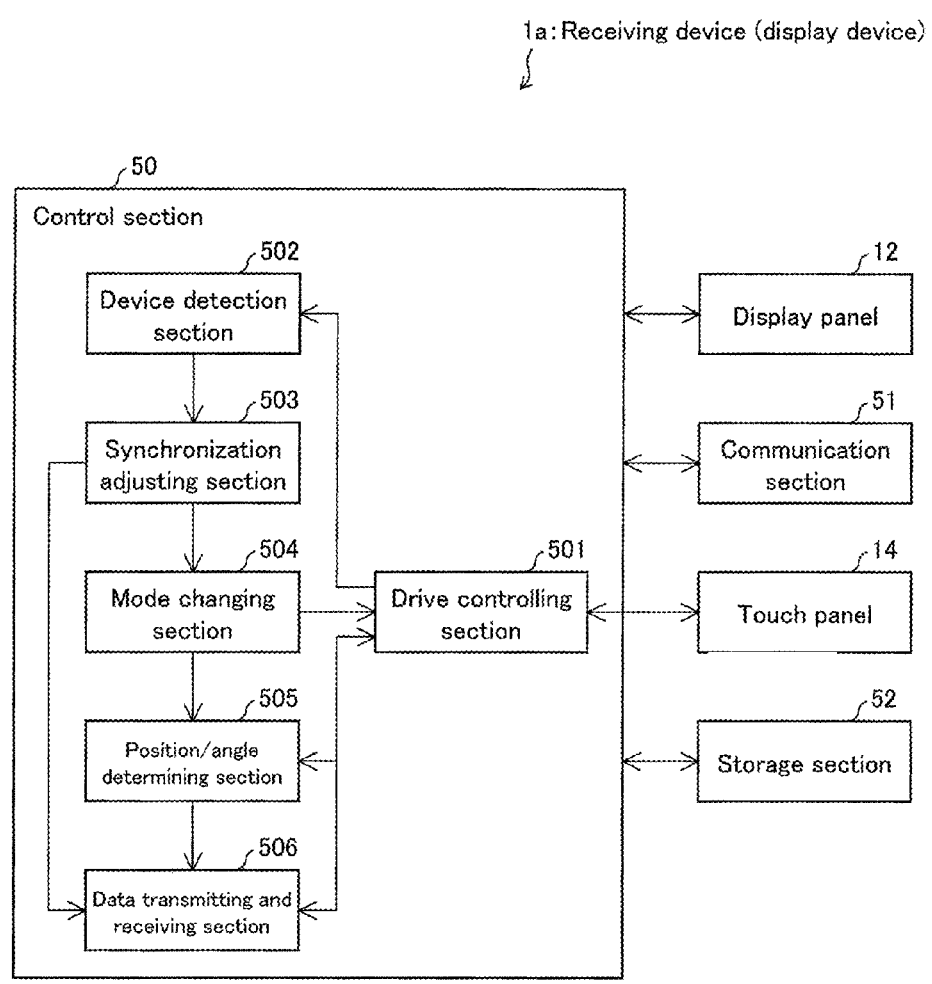
FIG. 1 is a diagram illustrating an example functional block of a control section included in a display device (receiving device) of an embodiment of the present invention.

The receiving device 1a mainly includes the display panel 12 (receiving-end display screen), the touch panel 14 (receiving-end touch panel), the control section 50, a communication section 51, and a storage section 52 (see FIG. 1). The display panel 12 has been described earlier, and descriptions thereof are therefore omitted. Further, the control section 50, the communication section 51, and the storage section 52 have the same basic functions as those of the control section 60, the communication section 61, and the storage section 62, respectively. Thus, descriptions of the control section 50, the communication section 51, and the storage section 52 are omitted.

The touch panel 14 has the basic configuration as described earlier. The sense line SL of the touch panel 14 included in the receiving device 1a is capable of receiving at least one of the pulse signals applied to the respective drive lines DL1 through DLn of the touch panel 14 included in the transmitting device 1b which has contacted or approached the receiving device 1a.

The control section 50 mainly includes the drive controlling section 501 (receiving-end drive controlling section), a device detection section 502, a synchronization adjusting section 503 (changing section), a mode changing section 504, a position/angle determining section 505 (determining section), and a data transmitting and receiving section 506.

In the same manner as the drive controlling section 601, the drive controlling section 501, by controlling the TP controller 33, controls driving of the drive line driving circuit 41 and the sense line driving circuit 42 in the touch panel 14 according to a mode determined by the mode changing section 504, i.e. according to either the "normal mode" or the "position detection mode".

In the "normal mode", the drive controlling section 501 performs drive control in accordance with the aforementioned orthogonal sequence driving scheme (or the sequential driving scheme) (CASE 2 in (b) of FIG. 21).

In the "position detection mode", the drive controlling section 501 controls the sense line driving circuit 42 to perform drive control in accordance with the orthogonal sequence driving scheme (or the sequential driving scheme), whereas the drive controlling section 501 controls the drive line driving circuit 41 so that the drive line driving circuit 41 stops application of pulse signals to the drive lines DL1 through DLn (receiving-end drive lines) by setting the drive lines DL1 through DLn to have a constant potential or a high impedance (Hi Z) (CASE 1 in (a) of FIG. 21). In the CASE 1, an increase in performance (S/N ratio) of the touch panel 14, i.e. an increase in accuracy of position detection is achieved.

Even in the "position detection mode", the drive controlling section 501, as with the drive controlling section 601, may perform drive control in accordance with the aforementioned orthogonal sequence driving scheme (or the sequential driving scheme) in the same manner as in the "normal mode".

The drive controlling section 501 controls, in either of these operation modes, so that a process of reading electric charge (output signal Vout) from the sense line SL (receiving-end sense line) is performed. This allows, when the transmitting device 1b contacts or approaches the receiving device 1a, determining which of the sense lines SL in the touch panel 14 included in the receiving device 1a has received the pulse signal having been transmitted from the touch panel 14 included in the transmitting device 1b.

The device detection section 502 detects whether the transmitting device 1b as the counterpart device has contacted or approached the receiving device 1a, (1) by determining whether coupling capacitance has occurred between (i) the sense line SL of the touch panel 14 included in the receiving device 1a and (ii) any of the drive lines DL1 through DLn of the touch panel 14 included in the transmitting device 1b or (2) by determining whether a change in capacitance Cf (mutual capacitance) has occurred.

The determination (1) is performed in, for example, a situation where the touch panel 14 included in the transmitting device 1b is being driven. In this case, contact of the transmitting device 1b with the receiving device 1a or approach thereof to the receiving device 1a causes the occurrence of coupling capacitance, with which a change in output signal Vout occurs. The change in output signal Vout serves as a trigger for detection of the transmitting device 1b.

At the time when the determination is performed by the device detection section 502, the adjustment for synchronization is not performed by the synchronization adjusting section 503. Accordingly, a pulse signal transmitted from the transmitting device 1b is received as merely noise by the receiving device 1a. The device detection section 502 generates a signal distribution as illustrated in FIG. 23 by analyzing the output signal Vout indicating that noise. That is, obtaining the signal distribution (noise distribution) as illustrated in FIG. 23 allows the device detection section 502 to determine that the transmitting device 1b has contacted or approached.

The determination (2) is performed in, for example, a situation where the touch panel 14 included in the transmitting device 1b is not being driven (e.g. low-frequency driving during standby). In this case, the coupling capacitance occurring in the case (1) does not occur. Thus, as in the case with normal detection, i.e. detection of contact of a finger or the like or approach thereof, a change in output signal Vout due to a decrease in capacitance Cf serves as a trigger for detection of contact of the transmitting device 1b or approach thereof.

The synchronization adjusting section 503 adjusts synchronization between a pulse signal received from the touch panel 14 included in the transmitting device 1b and a pulse signal applied to the touch panel 14 included in the receiving device 1a so that these pulse signals are brought into synchronization with each other. This allows the position/angle determining section 505 to analyze an output signal based on the pulse signal transmitted from the transmitting device 1b. Details of processes performed by the synchronization adjusting section 503 are described later.

The mode changing section 504, as with the mode changing section 602, selects the operation mode of the touch panel 14 between the "normal mode" and the "position detection mode."

The position/angle determining section 505 determines the position of the transmitting device 1b in relation to the receiving device 1a by judging which of a plurality of sense lines SL in the touch panel 14 included in the receiving device 1a has received the pulse signal transmitted from the touch panel 14 included in the transmitting device 1b.

Further, the position/angle determining section 505 performs the judgment as to which of the sense lines SL has received the pulse signal, by detecting a change in capacitance value which change occurs in at least one of the sense lines SL of the receiving device 1a due to a coupling capacitance that has occurred between the at least one of the sense lines of the receiving device 1a and at least one of the drive lines DL of the transmitting device 1b.

Details of processes performed by the position/angle determining section 505 are described later.

The data transmitting and receiving section 506 receives, via the touch panel 14, the predetermined data transmitted from the transmitting device 1b. Alternatively, the data transmitting and receiving section 506 may receive the predetermined data via the communication section 51. Further, the data transmitting and receiving section 506 transmits the synchronization adjustment completion notification or the position detection completion notification to the transmitting device 1b, which serves as the counterpart device, via the communication section 61.

<Flowchart>

With reference to FIG. 24, the description below deals with a flow of processes performed by the receiving device 1a. FIG. 24 is a flowchart illustrating the flow of the processes performed by the receiving device 1a.

First, the touch panel 14 included in the receiving device 1a is assumed to be operating in the normal mode (S11).

When the transmitting device 1b contacts or approaches the receiving device 1a, a coupling capacitance occurs between (i) any one of the drive lines DL1 to DLn of the touch panel 14 included in the transmitting device 1b and (ii) a sense line SL of the touch panel 14 included in the receiving device 1a. This causes the sense line SL to receive a pulse signal transmitted from the touch panel 14 of the transmitting device 1b (S12). By recognizing the receipt of the pulse signal (i.e. the receipt of an output signal Vout based on the pulse signal), the device detection section 502 detects that the transmitting device 1b has contacted or approached the receiving device 1a (S13).

Next, upon receiving from the device detection section 502 a notification indicating that the transmitting device 1b has been detected, the synchronization adjusting section 503 adjusts synchronization of pulse signals as described above (S14), and then determines whether or not the pulse signals have been synchronized (S15). In a case where it is determined that the pulse signals have been synchronized (YES in S15), the synchronization adjusting section 503 notifies the mode changing section 504 that the pulse signals have been synchronized. In so doing, the synchronization adjusting section 503 causes the data transmitting and receiving section 506 to transmit, via the communication section 51, a synchronization adjustment completion notification to the transmitting device 1b.

Upon receiving the notification, the mode changing section 504 makes switching to the "position detection mode" (S16). The drive controlling section 501 (i) controls driving of the touch panel 14 in accordance with the position detection mode and (ii) notifies the position/angle determining section 505 that the switching has been made. Then, upon receiving, via the sense line SL of the receiving device 1a, the output signal Vout based on the pulse signal supplied in the touch panel 14 of the transmitting device 1b (S17), the drive controlling section 501 notifies the position/angle determining section 505 that the output signal Vout has been received.

Then, the position/angle determining section 505 analyzes the incoming output signal Vout based on the pulse signal (S18), and then determines a position (or angle) of the transmitting device 1b (S19). In so doing, the position/angle determining section 505 causes the data transmitting and receiving section 506 to transmit, via the communication section 51, a position detection completion notification to the transmitting device 1b.

Then, the data transmitting and receiving section 506 receives predetermined data which has been transmitted from the transmitting device 1b via the communication section 61 or via the touch panel 14 of the transmitting device 1b (S20). This allows a process in accordance with a predetermined function being performed by the transmitting device 1b to be carried out.

<Synchronization Process>

Next, the description below deals with synchronization adjustment (synchronization adjustment between the touch panels 14) performed by the synchronization adjusting section 503, with reference to FIGS. 25 through 28.

The above-described synchronization adjusting section 503 described above adjusts synchronization of the two pulse signals by making a change to a timing with which a pulse signal is applied to a drive line DL of the receiving device 1a. Specifically, the change is made in accordance with a correlation value (autocorrelation value) between (i) a pulse signal which was applied to at least one of the drive lines DL1 to DLn of the touch panel 14 of the transmitting device 1b and then was received by a sense line SL of the touch panel 14 of the receiving device 1a and (ii) a predetermined pattern signal (replica pattern signal) corresponding to a pulse signal applied to at least one of the drive lines DL1 to DLn of the touch panel 14 of the receiving device 1a.

(a) of FIG. 25 is a diagram illustrating an equivalent circuit of a synchronization adjustment circuit 533 that generates a correlation output signal with which the synchronization adjusting section 503 performs synchronization adjustment. (b) of FIG. 25 is a view illustrating an example input/output table to which an exclusive OR circuit 533a refers.

As illustrated in (a) of FIG. 25, the synchronization adjustment circuit 533 includes the exclusive OR circuit 533a and a correlator 533b.

In a case where a sense line SL of the receiving device 1a receives an encoded pulse signal from a drive line DL of the transmitting device 1b, the pulse signal as an input signal is supplied to the exclusive OR circuit 533a.

Upon receiving the input signal and a replica pattern signal, the exclusive OR circuit 533a transmits, to the correlator 533b, an output signal in accordance with the input/output table illustrated in (b) of FIG. 25. The replica pattern signal is a signal to be synchronized with a pulse signal applied to a drive line DL of the receiving device 1a. In a case where an offset and/or period of the replica pattern signal are/is changed, an offset and/or period of the pulse signal are/is changed accordingly.

An example of the replica pattern signal is a pseudo-random pattern signal. That is, for an adjustment of synchronization of the two signals, an autocorrelation characteristic of a pseudo-random code is to be used.

In order to adjust the synchronization of the two pulse signals, for example, an autocorrelation characteristic of a pseudo-random code is to be used. During the adjustment of the synchronization, an encoded pulse signal (pseudo-random pattern signal) received from the drive line DL of the transmitting device 1b is a signal unknown to the receiving device 1a. Specifically, a sequence, a code length, a timing, and a period of a pseudo-random code of the pulse signal are unknown.

Therefore, in order to search for a sequence (e.g. M sequence) or the like of the pseudo-random code, the replica pattern signal is changed such that a correlation output signal becomes at a maximum value. Specifically, the maximum value of a correlation value is searched for by making changes to the sequence, the code length, the deviation (offset) of the timing, and the period of the pseudo-random code of the replica pattern signal. Then, when the maximum value is obtained, the pseudo-random code of the pulse signal received from the drive line DL of the transmitting device 1b becomes known. A timing, with which a pulse signal is applied to the drive line DL of the receiving device 1a, is changed by use of the pseudo-random code that has become thus known, so that the timing is in line with a timing with which a pulse signal is applied to the drive line DL of the transmitting device 1b. This allows the receiving device 1a and the transmitting device 1b to be synchronized with each other.

Upon receiving the output signal, the correlator 533b (i) generates a correlation output signal representing a correlation between the input signal and the replica pattern signal and then (ii) transmits the correlation output signal to the synchronization adjusting section 503. The correlator 533b is designed to (i) count upwards in a case where a value of the output signal illustrated in (b) of FIG. 25 is 0, that is, in a case where the two inputs match each other and (ii) count downwards in a case where the value of the output signal is 1, that is, in a case where the two inputs are different.

FIGS. 26 and 27 are charts each illustrating an input signal, a replica pattern signal, and a correlation output signal which is generated by the correlator 533b. FIG. 26 illustrates a case where the input signal and the replica pattern signal are not synchronized, whereas FIG. 27 illustrates a case where the input signal and the replica pattern signal are synchronized.

In the case where, as illustrated in FIG. 26, the input signal and the replica pattern signal are not synchronized, the upward counting (Cup) and the downward counting (Cdown) both appear. This causes the value of the correlation output signal to be around 0. Note that while FIG. 26 illustrates only offsets in terms of deviation, there also exists deviations of timings as well.

On the other hand, in a case where, as illustrated in FIG. 27, the input signal and the replica pattern signal are synchronized, only the upward counting (Cup) appears. This causes the correlation value to be at the maximum value. Assuming that the code length of the encoded pulse signal (pseudo-random code) from the drive line DL of the transmitting device 1b is n, the maximum value of the correlation value is n.

Therefore, by receiving the correlation output signal from the correlator 533b and then determining whether the correlation value indicated by the correlation output signal is at a value around 0 or at the maximum value (n), the synchronization adjusting section 503 can determine whether or not there is synchronization between (i) a pulse signal applied to at least one of the drive lines DL1 to DLn of the transmitting device 1b and (ii) a pulse signal applied to at least one of the drive lines DL1 to DLn of the receiving device 1a.

Specifically, in a case where it is determined that the correlation value is a value around 0, the synchronization adjusting section 503 determines that the two pulse signals at are not synchronized. In contrast, in a case where it is determined that the correlation value is the maximum value, the synchronization adjusting section 503 determines that there is synchronization between (i) the pulse signal applied to at least one of the drive lines DL1 to DLn of the transmitting device 1b and (ii) the pulse signal applied to at least one of the drive lines DL1 to DLn of the receiving device 1a.

In a case where it is determined that the two pulse signals are not synchronized, the synchronization adjusting section 503 makes a change(s) to the offset and/or period of the replica pattern signal until the correlation value becomes the maximum value. Along with the change(s), a timing with which a pulse signal is applied to the drive line DL of the receiving device 1a is also changed. This is how the synchronization adjusting section 503 performs the synchronization adjustment of the two pulse signals.

Note that in a case where the position of the transmitting device 1b is to be detected, there are (i) a driving scheme to be employed in the case of the "normal mode" and (ii) a driving scheme to be employed in the case of the "position detection mode" (see FIG. 21).

In a case where the position of the transmitting device 1b is to be detected while the transmitting device 1b and the receiving device 1a are each switched to the "position detection mode," the two pulse signals are synchronized so that the position detection operation is possible during normal operations (TP operations) of the touch panels 14 as illustrated in (a) of FIG. 28. On the other hand, in a case where the position of the transmitting device 1b is to be detected while the transmitting device 1b and the receiving device 1a each continue operating in the "normal mode," the two pulse signals are synchronized so that the position detection operation is possible during the normal operations of the touch panels 14 as illustrated in (b) of FIG. 28.

Upon completion of the synchronization adjustment, the receiving device 1a notifies the transmitting device 1b that the synchronization adjustment has been completed, and then receives, from the transmitting device 1b, basic information on the touch panel 14 of the transmitting device 1b. The basic information can be received via the communication section 61 or via data communications between the touch panels 14.

(Function of Transmitting Device 1b During Synchronization Process)

On the other hand, the transmitting device 1b can be considered as a device which is, in order to realize the synchronization process, configured to cause, when the receiving device 1a approaches or comes into contact with the transmitting device 1b, the touch panel 14 of the receiving device 1a to receive a pulse signal applied to at least one of the drive lines DL1 to DLn of the touch panel 14 of the transmitting device 1b, so that the receiving device 1a is enabled to change a timing with which a pulse signal is applied to at least one of the drive lines DL1 to DLn of the receiving device 1a.

In this case, the information processing system 5 illustrated in FIG. 13 can be considered as a synchronization processing system including the transmitting device 1b and the receiving device 1a which are configured to perform the synchronization process.

Note that a method of synchronizing the two pulse signals does not need to be based on the process of the receiving device 1a receiving a pulse signal from the transmitting device 1b. For example, the synchronization adjustment performed by the synchronization adjusting section 503 can be realized by receiving information from the transmitting device 1b via wireless communications. In such a case, the transmitting device 1b transmits, to the receiving device 1a, information on a pulse signal applied to a drive line DL of the transmitting device 1b (i.e. information containing information on (i) a sequence of a code for use in encoding of the pulse signal, (ii) a code length, (iii) a period, and the like). Then, the receiving device 1a adjusts, in accordance with the information thus received, a timing with which a pulse signal is applied to a drive line DL of the receiving device 1a. This causes the pulse signal applied to the drive line DL to be synchronized with the pulse signal used in the transmitting device 1b.

<Position Detection Process>

A position detection process while the transmitting end and the receiving end have a positional relation as illustrated in each of (a) through (d) of FIG. 13 will be described next. Note that in the following description, the drive lines DL1 to DLn will be collectively referred to as a drive line DL.

(Detection of Positions of Adjacent Devices)

With reference to FIGS. 29 through 31, the following description will first discuss an example of the position detection process in a case where an outside surface (herein referred to as "outside surface B") of the casing 17 of the transmitting device 1b is adjacent to an outside surface B of the casing 17 of the receiving device 1a (i.e. in the case illustrated in (a) of FIG. 13).

(a) of FIG. 29 is a view (i) schematically illustrating the receiving device 1a and the transmitting device 1b with the two outside surfaces B not being adjacent to each other and (ii) illustrating an equivalent circuit. (b) of FIG. 29 is a view (i) schematically illustrating the receiving device 1a and the transmitting device 1b with the two outside surfaces B adjacent to each other (i.e. an arrangement in which the outside surface B of the transmitting device 1b comes into contact with or approaches the outside surface B of the receiving device 1a) and (ii) illustrating an equivalent circuit. Note that unless particularly stated otherwise, the description below assumes that the drive line driving circuit 41 of the transmitting device 1b is in a driving state.

In a case where, as illustrated in (a) of FIG. 29, the transmitting device 1b and the receiving device 1a are not adjacent to each other, there occurs no coupling capacitance between the drive line DL of the transmitting device 1b and a sense line SL of the receiving device 1a. This prevents the sense line SL of the receiving device 1a from receiving a pulse signal applied to the drive line DL of the transmitting device 1b.

On the other hand, in a case where, as illustrated in (b) of FIG. 29, the transmitting device 1b and the receiving device 1a are adjacent to each other, there occurs a coupling capacitance between the drive line DL of the transmitting device 1b and the sense line SL of the receiving device 1a.

This allows the sense line SL of the receiving device 1a to receive the pulse signal applied to the drive line DL of the transmitting device 1b.

An example of the process of the receiving device 1a to detect a position of the transmitting device 1b while the receiving device 1a and the transmitting device 1b are thus adjacent will be described next with reference to FIGS. 30 and 31. (a) and (b) of FIG. 30 are each a view illustrating a positional relation between the transmitting device 1b and the receiving device 1a. (c) of FIG. 30 is a view illustrating an example position detection table. (a) and (c) of FIG. 31 are each a view schematically illustrating an equivalent circuit during the position detection process. (b) and (d) of FIG. 31 are views illustrating signal distributions corresponding to (a) and (c) of FIG. 31, respectively.

The following description will discuss an example in which the respective touch panels 14 of the transmitting device 1b and of the receiving device 1a each include drive lines DL and sense lines SL which are (i) identical in number (4×4) and (ii) identical in line pitch.

(Signal Distribution-based Position Detection)

An example, in which the position/angle determining section 505 detects a position of the transmitting device 1b by use of the signal distribution (described later), will be described first.

In a case where the transmitting device 1b and the receiving device 1a are each driving by an orthogonal sequence driving scheme at least in the "normal mode," pulse signals are respectively applied to the drive lines DL1 to DL4 of the transmitting device 1b in accordance with the code sequences di as illustrated in FIG. 18. In addition, by receiving the pulse signals, the receiving device 1a (i) calculates output sequence vectors s4 (output signals (Vout (Y1), Vout (Y2), Vout (Y3), Vout (Y4))) described earlier and (ii) carries out inner product operation di·s4. In accordance with a result of the inner product operation, the position/angle determining section 505 calculates (i) a location of a coupling capacitance that occurred between a drive line DL of the transmitting device 1b and a sense line SL of the receiving device 1a and (ii) a capacitance value of the coupling capacitance at the location. In the cases illustrated in (a) and (b) of FIG. 30, the position/angle determining section 505 calculates (i) a location of a coupling capacitance that occurs between each of the drive lines DL1 to DL4 and at least one of detection electrodes SE1 to SE4 of the sense line SL1 and (ii) a capacitance value of the coupling capacitance at the location.

Then, the position/angle determining section 505 generates a signal distribution (capacity map) such as those of (a) and (b) of FIG. 31 by substituting the capacitance values of the coupling capacitances and their respective locations into a three-dimensional space which is formed by (1) a plane (x-y plane) represented by two axes which are (i) a drive line DL and a sense line SL of the transmitting device 1b or (ii) a drive line DL and a sense line SL of the receiving device 1a and (2) an axis (z-axis) which is orthogonal to the plane and which represents the capacitance values of the coupling capacitances. Then, based on the signal distribution thus generated, the position/angle determining section 505 determines the position of the transmitting device 1b in relation to the receiving device 1a.

In other words, the position/angle determining section 505 determines the position by generating a distribution (signal distribution) of capacitance values which have occurred at the sense line SL due to the coupling capacitance, the distribution showing a relationship between (i) the capacitance values and (ii) a position of at least one of the touch panels 14 of the receiving device 1a and of the transmitting device 1b, at which touch panels 14 the capacitance values have occurred.

In (b) and (d) of FIG. 31, "1" to "4" (on an x-axis of each of (b) and (d) of FIG. 31) indicate positions on a sense line SL1, which positions respectively correspond to the drive lines DL1 to DL4 of the transmitting device 1b. In addition, "S1" to "S4" (on a y-axis of each of (b) and (d) of FIG. 31) indicate the four sense lines SL of the receiving device 1a, respectively. Specifically, "1" indicates the sense line SL1 that is closest to the transmitting device 1b. Furthermore, "0" to "1.6" (on a z-axis of each of (b) and (d) of FIG. 31) indicate capacitance values of coupling capacitances obtained from the sense lines SL.

Note that a method of identifying the x-axis and the y-axis is not limited to the method described above. For example, the x-axis and the y-axis can represent a drive line DL and a sense line SL of the receiving device 1a, respectively. Alternatively, the x-axis and the y-axis can represent a sense line SL and a drive line DL of the transmitting device 1b, respectively.

For example, in a case illustrated in (a) of FIG. 30 (i.e. a case where positional shifting is not occurring), four coupling capacitances occur between the respective drive lines DL1 to DL4 of the transmitting device 1b and the sense line SL1, as illustrated in (a) of FIG. 31. In this case, as illustrated in (b) of FIG. 31, the position/angle determining section 505 obtains a signal distribution in which a capacitance value reaches a maximum level at "S1" to "S4" of the sense line SL1 at which the coupling capacitances are occurring.

On the other hand, in a case where, as illustrated in (c) of FIG. 31, the receiving device 1a is shifted in an upward direction of the view (i.e. a direction from the drive line DL4 toward the drive line DL1) by two drive lines DL of the transmitting device 1b, two coupling capacitances respectively occur between the drive line DL1 of the transmitting device 1b and the sense line SL1 (the detection electrode SE3 illustrated in (a) of FIG. 30) and between the drive line DL2 of the transmitting device 1b and the sense line SL2 (the detection electrodes SE4 illustrated in (a) of FIG. 30). In so doing, as illustrated in (d) of FIG. 31, the position/angle determining section 505 obtains a signal distribution in which a capacitance value reaches a maximum level at "S1" and "S2" of the sense line SL1 at which the coupling capacitances are occurring.

The position/angle determining section 505 thus determines a positional relation of a drive line DL of the transmitting device 1b to a sense line SL of the receiving device 1a by generating a signal distribution showing a relationship between (i) a capacitance value of a coupling capacitance determined in accordance with an output signal Vout and (ii) a location of the touch panel 14 of the receiving device 1a or the touch panel 14 of the transmitting device 1b, at which touch panel 14 the coupling capacitance occurred. This allows the position/angle determining section 505 to determine the position of the transmitting device 1b with a precision in units smaller than a line pitch (approximately 5 mm) of a drive line DL or a sense lines SL. In addition, by performing general interpolation, the position/angle determining section 505 can detect the position of the transmitting device 1b with a higher degree of accuracy (i.e. in units of approximately 0.1 mm (which is at least approximately equal to or less than $1/10$ of the line pitch and in units of display pixel pitch)).

Note that a pulse signal to be applied to a drive line DL of the transmitting device 1b can be supplied with line identification information that identifies the drive line DL. This allows the position/angle determining section 505 of the receiving device 1a to determine, by analyzing the line identification information, which part of the outside surface B of the casing 17 coming into contact or approaching corresponds to the drive line DL of the transmitting device 1b.

In a case where the transmitting device 1b and the receiving device 1a are each driven by a sequential driving scheme during the "normal mode," the position/angle determining section 505 can generate a signal distribution as is the case of the orthogonal sequence driving scheme. Specifically, the position/angle determining section 505 can generate a signal distribution by calculating a capacitance value of a coupling capacitance and a location of the coupling capacitance by carrying out inner product operation as described above in accordance with each of output sequence vectors (output signals Vout (X1), Vout (X2), Vout (X3) and Vout (X4)).

(Example of Position Detection by Use of Position detection table)

Other than an operation of detecting the position of the transmitting device 1b by use of a signal distribution as described above, it is alternatively possible to perform a position detection operation by use of a position detection table as illustrated in (c) of FIG. 30. The description below deals with an example of the position detection operation by use of the position detection table. The example will be discussed on the assumption that the orthogonal sequence driving scheme is employed at least in the "normal mode."

(a) of FIG. 30 illustrates a case where drive lines DL (d1 to d4 in (a) of FIG. 30) of the transmitting device 1b and corresponding four detection electrodes 31a (receiving-end detection electrodes) (SE1 to SE4 in (a) of FIG. 30) forming the sense line SL1 of the receiving device 1a are adjacent to each other so as to face each other.

In the present example, an amount by which the transmitting device 1b and the receiving device 1a are shifted from each other (hereinafter referred to as "position shifting amount") is 0 in the case of the positional relation illustrated in (a) of FIG. 30.

In contrast, (b) of FIG. 30 illustrates a case where drive lines DL (d1 to d3 in (b) of FIG. 30) of the transmitting device 1b and corresponding three detection electrodes 31a (SE2 to SE4 in (b) of FIG. 30) forming the sense line SL1 of the receiving device 1a are adjacent to each other so as to face each other. That is, there is no detection electrode 31a of the receiving device 1a, which detection electrode 31a faces the drive line DL4 of the transmitting device 1b. There is also no drive line DL of the transmitting device 1b, which drive line DL faces the detection electrode SE1 of the receiving device 1a.

In the present example, the position shifting amount between the transmitting device 1b and the receiving device 1a is determined to be +1 in a case where the receiving device 1a is thus shifted in an upward direction of the view (i.e. direction from the drive line DL4 toward the drive line DL1) from the transmitting device 1b by one drive line DL.

That is, in the present example, (i) the position shifting amount is expressed in a positive value in a case where the receiving device 1a is shifted from the transmitting device 1b in the upward direction as compared with the state illustrated in (a) of FIG. 30 and (ii) the position shifting amount is expressed in a negative value in a case where the receiving device 1a is shifted from the transmitting device 1b in a downward direction (i.e. direction from the drive lines DL1 toward the drive line DL4) as compared with the state illustrated in (a) of FIG. 30.

In the case illustrated in (a) of FIG. 30, coupling capacitances occur between the drive lines DL1 to DL4 of the transmitting device 1b and the corresponding detection electrodes SE1 to SE4 of the sense line SL1 of the receiving device 1a. Then, in a case where inner product operation as described above is carried out and then respective capacitance values of the coupling capacitances are each C, (i) capacitance values of coupling capacitances when pulse signals are received a first time are 4 C, (ii) capacitance values of coupling capacitances when pulse signal are received a second time are 0, (iii) capacitance values of coupling capacitances when pulse signal are received a third time are 0, and (iv) capacitance values of coupling capacitances when pulse signal are received a fourth time are 0.

On the other hand, in the case illustrated in (b) of FIG. 30, coupling capacitances occur between drive lines DL1 to DL3 of the transmitting device 1b and the corresponding detection electrodes SE2 to SE4 of the sense line SL1 of the receiving device 1a, whereas no coupling capacitance occurs at the drive line DL4.

In this case, no coupling capacitance corresponding to C4 of the above described output signals Vout (Y1) to Vout (Y4) occurs (i.e. C4=0). Therefore, (i) the capacitance values of the coupling capacitances when pulse signals are received a first time are 3 C, (ii) capacitance values of coupling capacitances when pulse signals are received a second time are 1 C, (iii) capacitance values of coupling capacitances when pulse signals are received a third time are 1 C, and (iv) capacitance values of coupling capacitances when pulse signals are received a fourth time are -1 C.

In a case where the receiving device 1a is thus shifted by a drive line DL (or drive electrode 32) of the transmitting device 1b (i.e. by a detection electrode 31a (sense line SL) of the receiving device 1a), a coupling capacitance corresponding to each of C1 to C4 of the above described output signals Vout (Y1) to Vout (Y4) varies. This predetermined particular patterns are shown in the position detection table illustrated in (c) of FIG. 30.

As illustrated in (c) of FIG. 30, in a case where, for example, the receiving device 1a is shifted in the upward direction by two drive lines DL of the transmitting device 1b ("+2" in (c) of FIG. 30) as compared with the state illustrated in (a) of FIG. 30, no coupling capacitance corresponding to C3 or C4 of the above described output signals Vout occurs. In a case where the receiving device 1a is shifted in the downward direction by one drive line DL of the transmitting device 1b ("-1" in (c) of FIG. 30) as compared with the state illustrated in (a) of FIG. 30, no coupling capacitance corresponding to C1 of the above described output signal Vout occurs.

Combinations of capacitance values, which combinations correspond to respective position shifting amounts and are illustrated in (c) of FIG. 30 (e.g. a combination of capacitance values (3 C, 1 C, 1 C, -1 C) corresponding to the position shifting amount of "+1"), show the particular patterns.

Note that a predetermined application pattern refers to a pattern in which voltages are applied to the respective drive lines DL per period as illustrated in FIG. 19. Specifically, the predetermined application pattern refers to a combination of values of voltages which are simultaneously applied, per period, to the respective drive lines DL of the transmitting device 1b and which are equal in number to the drive lines DL of the transmitting device 1b. At least the drive controlling section 601 applies, in accordance with the predetermined application pattern, pulse signals to the respective drive lines DL of the transmitting device 1b.

The predetermined application pattern can be considered to be defined such that a pattern of capacitance values which are obtained when coupling capacitances occur in accordance with the predetermined application pattern and which are equal in number to the drive lines DL of the transmitting device 1b, matches one of a predetermined number of the particular patterns associated in advance with a respective predetermined number of positional relations of at least one of the drive lines DL of the transmitting device 1b to a sense line SL of the receiving device 1a (see (c) of FIG. 30).

The position/angle determining section 505, for example, calculates capacitance values obtained from the respective output signals Vout (Y1) to Vout (Y4), and then compares a combination of the capacitance values with the particular patterns shown in the position detection table. Then, in accordance with a result of the comparison, the position/angle determining section 505 determines a position of the transmitting device 1b in relation to the receiving device 1a (e.g. the transmitting device 1b being adjacent to the receiving device 1a such that the detection electrodes SE2 to SE4 of the receiving device 1a face the corresponding drive lines DL1 to DL3 of the transmitting device 1b).

More specifically, by referring to the position detection table illustrated in (c) of FIG. 30, the position/angle determining section 505 determines which of the particular patterns shown in the position detection table, which particular patterns are indicative of the respective combinations of the capacitance values, matches the pattern of the capacitance values (which are equal in number to the drive lines DL of the transmitting device 1b) obtained at the occurrence of the coupling capacitances at the sense line SL of the receiving device 1a.

Then, in accordance with a result of the determination, the position/angle determining section 505 determines a position of the drive line DL of the transmitting device 1b in relation to the sense line SL of the receiving device 1a. This allows the position of the transmitting device 1b to be accurately determined in units smaller than the line pitch unit. In addition, by interpolation, it is possible to accurately detect the position in units of display pixel pitch.

(Specific Example of Signal Distribution-Based Position Detection)

Next, the description below deals with a specific example of the above described signal distribution-based position detection. More specifically, the description below deals with a relationship between (i) how a drive line DL of transmitting device 1b and a sense line SL of the receiving device 1a are provided during a state illustrated in (a) of FIG. 13 and (ii) a signal distribution that is obtained when the receiving device 1a detects that the transmitting device 1b comes into contact with or approaches the receiving device 1a.

(1) In Case where Touch Panels are Identical in Shape

The relationship in a case where the touch panel 14 of the transmitting device 1b and the touch panel 14 of the receiving device 1a are identical in shape will be described first with reference to FIGS. 32 and 33. Note that the touch panels being identical in shape at least means that the two touch panels 14 (i) are identical in numbers of drive lines DL and of sense lines SL and (ii) are identical in line pitch of the drive lines DL and of the sense lines SL.

Note that the present example discusses, as a mere example, a case where the touch panel 14 of the receiving device 1a includes four drive lines DL and four sense lines SL.

FIG. 32 is a view illustrating each of relationships between (i) electrode arrangement of the transmitting device 1b and of the receiving device 1a and (ii) a signal distribution obtained when the contact or approach is detected. FIG. 32 illustrates cases where the receiving device 1a is shifted in the upward direction by two drive lines DL of the transmitting device 1b as shown in the "conceptual image" column.

(a) through (d) of FIG. 33 illustrate equivalent circuits corresponding to the cases 1 to 4 illustrated in FIG. 32, respectively, when the contact or approach is detected.

Examples of the arrangement of the drive lines DL of the transmitting device 1b and the sense lines SL of the receiving device 1a encompass the four patterns illustrated in FIG. 32. In each of the four patterns, a signal distribution ("output example") as described above is obtained. Note that the case 1 illustrated in FIG. 32 is a case where (i) the electrode arrangement is as illustrated in FIGS. 29 through 31 and (ii) a signal distribution is as illustrated in (d) of FIG. 31.

According to the electrode arrangement in each of the cases 1 to 3 of FIG. 32, it is possible to obtain a signal distribution that corresponds to position shifting unique to the case. Therefore, in the cases 1 to 3, the receiving device 1a can determine position shifting in a Y-axis direction. This allows the position of the transmitting device 1b in relation to the receiving device 1a to be accurately determined.

On the other hand, according to the electrode arrangement in the case 4, although position shifting is occurring, the signal distribution is similar to a signal distribution obtained in a case where no position shifting is occurring (see (a) of FIG. 31). Therefore, according to the electrode arrangement of the case 4, it is difficult to detect the position of the transmitting device 1b.

Therefore, in a case where the touch panels 14 are identical in shape, the receiving device 1a can accurately detect the position of the transmitting device 1b by using the transmitting device 1b and the receiving device 1a which have a relation in terms of electrode arrangement as illustrated in each of the cases 1 to 3.

(2) Case where Touch Panels Differ in Size (Case A)

Next, the relationship in a case where the touch panel 14 of the transmitting device 1b is larger in size than the touch panel 14 of the receiving device 1a will be described with reference to FIGS. 34 and 35.

Note that the touch panels 14 differing in size means that the two touch panels 14 (i) are different in numbers of drive lines DL and of sense lines SL and (ii) are identical in line pitch of the drive lines DL and of the sense lines SL.

Note that the present example discusses, as a mere example, a case where (i) the touch panel 14 of the receiving device 1a includes four drive lines DL and four sense lines SL and (ii) the touch panel 14 of the transmitting device 1b includes eight drive lines DL and four sense lines SL.

In each of signal distributions obtained by the position/angle determining section 505, "Sequence 1" to "Sequence 8" (y-axes in FIG. 34) respectively indicate positions, on the sense line SL1, of eight drive lines DL1 to DL8 of the transmitting device 1b. Anything other than the matters described above is similar to (b) and (d) of FIG. 31.

FIG. 34 is a view illustrating each of relationships between (i) electrode arrangement of the transmitting device 1b and of the receiving device 1a and (ii) a signal distribution obtained when the contact or approach is detected. FIG. 34 illustrates cases where the receiving device 1a is coming into contact with or approaching a side surface of the transmitting device 1b as shown in the "conceptual image" column.

(a) through (d) of FIG. 35 illustrate example equivalent circuits corresponding to the cases 1 to 4 illustrated in FIG. 34, respectively, when the contact or approach is detected.

Examples of the arrangement of the drive lines DL of the transmitting device 1b and the sense lines SL of the receiving device 1a encompass the four patterns illustrated in FIG. 34. According to the electrode arrangement of each of the cases 1 and 3, the signal distribution is configured such that capacitance values of coupling capacitances are at a maximum level in "Sequence 2" to "Sequence 5" corresponding to the drive lines DL of the transmitting device 1b.

According to the electrode arrangement of each of the cases 1 and 3 of FIG. 34, it is possible to obtain a signal distribution that corresponds to position shifting unique to the case. This allows the receiving device 1a to determine position shifting in a Y-axis direction.

On the other hand, according to the electrode arrangement of each of the cases 2 and 4, no change occurs to an obtained signal distribution even in a case where the positional relation with the transmitting device 1b changes. Therefore, according to the electrode arrangement of each of the cases 2 and 4, it is difficult to detect the position of the transmitting device 1b.

Therefore, in a case where the touch panels 14 differ in size as shown in the "conceptual image" column of FIG. 34, the receiving device 1a can accurately detect the position of the transmitting device 1b by using the transmitting device 1b and the receiving device 1a which are in a relation in terms of electrode arrangement as illustrated in each of the cases 1 and 3.

(3) Case where Touch Panels Differ in Size (Case B)

The relationship in a case where the touch panel 14 of the receiving device 1a is larger in size than the touch panel 14 of the transmitting device 1b will be described next with reference to FIGS. 36 and 37.

The present example discusses, as a mere example, a case where (i) the touch panel 14 of the receiving device 1a includes eight drive lines DL and eight sense lines SL and (ii) the touch panel 14 of the transmitting device 1b includes four drive lines DL and four sense lines SL.

FIG. 36 is a view illustrating each of relationships between (i) electrode arrangement of the transmitting device 1b and of the receiving device 1a and (ii) a signal distribution obtained when the contact or approach is detected. FIG. 36 illustrates cases where the receiving device 1a is coming into contact with or approaching a side surface of the transmitting device 1b as shown in the "conceptual image" column.

In each of the signal distributions in the "output example" column of FIG. 36, (i) "Sequence 1" to "Sequence 8" (y-axes in FIG. 36) respectively indicate the eight sense lines SL of the receiving device 1a and (ii) "1" to "8" (x-axes in FIG. 36) respectively indicate the eight drive lines DL of the receiving device 1a.

(a) through (d) of FIG. 37 illustrate example equivalent circuits corresponding to the cases 1 to 4 illustrated in FIG. 36, respectively, when the contact or approach is detected.

Examples of the arrangement of the drive lines DL of the transmitting device 1b and the sense lines SL of the receiving device 1a encompass the four patterns illustrated in FIG. 36. According to the electrode arrangement of each of the cases 2 and 3, the signal distribution is configured such that capacitance values of coupling capacitances are at a maximum level in the vicinity of "Sequence 2" to "Sequence 5" corresponding to the sense lines SL of the receiving device 1a.

According to the electrode arrangement of each of the cases 2 and 3 of FIG. 36, it is possible to obtain a signal distribution that corresponds to position shifting unique to the case. This allows the receiving device 1a to determine position shifting in a Y-axis direction.

On the other hand, according to the electrode arrangement of each of the cases 1 and 4, no change occurs to an obtained signal distribution even in a case where the positional relation with the transmitting device 1b changes. Therefore, according to the electrode arrangement of each of the cases 1 and 4, it is difficult to detect the position of the transmitting device 1b.

Therefore, in a case where the touch panels 14 differ in size as shown in the "conceptual image" column of FIG. 36, the receiving device 1a can accurately detect the position of the transmitting device 1b by using the transmitting device 1b and the receiving device 1a which are in a relation in terms of electrode arrangement as illustrated in each of the cases 2 and 3.

(4) Case where Devices Overlap

The following description will discuss, with reference to FIG. 38, a case where, as illustrated in (b) of FIG. 13, (i) the receiving device 1a and the transmitting device 1b overlap each other and (ii) a display-region side of the transmitting device 1b and a back surface (surface of the casing 17, which surface is opposite from the display region) of the receiving device 1a face each other. FIG. 38 is a cross-sectional view schematically illustrating the transmitting device 1b and the receiving device 1a in such a state.

As illustrated in FIG. 38, in a case where the receiving device 1a comes into contact with or approaches the transmitting device 1b so as to be placed on or over the transmitting device 1b, there occurs a coupling capacitance between (i) a drive line DL (drive electrode 32) of the touch panel 14 of the transmitting device 1b and (ii) a sense line SL (detection electrode 31a) of the touch panel 14 of the receiving device 1a. By recognizing a change in capacitance value of the coupling capacitance, the receiving device 1a can determine at which part of the transmitting device 1b the receiving device 1a is located.

FIG. 39 is a set of views illustrating equivalent circuits in cases where the receiving device 1a comes into contact with or approaches the transmitting device 1b so as to be placed on or over the transmitting device 1b.

As illustrated in (a) of FIG. 39, in a case where two side surfaces (two sides face each other) of the receiving device 1a have a narrow frame, coupling capacitances occur, when the receiving device 1a comes into contact with or approaches the transmitting device 1b so as to be placed on or over the transmitting device 1b, between (i) sense lines SL provided along the two side surfaces and (ii) the drive lines DL of the transmitting device 1b. This allows the sense lines SL of the receiving devices 1a to receive pulse signals applied to the drive lines DL of the transmitting device 1b.

On the other hand, as illustrated in (b) of FIG. 39, in a case where four side surfaces (all of four sides) of the receiving device 1a have a narrow frame, coupling capacitances occur, when the receiving device 1a comes into contact with or approaches the transmitting device 1b so as to be placed on or over the transmitting device 1b, between (i) sense lines SL provided along the four side surfaces and the detection electrodes 31a and (ii) the drive lines DL of the transmitting device 1b. In this case also, the sense lines SL and the detection electrodes 31a can receive the pulse signals.

Next, the following description will discuss, with reference to FIGS. 40 and 41, a relationship, in a case where the touch panel 14 of the receiving device 1a is placed on or over the touch panel 14 of the transmitting device 1*b* so as to overlap the touch panel 14 of the transmitting device 1*b*, between (i) arrangement of the drive lines DL of the transmitting device 1*b* and the sense lines SL of the receiving device 1*a* and (ii) a signal distribution obtained when the receiving device 1*a* detects that the transmitting device 1*b* comes into contact with or approaches the receiving device 1*a*.

An example, in which the two side surfaces of the receiving device 1*a* have a narrow frame as illustrated in (a) of FIG. 39, will be described first.

FIG. 40 is a view illustrating each of relationships between (i) electrode arrangement of the transmitting device 1*b* and of the receiving device 1*a* and (ii) a signal distribution obtained when the contact or approach is detected. FIG. 40 illustrates cases where the receiving device 1*a* is provided in the vicinity of a center part of the display region of the transmitting device 1*b* so as to overlap the transmitting device 1*b* as shown in the "conceptual image" column.

In each of the signal distributions illustrated in the "output example" column of FIG. 40, (i) "Sequence 1" to "Sequence 8" (y-axes in FIG. 40) in the cases 1 and 3 of FIG. 40 indicate the eight drive lines DL of the transmitting device 1*b*, respectively and (ii) "1" to "8" (x-axes in FIG. 40) in the cases 1 and 3 of the FIG. 40 indicate the eight sense lines SL of the transmitting device 1*b*. On the other hand, the opposite is true in the cases 2 and 4 of FIG. 40. Note that a plane (xy plane) of each of the signal distributions is generated in accordance with basic information of the touch panel 14 which has been transmitted from the transmitting device 1*b* after completion of the above described synchronization adjustment.

Note that as illustrated in the "output example" column in the cases 3 and 4 of FIG. 40, in order to obtain signal distributions that are precise in an x-axis direction and a y-axis direction, it is preferable to measure capacitance values of coupling capacitances of two or more cases (e.g. cases 1 and 2, cases 1 and 4 or the like). This also applies to the "output example" column in the cases 2l to 4 of FIG. 42.

(a) through (d) of FIG. 41 illustrate example equivalent circuits corresponding to the cases 1 to 4 illustrated in FIG. 40, respectively, when the contact or approach is detected.

Examples of the arrangement of the drive lines DL of the transmitting device 1*b* and the sense lines SL of the receiving device 1*a* encompass the four patterns illustrated in FIG. 40. In each of the four patterns, a signal distribution is configured such that capacitance values of coupling capacitances are at a maximum level (i) in the vicinity of "3" to "6" corresponding to the sense lines SL of the transmitting device 1*b* and (ii) in the vicinity of "Sequence 2" to "Sequence 5" corresponding to the drive lines DL of the transmitting device 1*b*.

In the cases 1 and 3, the receiving device 1*a* can determine position shifting in the Y-axis direction. In the cases 2 and 4, the receiving device 1*a* can determine position shifting in the X-axis direction.

Next, the following description will discuss, with reference to FIG. 42, a relationship, in a case where the touch panel 14 of the transmitting device 1*b* is placed on or over the touch panel 14 of the receiving device 1*a* so as to overlap the touch panel 14 of the receiving device 1*a*, between (i) arrangement of the drive lines DL of the transmitting device 1*b* and the sense lines SL of the receiving device 1*a* and (ii) a signal distribution obtained when the receiving device 1*a* detects that the transmitting device 1*b* comes into contact with or approaches the receiving device 1*a*.

In each of the signal distributions illustrated in the "output example" column of FIG. 42, (i) "Sequence 1" to "Sequence 8" (y-axes in FIG. 42) in the cases 1 and 4 of FIG. 42 indicate the eight drive lines DL of the receiving device 1*a*, respectively and (ii) "1" to "8" (x-axes in FIG. 42) in the cases 1 and 4 of the FIG. 42 indicate the eight sense lines SL of the receiving device 1*a*. On the other hand, the opposite is true in the cases 2 and 3 of FIG. 42.

Examples of the arrangement of the drive lines DL of the transmitting device 1*b* and the sense lines SL of the receiving device 1*a* encompass the four patterns illustrated in FIG. 42. As is the case of FIG. 40, in each of the four patterns, a signal distribution is configured such that capacitance values of coupling capacitances are at a maximum level (i) in the vicinity of "3" to "6" corresponding to the sense lines SL of the receiving device 1*a* and (ii) in the vicinity of "Sequence 2" to "Sequence 5" corresponding to the drive lines DL of the receiving device 1*a*.

Note, however, that unlike the case of FIG. 40, the receiving device 1*a* can (i) determine position shifting in the Y-axis direction in the cases 2 and 3 and (ii) determine position shifting in the X-axis direction in the cases 1 and 4.

Note also that the drive lines DL of the transmitting device 1*b* are orthogonal to the sense lines SL of the receiving device 1*a*. In this case, whether a position detection operation is possible is determined depending on a line direction of a larger touch panel 14 (the touch panel 14 of the receiving device 1*a* in the case of FIG. 42). Therefore, it varies between the cases 1 and 2 of FIG. 42 and the cases 1 and 2 of FIG. 40 whether a position detection operation is possible.

On the other hand, in the cases 3 and 4 of FIG. 40 and in the cases 3 and 4 of FIG. 42, the drive lines DL of the transmitting device 1*b* and the sense lines SL of the receiving device 1*a* extend in the same direction (parallel). Therefore, it does not vary between FIG. 40 and FIG. 42 whether a position detection operation is possible.

Note that the above description discusses the case where the two side surfaces of the receiving device 1*a* have a narrow frame. However, even in a case where the four side surfaces have a narrow frame as illustrated in (b) of FIG. 39, it is possible to obtain a signal distribution as in FIG. 43 by the detection electrodes 31*a* receiving pulse signals transmitted from the touch panel 14 of the transmitting device 1*b*, which detection electrodes 31*a* are provided along the four side surfaces.

(5) Case where Devices Overlap (Case where Display Regions Face Each Other)

The following description will discuss, with reference to FIG. 44, a case where, as illustrate in (c) of FIG. 13, (i) the receiving device 1*a* and the transmitting device 1*b* overlap each other and (ii) the respective display regions of the transmitting device 1*b* and of the receiving device 1*a* face each other. FIG. 44 is a cross-sectional view schematically illustrating the transmitting device 1*b* and the receiving device 1*a* in such a state.

As illustrated in FIG. 44, as is the case of FIG. 38, in a case where the receiving device 1*a* comes into contact with or approaches the transmitting device 1*b* so as to be placed on or over the transmitting device 1*b*, there occurs a coupling capacitance between (i) a drive line DL (drive electrode 32) of the transmitting device 1*b* and (ii) a sense line SL (detection electrode 31*a*) of the receiving device 1*a*. By recognizing a change in capacitance value of the coupling capacitance, the receiving device 1*a* can determine at which part of the transmitting device 1*b* the receiving device 1*a* is located.

In this case, since the touch panels 14 of the transmitting device 1b and of the receiving device 1a face each other, (i) the detection electrodes 31a provided along the four side surfaces receive pulse signals from the touch panel 14 of the transmitting device 1b and (ii) the remaining detection electrodes 31 also receive the pulse signals. This allows the receiving device 1a to obtain a signal distribution as illustrated in FIG. 45.

Note that setting or the like of "Sequence 1" to "Sequence 8" and "1" to "8" in FIG. 45 is similar to that described in "Case where devices overlap (Case A)" (case illustrated in (b) of FIG. 13), and therefore will not be described below.

(6) Case where Device is in an Upright Position

A case where, as illustrated in (d) of FIG. 13, the receiving device 1a is so placed on or over the transmitting device 1b that a side surface of the receiving device 1a is adjacent to the transmitting device 1b (the receiving device 1a is placed in an upright position on the transmitting device 1b) will be described next with reference to FIG. 46. FIG. 46 is a cross-sectional view schematically illustrating the transmitting device 1b and the receiving device 1a in such a state.

As illustrated in FIG. 46, as is the case of FIG. 38, in a case where the receiving device 1a comes into contact with or approaches the transmitting device 1b so as to be placed on or over the transmitting device 1b, there occurs a coupling capacitance between (i) a drive line DL (drive electrode 32) of the transmitting device 1b and (ii) a sense line SL (detection electrode 31a) of the receiving device 1a. By recognizing a change in capacitance value of the coupling capacitance, the receiving device 1a can determine at which part of the transmitting device 1b the receiving device 1a is located.

Next, the following description will discuss, with reference to FIGS. 47 and 48, a relationship, in a case where the transmitting device 1b and the receiving device 1a are provided as illustrated in FIG. 46, between (i) arrangement of the drive lines DL of the transmitting device 1b and the sense lines SL of the receiving device 1a and (ii) a signal distribution obtained when the receiving device 1a detects that the transmitting device 1b comes into contact with or approaches the receiving device 1a.

FIGS. 47 and 48 are each a view illustrating relationships between (i) the electrode arrangement of the transmitting device 1b and the receiving device 1a and (ii) signal distributions obtained when the contact or approach is detected. FIG. 47 illustrates cases where, as illustrated in the "conceptual image" column, (i) the side surface of the receiving device 1a is in contact with a partial region Q1 of the display region of the transmitting device 1b and (ii) the receiving device 1a is in an upright position on the display region of the transmitting device 1b. On the other hand, FIG. 48 illustrates cases where, as illustrated in the "conceptual image" column, (i) the side surface of the transmitting device 1b is in contact with a partial region Q2 of the display region of the receiving device 1a and (ii) the transmitting device 1b is in an upright position on the display region of the receiving device 1a.

In each of the signal distributions illustrated in the "output example" column of FIG. 47, (i) "Sequence 1" to "Sequence 8" (y-axes in FIG. 47) in the cases 1 and 3 of FIG. 47 indicate the eight drive lines DL of the transmitting device 1b, respectively and (ii) "1" to "8" (x-axes in FIG. 47) in the cases 1 and 3 of the FIG. 47 indicate the eight sense lines SL of the transmitting device 1b. On the other hand, the opposite is true in the cases 2 and 4 of FIG. 47. Note that a plane (xy plane) of each of the signal distributions is generated in accordance with basic information of the touch panel 14 which has been transmitted from the transmitting device 1b after completion of the above described synchronization adjustment.

On the other hand, in each of the signal distributions illustrated in the "output example" column of FIG. 48, (i) "Sequence 1" to "Sequence 8" (y-axes in FIG. 48) in the cases 1 and 4 of FIG. 48 indicate the eight drive lines DL of the receiving device 1a, respectively and (ii) "1" to "8" (x-axes in FIG. 48) in the cases 1 and 4 of the FIG. 48 indicate the eight sense lines SL of the receiving device 1a. On the other hand, the opposite is true in the cases 2 and 3 of FIG. 48.

Examples of the arrangement of the drive lines DL of the transmitting device 1b and the sense lines SL of the receiving device 1a encompass the four patterns illustrated in FIG. 47. In each case of the electrode arrangement, the signal distribution is configured such that capacitance values of coupling capacitances are at a maximum level (i) in the vicinity of "Sequence 6" corresponding to the drive lines DL of the transmitting device 1b and (ii) in the vicinity of "3" to "6" corresponding to the sense lines SL of the transmitting device 1b.

In the cases 1 and 3, the receiving device 1a can, as is the case of FIG. 40, determine position shifting in the Y-axis direction. In the cases 2 and 4, the receiving device 1a can determine position shifting in the X-axis direction.

Meanwhile, in the case of FIG. 48 also, examples of the arrangement of the drive lines DL of the transmitting device 1b and the sense lines SL of the receiving device 1a encompass the four patterns illustrated in FIG. 48. In each case of the electrode arrangement, the signal distribution is configured such that capacitance values of coupling capacitances are at a maximum level (i) in the vicinity of "Sequence 6" corresponding to the drive line DL of the receiving device 1a and (ii) in the vicinity of "3" to "6" corresponding to the sense lines SL of the receiving device 1a.

In the cases 2 and 3, the receiving device 1a can, as is the case of FIG. 42, determine position shifting in the Y-axis direction. In the cases 1 and 4, the receiving device 1a can determine position shifting in the X-axis direction.

Note that as illustrated in the "output example" column in FIG. 48, in order to obtain signal distributions that are precise in the x-axis direction and the y-axis direction, it is preferable to measure capacitance values of coupling capacitances of two or more cases (e.g. cases 1 and 2, cases 1 and 4 or the like).

(Points Concerning Position Detection)

According to the present embodiment, in a case where the display device 1 or the like is equipped with functions of both the receiving device 1a and the transmitting device 1b, display devices 1 or the like are each capable of switching between the functions of the transmitting device 1b and of the receiving device 1a at any time. In such a case, the display devices 1 or the like can each recognize a position of its counterpart device in real time. That is, both devices, whether they are both smartphones or a smartphone and a tablet computer, can perform operations of detecting positions of each other in real time.

The switching between the functions of the receiving device 1a and of the transmitting device 1b can be realized by, for example, one display device 1 or the like (i) performing an operation of detecting a position of the other display device 1 or the like and then (ii) notifying the other display device 1 or the like that the operation has been performed.

<Angle Detection Process>

The following description will discuss, with reference to FIGS. 49 through 51, a case where the position/angle determining section 505 determines, as a position of the transmitting device 1b (counterpart device), a tilt of the receiving device 1a in relation to the transmitting device 1b.

(a) through (c) of FIG. 49 are each a view illustrating a positional relation between the transmitting device 1b and the receiving device 1a. (d) of FIG. 49 is a view illustrating a tilt detection table that serves as a replacement of the position detection table. (a) through (d) of FIG. 50 are views illustrating example equivalent circuits that correspond to respective angles, shown on the tilt detection table, when contact or approach of the transmitting device 1b is detected. (a) through (d) of FIG. 51 are signal distributions corresponding to the respective angles.

(Example of Signal Distribution-based Tile Detection)

As is the case of the above described operation of detecting the position of a counterpart device, the position/angle determining section 505, in accordance with a result of inner product operation of a output sequence vector and a code sequence, calculates (i) a location of a coupling capacitance that occurred between a drive line DL of the transmitting device 1b and a sense line SL of the receiving device 1a and (ii) a capacitance value of the coupling capacitance at the location. Then, based on the capacitance value and the location thus calculated, the position/angle determining section 505 generates a signal distribution as illustrated in FIG. 51 so as to determine the tilt of the receiving device 1a in relation to the transmitting device 1b.

Note that FIG. 50 illustrates, as a mere example, a case where (i) the touch panel 14 of the receiving device 1a includes four drive lines DL and four sense lines SL and (ii) the touch panel 14 of the transmitting device 1b includes eight drive lines DL and eight sense lines SL. The touch panels 14 of the receiving device 1a and of the transmitting device 1b are identical in line pitch of each line.

The equivalent circuits illustrated in (a) through (d) of FIG. 50 correspond to the signal distributions illustrated in (a) through (d) of FIG. 51, respectively. (a) through (d) of FIG. 50 illustrate cases where an angle θ, which is formed between a line segment L illustrated in (a) of FIG. 49 or the like and the sense line SL1 of the receiving device 1a, is 0°, 41°, 60° and 76°, respectively. In each of (a) through (d) of FIG. 51, "1" to "8" (x-axes in each of (a) through (d) of FIG. 51) indicate eight sense lines SL1 of the transmitting device 1b, and the "Sequence 1" to "Sequence 8" (y-axes in each of (a) through (d) of FIG. 51) indicate eight drive lines DL of the transmitting device 1b, respectively. In each of (a) through (d) of FIG. 51, a z-axis indicates a capacitance value of a coupling capacitance. Note that a plane (xy plane) of each of the signal distributions is generated in accordance with basic information of the touch panel 14 which has been transmitted from the transmitting device 1b after completion of the above described synchronization adjustment.

By generating a signal distribution, the position/angle determining section 505 determines, as a position of the transmitting device 1b, a tilt (angle) at which the receiving device 1a is tilted, on an operation screen of the touch panel 14 of the receiving device 1a, from a line segment L in a plane including the operation screen. In other words, the position/angle determining section 505 determines an angle (angle θ), in the operation screen of the touch panel 14 of the receiving device 1a, between (i) a reference line (sense line SL) set within an operation screen of the touch panel 14 of the transmitting device 1b and (ii) a reference line (any line segment L) set within the operation screen of the touch panel 14 of the receiving device 1a.

With the configuration, it is possible to determine the angle of the transmitting device 1b with respect to the receiving device 1a (or the angle of the receiving device 1a with respect to the transmitting device 1b). This makes it possible to recognize, as the angle, a positional relation of the receiving device 1a to the transmitting device 1b. In addition, by performing interpolation, it is possible to determine the angle in unit of approximately 1°. That is, it is possible to accurately detect the angle.

(Example of Tilt Detection by Use of Tilt Detection Table)

In addition to the tilt detection by use of a signal distribution, the position/angle determining section 505 can also detect the tilt by use of the tilt detection table illustrated in (d) of FIG. 49. An example of such a process will be described below.

FIG. 49 illustrates cases where the respective touch panels 14 of the transmitting device 1b and of the receiving device 1a (i) each include four drive lines DL and four sense lines SL and (ii) are identical in line pitch. Note, however, that the numbers of drive lines DL and sense lines SL are not limited to such an example.

(a) of FIG. 49 illustrates a case where the angle θ between any line segment L and the sense line SL1 of the receiving device 1a is 0°. In this case, coupling capacitances occur between the drive lines DL1 to DL4 of the transmitting device 1b and the respective detection electrodes SE1 to SE4 of the sense line SL1 of the receiving device 1a. That is, as is the case of the equivalent circuit illustrated in (a) of FIG. 50, four coupling capacitances occur on a surface of the receiving device 1a.

In this case, respective capacitance values of the coupling capacitances are each C, (i) capacitance values of coupling capacitances when pulse signals are received a first time are 4 C, (ii) capacitance values of coupling capacitances when pulse signals are received a second time are 0, (iii) capacitance values of coupling capacitances when pulse signals are received a third time are 0, and (iv) capacitance values of coupling capacitances when pulse signals are received a fourth time are 0.

(b) of FIG. 49 illustrates a case where the angle θ between any line segment L and the sense line SL1 of the receiving device 1a is 41°. In this case, while coupling capacitances occur between the drive line DL2 to DL4 of the transmitting device 1b and the sense line SL1 (at least one of the detection electrodes SE1 to SE4) of the receiving device 1a, no coupling capacitance occurs at the drive line DL1. That is, as is the case of the equivalent circuit illustrated in (b) of FIG. 50, three coupling capacitances occur on a surface of the receiving device 1a.

In this case, no coupling capacitance corresponding to C1 of the above described output signals Vout (Y1) to Vout (Y4) is occurring (i.e. C1=0). This applies to a particular pattern shown in the "41°" column of (d) of FIG. 49 (capacitance values of the first time to the fourth time are 3 C, −1 C, −1 C and −1 C, respectively).

Likewise, (c) of FIG. 49 illustrates a case where the angle θ between any line segment L and the sense line SL1 of the receiving device 1a is 60°. In this case, while coupling capacitances occur between the drive line DL3 to DL4 of the transmitting device 1b and the sense line SL1 of the receiving device 1a, no coupling capacitance occurs at the drive line DL1 and the drive line DL2. That is, as is the case of the equivalent circuit illustrated in (c) of FIG. 50, two coupling capacitances occur on a surface of the receiving device 1a.

In this case, no coupling capacitance corresponding to C1 or C2 of the above described output signals Vout (Y1) to Vout (Y4) is occurring (i.e. C1=C2=0). This applies to a particular pattern shown in the "60°" column of (d) of FIG. 49 (capacitance values of the first time to the fourth time are 2 C, 0, −2 C and 0, respectively).

Assume a case where the angle θ between a line segment L and the sense line SL1 of the receiving device 1a is 76°. In this case, while coupling capacitances occur between the drive line DL4 of the transmitting device 1b and the sense line SL1 of the receiving device 1a, no coupling capacitance occurs at the drive lines DL1 to DL3. That is, as illustrated in (d) of FIG. 50, a single coupling capacitance occurs on a surface of the receiving device 1a.

In this case, no coupling capacitance corresponding to any of C1 to C3 of the above described output signals Vout (Y1) to Vout (Y4) is occurring (i.e. C1=C2=C3=0). This applies to a particular pattern shown in the "76°" column of (d) of FIG. 49 (capacitance values of the first time to the fourth time are 1 C, −1 C, −1 C and 1 C, respectively).

In a case where the receiving device 1a is thus shifted by a drive line DL of the transmitting device 1b, a coupling capacitance corresponding to each of C1 to C4 of the above described output signals Vout (Y1) to Vout (Y4) varies. This predetermined particular patterns are shown in the tilt detection table illustrated in (d) of FIG. 49.

As is the case of a position detection operation, the position/angle determining section 505, for example, calculates capacitance values obtained from the respective output signals Vout (Y1) to Vout (Y4), and then compares a combination of the capacitance values with the particular patterns shown in the tilt detection table. Then, in accordance with a result of the comparison, the position/angle determining section 505 determines the tilt of the receiving device 1a with respect to the transmitting device 1b.

In this process also, as has been described, it is possible to recognize, as an angle of the receiving device 1a, a positional relation of the receiving device 1a to the transmitting device 1b. In addition, by interpolation, it is possible to determine the angle in unit of approximately 1°.

<High-accuracy Position Detection Operation and Low-accuracy Position Detection Operation>

As described above, with the position/angle determining section 505, it is possible to detect a position of a counterpart device with a precision in units smaller than a line pitch unit (e.g. in units of display pixel pitch). In other words, the receiving device 1a can be considered as capable of highly accurately detecting a position of a counterpart device (i.e. performing a high-accuracy position detection operation).

Note that it is not possible to highly accurately perform a position detection operation by the device detection section 502 analyzing an output signal Vout. However, it is still possible to roughly perform position detection (low-accuracy position detection) to such an extent that the receiving device 1a substantially detect a position of a counterpart device in relation to the receiving device 1a (e.g. the receiving device 1a determines that the transmitting device 1b is present at a partial region of a surface of the receiving device 1a or is present on a display-region side of the receiving device 1a).

Therefore, in a case where a low-accuracy position detection operation is to be performed, the receiving device 1a does not necessarily need to be equipped with a function (the synchronization adjusting section 503, the mode changing section 504 and the position/angle determining section 505) for a position detection operation by the position/angle determining section 505. That is, in such a case, the receiving device 1a only needs to be equipped with a position detection function to detect that a finger or the like (detection target object), which serves as a control function of a general touch panel 14, has come into contact with or approached the receiving device 1a (i.e. the function of the device detection section 502 of the receiving device 1a).

<Data Communications Between Touch Panels>

Data communications between the touch panel 14 of the transmitting device 1b and the touch panel 14 of the receiving device 1a will be described below with reference to FIG. 52. FIG. 52 is a view illustrating an equivalent circuit showing data communications between the touch panels 14.

As described above, after the receiving device 1a detects the position of the transmitting device 1b, the transmitting device 1b transmits predetermined data to the receiving device 1a (S4 to S5 illustrated in FIG. 22, S19 to S20 illustrated in FIG. 24).

Examples of the predetermined data encompass various data such as basic information (number of nodes, pitch, driving scheme and the like) of the touch panel 14 of the transmitting device 1b; moving image; still image; content such as text data; program (application); the function of the transmitting device 1b; and status.

Examples of the predetermined data can also encompass: device identification information (device information, device ID) for identifying the transmitting device 1b; and/or user identification information (user information, user ID) for identifying a user who uses the transmitting device 1b. In a case where the transmitting device 1b does not include the display panel 12 (e.g. a card including a touch panel 14), the device identification information is information contained in the card.

After the position detection is performed, the receiving device 1a determines a sense line SL at which capacitance coupling is occurring. In this case, after the position/angle determining section 505 performs the position detection operation, the data transmitting and receiving section 506 of the receiving device 1a notifies, via the communication section 51, the transmitting device 1b of a drive line DL at which the capacitance coupling is occurring. Note that such notification is not necessarily required in a case where, for example, the transmitting device 1b can recognize a drive line DL at which coupling capacitance is occurring, such as a case where the transmitting device 1b is equipped with the function of the receiving device 1a in combination with the function thereof.

The transmitting device 1b is configured such that in a case where the drive controlling section 601 recognizes a drive line DL at which capacitance coupling is occurring, the drive controlling section 601 generates, by referring to the storage section 62, a pulse signal (data pulse) on which predetermined data to be transmitted to the receiving device 1a is superimposed. Then, the drive controlling section 601 applies the pulse signal to the drive line DL at which the capacitance coupling is occurring.

The receiving device 1a is configured such that the data transmitting and receiving section 506 receives, via the sense line SL at which the capacitance coupling is occurring, predetermined data that is superimposed on the pulse signal.

Since capacitance coupling is thus occurring between a drive line DL of the transmitting device 1b and a sense lines SL of the receiving device 1a, it is possible to realize data communications between the touch panels 14 by utilizing a pulse signal applied to the drive line DL Note that in a case where, for example, the touch panels 14 of the transmitting device 1b and of the receiving device 1a are driving in parallel in the case 1 illustrated in FIG. 32, it is possible to increase an amount of data communications per unit time in comparison with a case where the touch panels 14 are driving sequentially. That is, in the case of parallel driving, it is possible to carry out communications at higher speed than is the case of sequential driving.

Assume a case as in, for example, the case 3 illustrated in FIG. 32, where a drive line DL of the transmitting device 1b and a sense line SL of the receiving device 1a have a one-to-one correspondence. In this case, it is possible to realize high-speed communications as described above even by the sequential driving without performing encoding as in the parallel driving.

In a case where, as illustrated in (c) of FIG. 13, the respective display regions of the transmitting device 1b and of the receiving device 1a face each other, coupling capacitances occur across the entire sense lines SL of the receiving device 1a as illustrated in FIG. 45. Therefore, it is possible to configure the amount of data communications to be larger in comparison with the case illustrated in (a) of FIG. 13 or the like where coupling capacitances occur only at part of the sense lines SL of the receiving device 1a.

(Function of Transmitting Device 1b During Data Communications Between Touch Panels)

On the other hand, in order to realize the data communications, the drive controlling section 601 of the transmitting device 1b can be considered to be equipped with a function to (i) add, to a pulse signal, predetermined data to be transmitted to the receiving device 1a and (ii) apply the pulse signal to a drive line DL of the touch panel 14 of the transmitting device 1b.

In this case, the information processing system 5 illustrated in FIG. 13 can be considered as a synchronization process system including the transmitting device 1b and the receiving device 1a for performing the data communications.

[Software Implementation Example]

Control blocks of the display devices 1, 2, and 3 (particularly (i) the components included in the receiving device 1a, i.e. the drive controlling section 501, the device detection section 502, the synchronization adjusting section 503, the mode changing section 504, the position/angle determining section 505, and the data transmitting and receiving section 506 or (ii) the components included in the transmitting device 1b, i.e. the drive controlling section 601, the mode changing section 602, and the data transmitting and receiving section 603) may be realized by a logic circuit (hardware) provided in an integrated circuit (IC chip) or the like, or may be realized by software as executed by a central processing unit (CPU).

In the latter case, the display device 1 and the like includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a data signal embedded in a carrier wave which is embodied by electronic transmission.

[Recap]

<Position/Angle Detection>

An electronic device according to Aspect 1 of the present invention is an electronic device serving as a receiving device (receiving device 1a), including: a receiving-end touch panel (touch panel) being a capacitive touch panel which detects contact of a target object or approach thereof, the receiving-end touch panel (touch panel 14) including receiving-end sense lines (sense lines SL) each capable of receiving at least one of pulse signals applied to respective transmitting-end drive lines (drive lines DL) which are provided in a transmitting-end touch panel (touch panel 14), being a capacitive touch panel, of a transmitting device having contacted or approached the electronic device; and a determining section (position/angle determining section 505) for determining a position of the transmitting device (transmitting device 1b) in relation to the electronic device by judging which of the receiving-end sense lines has received the at least one of the pulse signals transmitted from the respective transmitting-end drive lines.

According to the above arrangement, judgment is performed as to which of the receiving-end sense lines of the electronic device has received the at least one of the pulse signals applied to the transmitting-end drive lines provided in the transmitting device. This makes it possible to recognize a positional relation between (i) the transmitting-end drive line to which the pulse signal has been applied (which has supplied the pulse signal to the electronic device) and (ii) the receiving-end sense line which has received the pulse signal.

The above arrangement thus makes it possible to determine the position of the transmitting device in relation to the electronic device, in units smaller than a distance (line pitch) between adjacent transmitting-end drive lines or between adjacent receiving-end sense lines (i.e. with a higher degree of accuracy). For example, interpolation allows detecting the position with a high degree of accuracy in units of display pixel pitch (approximately 0.1 mm).

Further, an electronic device (receiving device 1a) according to Aspect 2 of the present invention is preferably, in Aspect 1, such that the determining section performs the judgment by detecting a change in capacitance value which change occurs in at least one of the receiving-end sense lines due to a coupling capacitance that has occurred between the at least one of the receiving-end sense lines and at least one of the transmitting-end drive lines.

According to the above arrangement, a pulse signal is applied to the at least one of the transmitting-end drive lines of the transmitting-end touch panel included in the transmitting device which has contacted or approached the electronic device. Thus, a coupling capacitance, which is different from capacitance formed in the receiving-end touch panel, occurs between the at least one of the transmitting-end drive lines and the at least one of the receiving-end sense lines.

The above arrangement thus makes it possible to judge which of the receiving-end sense lines has received the pulse signal, by detecting a change in capacitance value which change occurs in at least one of the receiving-end sense lines due to the coupling capacitance.

Still further, an electronic device (receiving device 1a) according to Aspect 3 of the present invention is preferably, in Aspect 2, such that the determining section determines a positional relation of the at least one of the transmitting-end drive lines to the at least one of the receiving-end sense lines, by generating distribution (signal distribution) of capacitance values which have occurred at the at least one of the receiving-end sense lines due to the coupling capacitance, the distribution showing a relationship between (i) the capacitance values and (ii) a position of at least one of the receiving-end touch panel and the transmitting-end touch panel, at which touch panel the capacitance values have occurred.

According to the above arrangement, the determining section generates the distribution of the capacitance values in order to recognize the magnitude of the coupling capacitance that has occurred in a position of the receiving-end touch panel and/or the transmitting-end touch panel. The generation of the distribution of the capacitance values thus enables determining a positional relation of the transmitting device to the electronic device, in units smaller than a line pitch, for example, in units as small as display pixel pitch.

Yet further, an electronic device (receiving device 1a) according to Aspect 4 of the present invention is preferably, in Aspect 2, such that the pulse signals are applied to the respective transmitting-end drive lines in accordance with a predetermined application pattern indicative of a combination of values of voltages which are simultaneously applied, per period, to the respective transmitting-end drive lines and which are equal in number to the transmitting-end drive lines; the application pattern is defined such that a pattern of capacitance values which are obtained when coupling capacitances occur in accordance with the predetermined application pattern and which are equal in number to the transmitting-end drive lines, matches one of a predetermined number of particular patterns indicative of respective combinations of the capacitance values, the particular patterns being associated in advance with a respective predetermined number of positional relations of the at least one of the transmitting-end drive lines to the at least one of the receiving-end sense lines; the determining section determines the positional relation of the at least one of the transmitting-end drive lines to the at least one of the receiving-end sense lines by determining which of the particular patterns matches the pattern of the capacitance values obtained at the occurrence of the coupling capacitances at the at least one of the receiving-end sense lines.

According to the above arrangement, the determining section determines the positional relation by determining which of the particular patterns indicative of the respective combinations of the capacitance values matches the pattern of the capacitance values which are obtained at the occurrence of the coupling capacitances at the at least one of the receiving-end sense lines and which are equal in number to the transmitting-end drive lines.

The particular pattern is defined based on the application pattern of the pulse signals applied to the respective transmitting-end drive lines of the transmitting device. Thus, it is possible to determine a positional relation of the transmitting device to the electronic device, in units smaller than a line pitch, for example, in units as small as display pixel pitch by, upon receiving the pulse signals from the transmitting device having contacted or approached the electronic device, performing the determination as to a match of which of the particular patterns.

Further, an electronic device (receiving device 1a) according to Aspect 5 of the present invention is preferably, in any one of Aspects 1 to 4, such that out of a plurality of receiving-end detection electrodes (detection electrodes 31 and 31a) of which each of the receiving-end sense lines is made up, a receiving-end detection electrode (detection electrode 31a) provided along an outer edge of the receiving-end touch panel receives the at least one of the pulse signals.

According to the above arrangement, the pulse signal is received by the receiving-end detection electrode provided along the outer edge of receiving-end touch panel. This makes it possible to reliably determine the position of the transmitting device in a case where a side surface of the transmitting device has contacted or approached at least a side surface of the electronic device (in the pattern shown in (a) of FIG. 13).

Further, in a case where the electronic device is smaller than the transmitting device (in a case where the number of receiving-end drive lines or receiving-end sense lines provided in the receiving-end touch panel is smaller than the number of transmitting-end drive lines or transmitting-end sense lines provided in the transmitting-end touch panel), it is possible to reliably determine the position of the transmitting device in other contact or approach pattern (in the patterns respectively shown in, for example, (b) to (d) of FIG. 13).

Still further, an electronic device (receiving device 1a) according to Aspect 6 of the present invention is preferably, in any one of Aspects 1 to 5, such that the determining section determines an angle, in an operation screen of the receiving-end touch panel, between (i) a reference line set within an operation screen of the transmitting-end touch panel and (ii) a reference line set within the operation screen of the receiving-end touch panel.

According to the above arrangement, determining an angle between the reference line set within the receiving-end touch panel and the reference line set within the transmitting-end touch panel enables determining an angle, in the operation screen of the receiving-end touch panel, formed by the transmitting device with respect to the electronic device. This makes it possible to recognize, as the angle, the positional relation with the transmitting device.

Yet further, an electronic device (receiving device 1a) according to Aspect 7 of the present invention is preferably, in any one of Aspects 1 to 6, such that the electronic device further includes: a receiving-end drive control section (drive controlling section 501) for controlling application of pulse signals for detecting the contact of the target object or the approach thereof to respective receiving-end drive lines (drive lines DL) provided in the receiving-end touch panel, the receiving-end drive control section stopping the application of the pulse signals to the respective receiving-end drive lines, in a case where the determining section determines the position of the transmitting device.

According to the above arrangement, by stopping the application of the pulse signals to the respective receiving-end drive lines in determining the position of the transmitting device, it is possible to stop detecting a target object (a target object that is not the transmitting device) based on a change in capacitance value of capacitance formed between the receiving-end drive line and the receiving-end sense line. This makes it possible to drive the receiving-end touch panel for the purpose of focusing on detection of the position of the transmitting device, and thus makes it possible to prevent an adverse effect of the position determination, such as a decrease in accuracy in determining the position of the transmitting device due to the target object detection.

Further, it is possible to reduce power consumption required for the position detection.

Further, an electronic device (receiving device 1a) according to Aspect 8 of the present invention is preferably, in any one of Aspects 1 to 7, such that the electronic device further includes: a receiving-end casing (casing 17) into which the receiving-end touch panel is incorporated, a minimum distance between the receiving-end touch panel and an outside surface of the receiving-end casing is not larger than a detectable distance within which the receiving-end touch panel is capable of detecting the contact of the target object with the outside surface (outside surface A or B) or the approach thereof to the outside surface.

According to the above arrangement, it is possible to detect contact of the target object with the outside surface of the receiving-end casing or approach thereof to the outside surface of the receiving-end casing.

Still further, an electronic device (receiving device 1a) according to Aspect 9 of the present invention is preferably, in Aspect 8, such that the receiving-end touch panel is provided so as to overlap a receiving-end display screen.

According to the above arrangement, it is possible to detect the position of the transmitting device with a high degree of accuracy. This allows an image displayed on the receiving-end display screen to be precisely aligned with respect to the transmitting device.

Yet further, an electronic device according to Aspect 10 of the present invention is an electronic device serving as a transmitting device (transmitting device 1b), including: a transmitting-end touch panel (touch panel 14) being a capacitive touch panel which detects contact of a target object or approach thereof, the transmitting-end touch panel including transmitting-end drive lines; and a transmitting-end casing (casing 17) into which the transmitting-end touch panel is incorporated, wherein a minimum distance between the transmitting-end touch panel and an outside surface of the transmitting-end casing is not larger than a detectable distance within which the transmitting-end touch panel is capable of detecting the contact of the target object with the outside surface (outside surface A or B) or the approach thereof to the outside surface, wherein at least one of pulse signals for detecting the contact of the target object or the approach thereof, the pulse signals having been applied to the respective transmitting-end drive lines, is received by a receiving-end touch panel (touch panel 14), which is a capacitive touch panel provided in a receiving device (receiving device 1a) capable of receiving the at least one of the pulse signals, when the receiving device approaches or contacts the electronic device, in order that the receiving device is allowed to determine a position of the electronic device.

According to the above arrangement, the minimum distance is not larger than a detectable distance within which the transmitting-end touch panel is capable of detecting the contact of the target object with the outside surface of the transmitting-end casing or the approach thereof to the outside surface of the transmitting-end casing. This allows the receiving-end touch panel included in the receiving device to receive the pulse signal having been applied to the transmitting-end drive line. This allows the receiving device (i) to judge which of the receiving-end sense lines has received the pulse signal and (ii) to recognize a positional relation between the transmitting-end drive line of the electronic device and the receiving-end sense line of the receiving device.

The above arrangement thus allows the receiving device to determine the position of the electronic device in relation to the receiving device, in units smaller than a distance (line pitch) between adjacent transmitting-end drive lines or between adjacent receiving-end sense lines (i.e. with a higher degree of accuracy). For example, interpolation allows detecting the position with a high degree of accuracy in units of display pixel pitch (approximately 0.1 mm).

Further, an electronic device (transmitting device 1b) according to Aspect 11 of the present invention is preferably, in Aspect 10, such that the electronic device further includes: a transmitting-end drive control section for carrying out drive control with respect to transmitting-end sense lines in order that a change in capacitance formed between at least one of the transmitting-end drive lines and at least one of the transmitting-end sense lines is detected, the transmitting-end drive control section applying the pulse signals to the respective transmitting-end drive lines in accordance with a predetermined application pattern indicative of a combination of values of voltages which are simultaneously applied, per period, to the respective transmitting-end drive lines and which are equal in number to the transmitting-end drive lines.

According to the above arrangement, only by applying the pulse signals to the respective transmitting-end drive lines in the predetermined application pattern used when contact of the target object or approach thereof is to be detected, the receiving device can perform the position determination accurately.

Still further, an electronic device (transmitting device 1b) according to Aspect 12 of the present invention is preferably, in Aspect 10 or 11, such that the transmitting-end drive control section stops the drive control carried out with respect to the transmitting-end sense lines, in a case where the position of the electronic device is determined by the receiving device.

In a case where the position of the electronic device is determined by the receiving device, the pulse signal having been applied to the transmitting-end drive line needs to be received by the receiving-end sense line.

According to the above arrangement, the drive control carried out with respect to the transmitting-end sense lines is stopped in a case where the position determination is performed. This allows driving of the transmitting-end touch panel to be specialized for the receiving device to detect the position of the electronic device. Further, thanks to such specialized driving, it is possible to reduce power consumption required for the position detection.

Yet further, an electronic device (transmitting device 1b) according to Aspect 13 of the present invention is preferably, in any one of Aspects 10 to 12, such that the transmitting-end touch panel is provided so as to overlap a transmitting-end display screen.

According to the above arrangement, it is possible for the receiving device to accurately detect the position of the electronic device. This allows an image displayed on the transmitting-end display screen to be precisely aligned with respect to the receiving device.

(Differences from Patent Literature 1)

Note that the electronic devices (receiving device 1a and transmitting device 1b) according to an aspect of the present invention are different from a table-type screen device (digital platform device) 200 of Patent Literature 1 in the following points.

The technique of Patent Literature 1 is such that the table-type screen device 200 detects, on the screen 215, the positions of the electronic devices placed on the screen 215, but one of the electronic devices placed on the screen 215 does not detect the position of the other electronic device.

That is, in the technique of Patent Literature 1, the table-type screen device 200 plays a predominant role. The table-type screen device 200 is a master, while the electronic devices placed on the screen 215 are servants.

Thus, in the technique of Patent Literature 1, the table-type screen device 200, which serves as the master, is an essential component, and the table-type screen device 200, which serves as the master, requires a special component for recognizing the positions of the electronic devices, which serve as the servants. The technique of Patent Literature 1 always requires intermediation of the "master" during each operation, and thus causes a delay in data communications between the electronic devices, which are the servants, and other operations.

On the contrary, according to an aspect of the present invention, a pulse signal applied to the transmitting-end drive line of the transmitting-end touch panel included in the transmitting device is received by the receiving-end sense line of the receiving-end touch panel included in the receiving-end device. This allows the receiving device to recognize the position of the transmitting device. Further, according to an aspect of the present invention, the electronic device functioning as the receiving device functions as the transmitting device, while the electronic device functioning as the transmitting device functions as the receiving device (In other words, the function of the transmitting device and the function of the receiving device are exchanged between the electronic devices that perform communications with each other.). This allows the electronic device functioning as the receiving device to recognize the position of the counterpart device in real time.

Thus, according to an aspect of the present invention, the detection of the position of the transmitting device requires no intermediation of any device like the table-type screen device 200 disclosed in Patent Literature 1, and also requires no special components for pressure detection, barcode detection, and other detection.

Further, the detection of the position of the transmitting device can be performed accurately (e.g. with a precision in units smaller than a line pitch, for example, in units as small as display pixel pitch). This makes it possible to prevent erroneous recognition of the position of the transmitting device.

Still further, according to an aspect of the present invention, the position detection can be performed without requiring any "master" component like the table-type screen device 200. This makes it possible to perform the position detection without a time lag caused by intermediation of the "master".

Thanks to such a speedup in the position detection operation, it is possible to provide an intuitive and easy-to-use user interface, for example, in a case where image display is performed on the electronic devices according to an aspect of the present invention.

<Pulse Synchronization Between Touch Panels>

An electronic device according to Aspect 14 of the present invention is an electronic device serving as a receiving device (receiving device 1*a*), including: a receiving-end touch panel (touch panel 14) being a capacitive touch panel which detects contact of a target object or approach thereof, the receiving-end touch panel including receiving-end sense lines (sense lines SL) and receiving-end drive lines, the receiving-end sense lines being each capable of receiving at least one of pulse signals applied to respective transmitting-end drive lines (drive lines DL) which are provided in a transmitting-end touch panel (touch panel 14), being a capacitive touch panel, of a transmitting device having contacted or approached the electronic device; and a changing section for changing a timing with which pulse signals are applied to the respective receiving-end drive lines, in accordance with a correlation value between (i) the at least one of the pulse signals applied to the respective transmitting-end drive lines, which one is received by at least one of the receiving-end sense lines, and (ii) a predetermined pattern signal corresponding to at least one of pulse signals applied to the respective receiving-end drive lines of the receiving-end touch panel.

According to the above arrangement, it is possible to change a timing with which a pulse signal is applied to the receiving-end drive line, so that the pulse signal corresponds to the pulse signal having been applied to the transmitting-end drive line.

Thus, the pulse signal applied to the receiving-end drive line can be synchronized to the pulse signal having been received by the receiving-end sense line (pulse signal having been applied to the transmitting-end drive line). This makes it possible to perform a process using the pulse signal from the transmitting-end drive line such as, for example, a process of determining the position of the transmitting device or a process of receiving predetermined data which has been superimposed on the pulse signal.

Further, an electronic device (receiving device 1*a*) according to Aspect 15 of the present invention is preferably, in Aspect 14, such that in a case where it is determined that the correlation value is a value around 0 (zero), the changing section determines that the at least one of the pulse signals which one is received by the at least one of the receiving-end sense lines is not synchronized with the at least one of the pulse signals applied to the respective receiving-end drive lines; in a case where it is determined that the correlation value is a maximum value, the changing section determines that the at least one of the pulse signals which one is received by the at least one of the receiving-end sense lines is synchronized with the at least one of the pulse signals applied to the respective receiving-end drive lines.

According to the above arrangement, the determination as to whether the pulse signals are synchronized with each other can be made with use of the correlation value, and a change (adjustment) in timing with which the pulse signal is applied can be made for the synchronization.

Still further, an electronic device (transmitting device 1*b*) according to Aspect 16 of the present invention is an electronic device serving as a transmitting device (transmitting device 1*b*), including: a transmitting-end touch panel (touch panel 14) being a capacitive touch panel which detects contact of a target object or approach thereof, the transmitting-end touch panel including transmitting-end drive lines (drive lines DL); and a transmitting-end casing (casing 17) into which the transmitting-end touch panel is incorporated, wherein a minimum distance between the transmitting-end touch panel and an outside surface of the transmitting-end casing is not larger than a detectable distance within which the transmitting-end touch panel is capable of detecting the contact of the target object with the outside surface (outside surface A or B) or the approach thereof to the outside surface, wherein at least one of pulse signals for detecting the contact of the target object or the approach thereof, the pulse signals having been applied to the respective transmitting-end drive lines, is received by a receiving-end touch panel (touch panel 14), which is a capacitive touch panel provided in a receiving device (receiving device 1*a*) capable of receiving the at least one of the pulse signals, when the receiving device approaches or contacts the electronic device, in order that the receiving device is allowed to change a timing with which pulse signals are applied to respective receiving-end drive lines provided in the receiving-end touch panel.

According to the above arrangement, the minimum distance is not larger than a detectable distance within which the transmitting-end touch panel is capable of detecting the contact of the target object with the outside surface of the transmitting-end casing or the approach thereof to the outside surface of the transmitting-end casing. This allows the receiving-end touch panel included in the receiving device to receive the pulse signal having been applied to the transmitting-end drive line. With this arrangement, it is possible to change a timing with which a pulse signal is applied to the receiving-end drive line, so that the pulse signal corresponds to the pulse signal having been applied to the transmitting-end drive line of the transmitting-end touch panel.

<Data Communications Between Touch Panels>

An electronic device according to Aspect 17 of the present invention is an electronic device serving as a receiving device (receiving device 1a), including: a receiving-end touch panel (touch panel 14) being a capacitive touch panel which detects contact of a target object or approach thereof, the receiving-end touch panel including receiving-end sense lines (sense lines SL) each of which receives predetermined data superimposed on at least one of pulse signals for detecting contact of the target object with a transmitting device (transmitting device 1b) or approach thereof to the transmitting device, the pulse signals having been applied to respective transmitting-end drive lines (drive lines DL) provided in a transmitting-end touch panel (touch panel 14), being a capacitive touch panel, of the transmitting device having contacted or approached the electronic device.

According to the above arrangement, predetermined data that is superimposed on a pulse signal applied to the transmitting-end drive lines provided in the transmitting-end touch panel is received. This allows receiving the predetermined data without a need to use a form of communications for receiving the predetermined data.

Further, the receiving-end touch panel can receive the predetermined data. This achieves the following advantages:
(a) A need for visualization of information to be transmitted to the receiving device, which visualization is required for data communications using an optical sensor, is eliminated, and data communications with a high level of security are therefore achieved.
(b) A need for infrastructure and wireless communications, both of which are required for WiFi-based data communications, is eliminated. The elimination of the need for wireless communications enables data communications with a high level of security.
(c) A need to provide a device for data communications, which device is required for WiFi-based or infrared-based data communications, is eliminated, and reduction in size of the electronic devices is therefore achieved.

Further, an electronic device according to Aspect 18 of the present invention is an electronic device serving as a transmitting device (transmitting device 1b), including: a transmitting-end touch panel (touch panel 14) being a capacitive touch panel which detects contact of a target object or approach thereof, the transmitting-end touch panel including transmitting-end drive lines (drive lines DL); and a transmitting-end casing (casing 17) into which the transmitting-end touch panel is incorporated, wherein a minimum distance between the transmitting-end touch panel and an outside surface (outside surface A or B) of the transmitting-end casing is not larger than a detectable distance within which the transmitting-end touch panel is capable of detecting the contact of the target object with the outside surface or the approach thereof to the outside surface, the electronic device further including a transmitting-end drive control section (drive controlling section 601) for applying, to the respective transmitting-end drive lines, pulse signals for detecting the contact of the target object with the electronic device or the approach thereof to the electronic device, while superimposing, on each of the pulse signals, predetermined data to be transmitted to a receiving device (receiving device 1a) capable of receiving the pulse signals.

According to the above arrangement, the minimum distance is not larger than a detectable distance within which the transmitting-end touch panel is capable of detecting the contact of the target object with the outside surface of the transmitting-end casing or the approach thereof to the outside surface of the transmitting-end casing. This allows the receiving-end touch panel included in the receiving device to receive the pulse signal having been applied to the transmitting-end drive line.

Thus, the arrangement in which the transmitting-end drive controlling section superimposes predetermined data on the pulse signal allows the receiving device to receive the predetermined data via the receiving-end touch panel.

Further, causing the receiving-end touch panel to receive the pulse signal having the predetermined data superimposed thereon allows yielding the variety of effects (e.g. improvement in security and reduction in size of the electronic devices) as described above.

<System>

An information processing system according to Aspect 19 of the present invention includes: an electronic device (receiving device 1a), recited in any one of Aspects 1, 2, 3, 4, 5, 6, 7, 8, 9, 14, 15, and 17, which receives a pulse signal; and an electronic device (transmitting device 1b), recited in any one of Aspects 10, 11, 12, 13, 16, and 18, which transmits the pulse signal.

Thus, it is possible to establish an information processing system that yields the variety of effects described above.

<Others>

The electronic device (transmitting device 1b and receiving device 1a) according to the foregoing embodiments of the present invention may be realized by a computer. In this case, the present invention encompasses: a control program for the electronic device which program causes a computer to operate as the foregoing sections included in the electronic device so that the electronic device can be realized by the computer; and a computer-readable storage medium storing the program.

[Supplemental Notes]

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention enables performing processing such as a process of detecting the position of a counterpart device with use of a capacitive touch panel. The present invention is thus particularly applicable to, for example, multifunction mobile telephones, tablet computers, monitors, and televisions.

REFERENCE SIGNS LIST

1 Display device (electronic device, transmitting device, receiving device)
2 Display device (electronic device, transmitting device, receiving device)
3 Display device (electronic device, transmitting device, receiving device)
5 Information processing system
1b Transmitting device (electronic device)
1a Receiving device (electronic device)
12 Display panel (receiving-end display screen, transmitting-end display screen)
14 Touch panel (receiving-end touch panel, transmitting-end touch panel, capacitive touch panel)
17 Casing (receiving-end casing, transmitting-end casing)
31a Detection electrode (receiving-end detection electrode)
501 Drive controlling section (receiving-end drive controlling section)
503 Synchronization adjusting section (changing section)
505 position/angle determining section (determining section)
601 drive controlling section (transmitting-end drive controlling section)
A Outside surface
B Outside surface
SL Sense line (receiving-end sense line, transmitting-end sense line)
DL Drive line (receiving-end drive line, transmitting-end drive line)
SL1 to SLL Sense line (receiving-end sense line, transmitting-end sense line)
DL1 to DLn Drive line (receiving-end drive line, transmitting-end drive line)

The invention claimed is:

1. An electronic device serving as a receiving device, comprising:
a receiving-end capacitive touch panel that detects contact of a target object or approach thereof, the receiving-end capacitive touch panel including receiving-end sense lines each capable of receiving at least one pulse signal applied to respective transmitting-end drive lines, the receiving-end sense lines being provided in a transmitting-end capacitive touch panel of a transmitting device having contacted or approached the electronic device;
a central processing unit (CPU) that determines a position of the transmitting device in relation to the electronic device by judging which of the receiving-end sense lines has received the at least one pulse signal transmitted from the respective transmitting-end drive lines; and
a receiving-end casing into which the receiving-end capacitive touch panel is incorporated, wherein
a minimum distance between the receiving-end capacitive touch panel and an outside surface of the receiving-end casing is no longer than a detectable distance within which the receiving-end capacitive touch panel is capable of detecting the contact of the target object with the outside surface or the approach thereof to the outside surface, and
the receiving-end capacitive touch panel receives the at least one pulse signal from the transmitting-end capacitive touch panel of the transmitting device when the transmitting-end touch panel has contacted or approached an end surface of the receiving-end casing.

2. The electronic device according to claim 1, wherein the CPU performs the judging by detecting a change in capacitance value which change occurs in at least one of the receiving-end sense lines due to a coupling capacitance that has occurred between the at least one of the receiving-end sense lines and at least one of the transmitting-end drive lines.

3. The electronic device according to claim 2, wherein the CPU determines a positional relation of the at least one of the transmitting-end drive lines to the at least one of the receiving-end sense lines, by generating distribution of capacitance values which have occurred at the at least one of the receiving-end sense lines due to the coupling capacitance, the distribution showing a relationship between (i) the capacitance values and (ii) a position of at least one of the receiving-end capacitive touch panel and the transmitting-end capacitive touch panel, at which touch panel the capacitance values have occurred.

4. The electronic device according to claims 2, wherein:
the at least one pulse signal is applied to the respective transmitting-end drive lines in accordance with a predetermined application pattern indicative of a combination of values of voltages which are simultaneously applied, per period, to the respective transmitting-end drive lines and which are equal in number to the transmitting-end drive lines;
the application pattern is defined such that a pattern of capacitance values which are obtained when coupling capacitances occur in accordance with the predetermined application pattern and which are equal in number to the transmitting-end drive lines, matches one of a predetermined number of particular patterns indicative of respective combinations of the capacitance values, the particular patterns being associated in advance with a respective predetermined number of positional relations of the at least one of the transmitting-end drive lines to the at least one of the receiving-end sense lines;
the CPU determines the positional relation of the at least one of the transmitting-end drive lines to the at least one of the receiving-end sense lines by determining which of the particular patterns matches the pattern of the capacitance values obtained at the occurrence of the coupling capacitances at the at least one of the receiving-end sense lines.

5. The electronic device according to claim 1, wherein out of a plurality of receiving-end detection electrodes included in each of the receiving-end sense lines, a receiving-end detection electrode provided along an outer edge of the receiving-end capacitive touch panel receives the at least one pulse signal.

6. The electronic device according to claim 1, wherein the CPU determines an angle, in an operation screen of the receiving-end capacitive touch panel, between (i) a reference line set within an operation screen of the transmitting-end touch panel and (ii) a reference line set within the operation screen of the receiving-end capacitive touch panel.

7. The electronic device according to claim 1, wherein the CPU further:
controls an application of pulse signals to detect the contact of the target object or the approach thereof to respective receiving-end drive lines provided in the receiving-end capacitive touch panel, and
stops the application of the pulse signals to the respective receiving-end drive lines, in a case where the CPU determines the position of the transmitting device.

8. The electronic device according to claim 1, wherein the receiving-end capacitive touch panel overlaps a receiving-end display screen.

9. An electronic device serving as a transmitting device, comprising:
- a transmitting-end capacitive touch panel that detects a contact of a target object or approach thereof, the transmitting-end capacitive touch panel including transmitting-end drive lines; and
- a transmitting-end casing into which the transmitting-end capacitive touch panel is incorporated, wherein
- a minimum distance between the transmitting-end capacitive touch panel and an end surface of the transmitting-end casing is no longer than a detectable distance within which the transmitting-end capacitive touch panel is capable of detecting the contact of the target object with the end surface or the approach thereof to the end surface,
- at least one pulse signal to detect the contact of the target object or the approach thereof, the at least one pulse signal having been applied to the respective transmitting-end drive lines, is received by a receiving-end capacitive touch panel, in a receiving device capable of receiving the at least one pulse signal, when the receiving device has contacted or approached the end surface of the transmitting-end casing, in order that the receiving device is allowed to determine a position of the electronic device.

10. The electronic device according to claim 9, further comprising:
- a central processing unit (CPU) that
- carries out drive control with respect to transmitting-end sense lines in order that a change in capacitance between at least one of the transmitting-end drive lines and at least one of the transmitting-end sense lines is detected, and
- applies the at least one pulse signal to the respective transmitting-end drive lines in accordance with a predetermined application pattern indicative of a combination of values of voltages which are simultaneously applied, per period, to the respective transmitting-end drive lines and which are equal in number to the transmitting-end drive lines.

11. The electronic device according to claim 10, wherein the CPU stops the drive control carried out with respect to the transmitting-end sense lines, in a case where the position of the electronic device is determined by the receiving device.

12. The electronic device according to claim 9, wherein the transmitting-end capacitive touch panel is provided so as to overlap a transmitting-end display screen.

13. An information processing system comprising:
- an electronic device serving as a receiving device, the electronic device including:
- a receiving-end capacitive touch panel that detects contact of a target object or approach thereof, the receiving-end capacitive touch panel including receiving-end sense lines each capable of receiving at least one pulse signal applied to respective transmitting-end drive lines which are provided in a transmitting-end capacitive touch panel of a transmitting device having contacted or approached the electronic device; and
- a central processing unit (CPU) that determines a position of the transmitting device in relation to the electronic device by judging which of the receiving-end sense lines has received the at least one of the pulse signals transmitted from the respective transmitting-end drive lines; and
- an electronic device, recited in claim 9, which transmits the at least one pulse signal.

14. An electronic device serving as a receiving device, comprising:
- a receiving-end capacitive touch panel that detects contact of a target object or approach thereof, the receiving-end capacitive touch panel including receiving-end sense lines and receiving-end drive lines, the receiving-end sense lines being each capable of receiving at least one of pulse signals applied to respective transmitting-end drive lines which are provided in a transmitting-end capacitive touch panel of a transmitting device having contacted or approached the electronic device;
- a central processing unit (CPU) that changes a timing with which pulse signals are applied to the respective receiving-end drive lines, in accordance with a correlation value between (i) at least one of the pulse signals applied to the respective transmitting-end drive lines, which one is received by at least one of the receiving-end sense lines, and (ii) a predetermined pattern signal corresponding to the at least one of the pulse signals applied to the respective receiving-end drive lines of the receiving-end capacitive touch panel; and.
- a receiving-end casing into which the receiving-end capacitive touch panel is incorporated, wherein
- a minimum distance between the receiving-end capacitive touch panel and an end surface of the receiving-end casing is no longer than a detectable distance within which the receiving-end capacitive touch panel is capable of detecting the contact of the target object with the end surface or the approach thereof to the end surface, and
- the receiving-end capacitive touch panel receives the at least one of the pulse signals from the transmitting-end capacitive touch panel of the transmitting device when the transmitting-end touch panel has contacted or approached the end surface of the receiving-end casing.

15. The electronic device according to claim 14, wherein:
- in a case where it is determined that the correlation value is a value around 0 (zero), the CPU determines that the at least one of the pulse signals which one is received by the at least one of the receiving-end sense lines is not synchronized with the at least one of the pulse signals applied to the respective receiving-end drive lines, and
- in a case where it is determined that the correlation value is a maximum value, the CPU determines that the at least one of the pulse signals which one is received by the at least one of the receiving-end sense lines is synchronized with the at least one of the pulse signals applied to the respective receiving-end drive lines.

* * * * *